US012603376B2

(12) United States Patent (10) Patent No.: US 12,603,376 B2
Fairbanks et al. (45) Date of Patent: Apr. 14, 2026

(54) MODULAR SHAREABLE BATTERY SYSTEM

(71) Applicants: Alfred S. Fairbanks, Acampo, CA (US); Douglas N. Modlin, Livermore, CA (US)

(72) Inventors: Alfred S. Fairbanks, Acampo, CA (US); Douglas N. Modlin, Livermore, CA (US)

(73) Assignee: ALFRED S. FAIRBANKS, Acampo, CA (US)

( * ) Notice: Subject to any disclaimer, the term of this patent is extended or adjusted under 35 U.S.C. 154(b) by 0 days.

(21) Appl. No.: 18/924,002

(22) Filed: Oct. 23, 2024

(65) Prior Publication Data

US 2025/0132443 A1     Apr. 24, 2025

Related U.S. Application Data

(60) Provisional application No. 63/592,419, filed on Oct. 23, 2023.

(51) Int. Cl.
*H01M 50/258* (2021.01)
*B60R 16/033* (2006.01)
(Continued)

(52) U.S. Cl.
CPC ......... *H01M 50/258* (2021.01); *B60R 16/033* (2013.01); *H01M 10/425* (2013.01);
(Continued)

(58) Field of Classification Search
CPC ............. H01M 50/258; H01M 10/425; H01M 10/443; H01M 10/625; H01M 10/6563;
(Continued)

(56) References Cited

U.S. PATENT DOCUMENTS 5,559,420 A     9/1996  Kohchi
6,265,091 B1 *  7/2001  Pierson ............... H01M 50/296
                                                                429/94
(Continued)

FOREIGN PATENT DOCUMENTS

CN     114161920     3/2022
EM        0350325  *  7/1989  ............. B60R 25/04
(Continued)

OTHER PUBLICATIONS

TrailManor Owners Forum—Electrical Subforum—"Using power station as primary battery"—Feb. 13, 2023 https://www.trailmanorowners.com/threads/using-power-station-as-primary-battery.779960/ (Year: 2023).*

(Continued)

*Primary Examiner* — Michael L Dignan
(74) *Attorney, Agent, or Firm* — SCHWEGMAN LUNDBERG & WOESSNER, P.A.

(57) ABSTRACT

Examples relate to vehicle battery systems comprising a base unit connectable to a vehicle's electrical system, a removable modular replaceable battery, and a secondary battery within the base unit. The base unit is configured to interchangeably use modular replaceable batteries of different chemistries. Control circuits optimize charging and discharging parameters based on battery chemistries. The secondary battery provides power when the modular battery is removed. The system includes thermal management, compatibility with lead-acid charging systems, and mobile base unit functionality. The modular battery can power external devices and can foreseeably store energy up to and beyond 1 kWh. The system operates at various voltages suitable for different vehicle types.

20 Claims, 39 Drawing Sheets

(51) Int. Cl.

| | |
|---|---|
| *H01M 10/42* | (2006.01) |
| *H01M 10/44* | (2006.01) |
| *H01M 10/625* | (2014.01) |
| *H01M 10/6563* | (2014.01) |
| *H01M 10/6572* | (2014.01) |
| *H01M 50/249* | (2021.01) |
| *H02J 7/00* | (2006.01) |

(52) U.S. Cl.
CPC ....... *H01M 10/443* (2013.01); *H01M 10/625* (2015.04); *H01M 10/6563* (2015.04); *H01M 10/6572* (2015.04); *H01M 50/249* (2021.01); *H01M 2220/20* (2013.01); *H02J 7/0047* (2013.01)

(58) Field of Classification Search
CPC .......... H01M 10/6572; H01M 50/249; H01M 2220/20; B60R 16/033; H02J 7/0047
See application file for complete search history.

(56) References Cited

U.S. PATENT DOCUMENTS

| | | | | |
|---|---|---|---|---|
| 9,358,895 | B2 | 6/2016 | Avganim | |
| 10,181,590 | B2 | 1/2019 | Zeiler et al. | |
| 10,293,698 | B2 * | 5/2019 | Zenner | B60L 53/14 |
| 10,811,646 | B2 * | 10/2020 | Meyers | H01M 50/204 |
| 10,839,451 | B2 * | 11/2020 | Penilla | G06Q 10/087 |
| 11,056,727 | B2 * | 7/2021 | Guglielmo | H01M 50/519 |
| 11,626,642 | B2 | 4/2023 | Zeiler et al. | |
| 11,701,982 | B2 * | 7/2023 | Moszynski | H02J 7/0013 |
| | | | | 701/22 |
| 11,865,944 | B2 * | 1/2024 | Brumley, Jr. | H02J 7/0019 |
| 2008/0120955 | A1 | 5/2008 | Lucas et al. | |
| 2011/0061958 | A1 | 3/2011 | Morgan | |
| 2012/0025766 | A1 * | 2/2012 | Reade | G06F 11/327 |
| | | | | 320/110 |
| 2012/0248868 | A1 * | 10/2012 | Mobin | B60L 50/30 |
| | | | | 414/589 |
| 2014/0375272 | A1 | 12/2014 | Johnsen et al. | |
| 2016/0099590 | A1 | 4/2016 | Velderman et al. | |
| 2017/0133722 | A1 * | 5/2017 | Kim | H01M 10/441 |
| 2019/0016231 | A1 * | 1/2019 | Scaringe | H01M 10/613 |
| 2020/0047631 | A1 | 2/2020 | Kupfer et al. | |
| 2020/0130511 | A1 * | 4/2020 | Botts | B60L 58/22 |
| 2021/0408614 | A1 | 12/2021 | Jackson et al. | |
| 2022/0305945 | A1 | 9/2022 | Dooley et al. | |

FOREIGN PATENT DOCUMENTS

| | | | | |
|---|---|---|---|---|
| EP | 0986830 | 10/2001 | | |
| EP | 4382332 | 6/2024 | | |
| FR | 3015774 | * 12/2013 | | H01M 2/10 |
| GB | 2481806 A | 1/2012 | | |
| WO | 2025090600 | 5/2025 | | |

OTHER PUBLICATIONS

FR 3015774 machine English translation (Year: 2013).*
"International Application Serial No. PCT US2024 052557, Invitation to Pay Additional Fees mailed May 7, 2025", 13 pgs.
International Application Serial No. PCT/US2024/052557, International Search Report mailed Jul. 1, 2025, 5 pgs.
International Application Serial No. PCT/US2024/052557, Written Opinion mailed Jul. 1, 2025, 13 pgs.

* cited by examiner

3004

MODULAR SHAREABLE BATTERY SYSTEM

CLAIM OF PRIORITY

This patent application claims the benefit of priority to U.S. Provisional Application Ser. No. 63/592,419, filed Oct. 23, 2023, which is incorporated by reference herein in its entirety.

BACKGROUND

Lead-acid batteries are commonly used to provide power in vehicles and equipment. For example, in internal combustion engine (ICE) vehicles, lead-acid batteries are typically used to start the engine and power various electrical systems. The lead-acid battery is connected to the vehicle's charging system, such as an alternator, which recharges the battery during operation.

While widely used, lead-acid batteries have certain limitations. For instance, they use heavy lead plates and corrosive sulfuric acid electrolytes. They can be damaged if discharged below a certain state of charge. Repeated discharges can shorten their lifespan. Due to the construction, orientation during use and storage matters. Recycling and disposal of lead-acid batteries raises environmental concerns.

Various battery chemistries have been developed as alternatives to lead-acid, including lithium-ion, nickel-metal hydride, and others. These chemistries provide potential benefits in weight, size, capacity, lifespan, discharge ability, orientation flexibility, and environmental impact compared to lead-acid batteries. However, adoption has been limited due to factors like cost and compatibility issues.

There is a need for improved solutions in this field that can overcome the deficiencies of current technologies. In particular, solutions that provide flexibility, convenience, and environmental benefits while still delivering the performance and compatibility required for automotive, marine, construction, agriculture, manufacturing, materials processing and other demanding applications are desirable.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
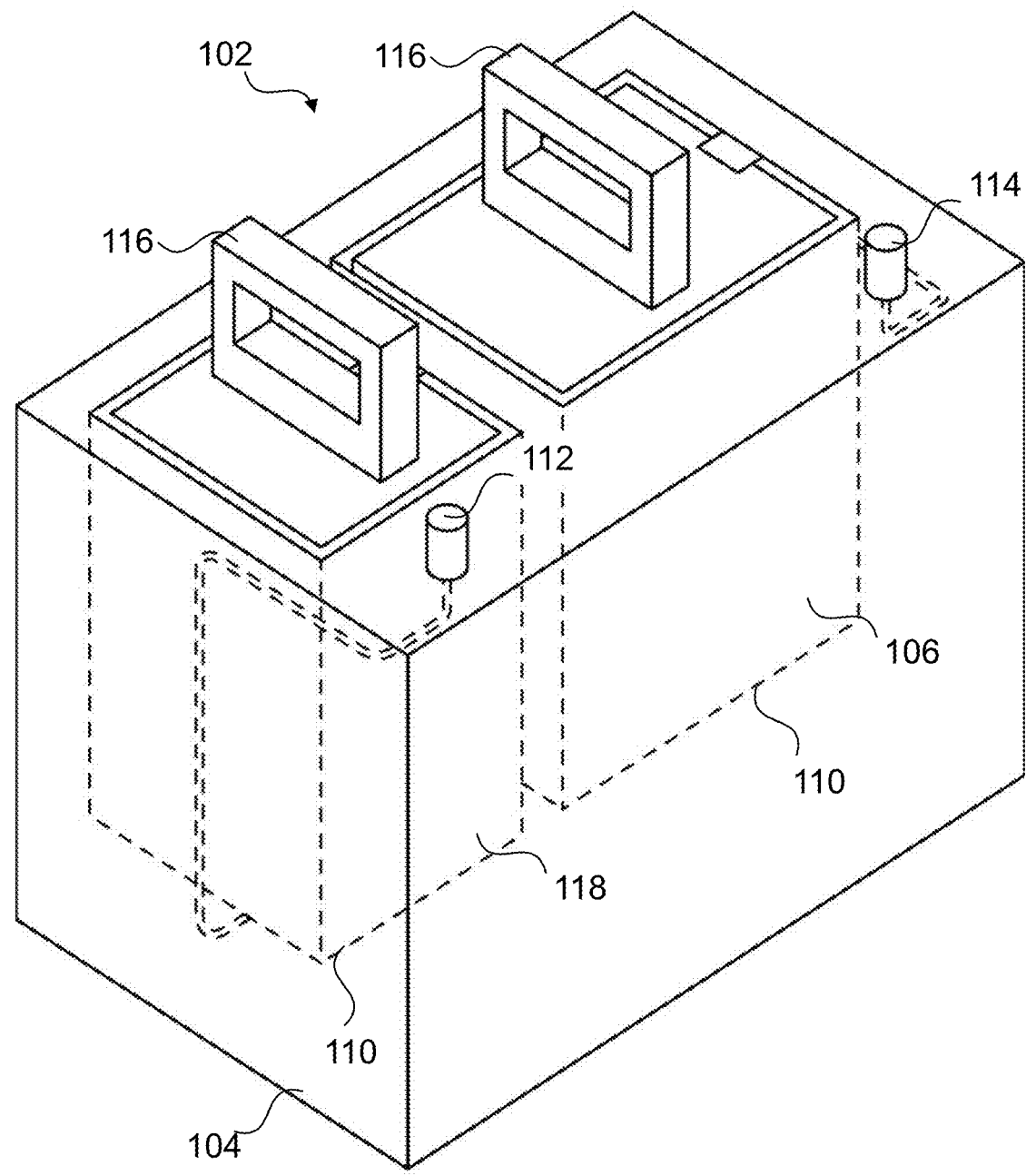
FIG. 1 is a perspective view illustrating a battery assembly, according to some examples.

"Battery" may refer broadly to any device capable of storing electrical energy or converting chemical energy into electrical energy and vice versa. A battery consists of one or more electrochemical cells, which store chemical energy and release it as electrical current.

Examples of batteries include but are not limited to:
Lead-acid batteries—commonly used in vehicles and backup power systems Lithium-based batteries—used in consumer electronics and electric vehicles.

Nickel-metal hydride batteries—used in hybrid/electric cars and cordless tools

Nickel-cadmium batteries—older rechargeable batteries used in radios, cameras, toys Sodium-sulfur batteries—high-temperature batteries used for grid energy storage Flow batteries—rechargeable fuel cell batteries used for large-scale energy storage Primary batteries—single-use disposable batteries including:
Alkaline batteries (AA, AAA, C, D, 9V)
Zinc-carbon batteries
Lithium metal batteries
Silver oxide batteries
Zinc-air batteries Thermal batteries—single-use high-temperature batteries used in missiles/munitions Microbatteries—small thin film or printed batteries used in integrated circuits Bio batteries—batteries powered by biological organisms or substances Solar batteries—cells that store energy from sunlight Fuel cells—electrochemical cells that convert fuel sources like hydrogen into electricity Ultra capacitors or super capacitors—electrostatic energy storage devices with high power density Battery packs—multiple batteries assembled into a single unit Reserve batteries—stored inactivated and activated when needed Thus, "battery" refers broadly to any device capable of storing chemical energy and converting it to electrical energy on demand, including both rechargeable and single-use batteries spanning from small-scale electronics to large-scale power grids.

"Battery pack" may refer to multiple batteries electrically connected together in series and/or parallel configurations to provide the required voltage, capacity, and power capability. Battery packs are commonly used in electric vehicles, energy storage systems, portable electronics, power tools, and other applications.

"Charger" may refer broadly to any device capable of providing electrical energy to recharge a battery by converting power from an external source like AC line voltage or a vehicle alternator into the proper voltage and current levels. Examples include wall plug-in chargers, onboard vehicle chargers, solar chargers, etc.

"Vehicle" may refer broadly to any mode of transportation or conveyance designed to carry or transport people, goods, or materials across land, air, water, or space.

Examples of vehicles include but are not limited to:
Automobiles, cars, trucks, vans, buses, motorcycles, scooters
Trailers, campers, RVs, food trucks
Tractors, backhoes, bulldozers, cranes
Forklifts, carts, wagons, wheelbarrows
Bicycles, scooters, skateboards, rollerblades
Airplanes, helicopters, jets, gliders, hot air balloons
Boats, skiffs, sailboats, ships, personal watercraft like jet skis, canoes, paddle boards, kayaks
Submarines, underwater drones
Trains, trams, rail vehicles
Space shuttles, rockets, space stations
Electric vehicles including electric cars, buses, bikes
All-terrain vehicles like dune buggies or quad bikes Mobility devices like wheelchairs, scooters Animal-powered conveyances like horse carriages Trolleys, golf carts, Segways Hovercraft, airboats, snowmobiles Tanks, armored vehicles, amphibious vehicles Cable cars, ski lifts, elevators, escalators Toys or models like toy cars, planes, or trains Thus, "vehicle" may thus include any powered or unpowered machine, device, or structure that transports or conveys people, goods, or materials across land, air, water, space, or industrial settings. This includes both transportation and construction/utility vehicles spanning recreational, commercial, emergency, and military uses.

Vehicle "electrical system" or "external electrical system" may include any of the following electrical sub-systems: the electrical system for charging or drawing energy from (discharging) a battery or other energy source used to start and/or maintain an internal combustion engine (ICE) based vehicle or the electrical system for charging or drawing energy from (discharging) a battery or other energy source used to maintain the non-propulsion related electrical systems of an electric vehicle (EV).

"Equipment" may refer to any device, machine, or system not used to carry or transport people, goods, or materials across land, air, water, or space.

Examples of equipment include but are not limited to:

Fixed machine tools used for fabrication such as lathes, mills, grinders, drilling machines Fixed or mobile tools or systems used for drilling, excavating or mining for oil, water, or other materials Fixed or mobile tools or systems used for scientific or medical measurement and research such as X-Ray or MRI machines, spectrometers, oscilloscopes, spectrum analyzers, mass spectrometers, microscopes, electron microscopes Computers or systems of computers such as data centers, super computers, arrays of computers

INTRODUCTION

Lead-acid batteries have become the standard technology for providing electrical energy for starting and operating internal combustion engine (ICE) based vehicles, and for powering the non-propulsion electrical systems found in some electric vehicles (such as cars and trucks) as well as the drive systems in some electric vehicles (such as golf carts). Lead-acid batteries are also used in many other applications. This widespread adoption of lead-acid batteries is due to their relatively low cost and ability to meet performance requirements under commonly accepted standard operating conditions.

Lead-acid is a generic term that includes flooded lead-acid, absorbed glass mat (AGM), and other similar lead-acid battery chemistries known to those skilled in the art. Despite their advantages and widespread adoption, lead-acid batteries are prone to becoming discharged (or being unable to hold a charge) toward the end of their life, or due to inadvertent discharge (for example, leaving an electrical load connected when the recharging system is not operating).

If lead-acid batteries are discharged beyond certain limits (for instance, below 50% state of charge), permanent damage or degradation of the battery can occur. It can be difficult to detect that such battery damage has occurred and the extent of the damage. All these factors lead to the possibility of unpredictable lead-acid battery failure. For example, over the life of an automobile, the lead-acid battery may fail without warning.

When such unpredictable battery failure occurs, the operator, owner, or user of the vehicle will likely want (or need) to change the battery quickly and easily. Prior to the teaching of the present disclosure, changing a lead-acid battery requires removing it and replacing it with a new lead-acid battery or other suitable replacement battery. This can be a time-consuming and messy process.

Replacing a battery requires obtaining a new battery, which can be difficult if a local source is not readily available. Replacing the battery also requires handling an old battery which is often dirty and possibly contaminated by corrosion or battery acid that can leak from the interior of the battery. Replacing a lead-acid battery can be done by the owner/user or by a professional repair shop at a cost. In any case, replacing a lead-acid battery is generally neither easy, fast, nor cost-effective.

In contrast, lithium batteries offer numerous advantages over lead-acid batteries. These include:

about ½ to ⅓ the weight and size (or less) for the same energy storage capacity, the ability to discharge the battery to 0% state of charge without damage (lead-acid batteries can be degraded or damaged when discharged below 50%), rapid recharging (within one hour or less), much longer cycle life (thousands of cycles versus hundreds for lead-acid), and lithium batteries can be mounted, stored, or operated in any orientation since they do not vent hydrogen gas like some lead-acid batteries.

lithium batteries are less prone to corrosion and more environmentally friendly compared to lead-acid batteries since they do not contain lead or acid.

However, lithium batteries also have disadvantages compared to lead-acid batteries. These include for example:

higher cost (up to 5 times more expensive), inability to charge at cold temperatures without damage (e.g., some varieties cannot be charged below 0° C.), lithium batteries require higher charging voltages and different charging profiles compared to lead-acid such that standard 12V ICE vehicle charging systems may not be fully compatible, and limitations in starting (or peak output) current capabilities compared to lead-acid batteries in some lithium battery designs.

Lithium batteries may require a system to protect and manage them called a battery management system or BMS which can disconnect the battery due to a fault state created by exceeding predefined limits on charging current, output current, and temperature.

These and other factors may have contributed to the low adoption rate of lithium batteries despite their potential to replace lead-acid batteries in certain applications where the limitations of lithium batteries are acceptable, given the benefits. For example, the high cost and challenges with heating lithium batteries for charging in cold temperatures may have dissuaded consumers due to the prevailing belief that lead-acid batteries are "good enough," even though lead-acid batteries may fail unpredictably. Battery producers may be reluctant to supply lithium batteries to a market where customers are reluctant to adopt them.

When an operator attempts to start an exemplary ICE vehicle that requires a relatively fully charged lead-acid battery to drive its starter motor, the engine will not start if the battery charge is below the minimum state of charge required by the ICE and lead-acid battery combination. To start a vehicle that does not start on its own, the user must either jump-start the battery using an appropriate power source, recharge the battery in-place, or remove and replace the battery.

If the battery is removed, it may be replaced with a new fully charged battery. Alternatively, the removed battery may potentially be recharged externally, either connected to an external charger or with the charger connected to the battery while still mounted in the vehicle. In any case, other than jump-starting, some time (up to several hours) is required to recharge the battery to a state of charge sufficient to start the engine. To jump-start a vehicle without time delay requires access to a charged battery, charger, another vehicle and a set of jumper-cables, or a dedicated jump-start device (such as a lithium battery jump starter).

Once a vehicle is started after the battery has become discharged, there is a significant chance the battery will discharge again soon and be unable to restart the engine. This is because the battery may have been damaged or be nearing end of life. Determining if the battery remains functional requires specialized testing equipment.

As described above, standardized lead-acid battery sizes exist for different vehicle and equipment manufacturers. The Battery Council International (BCI) has established a system that categorizes batteries based on their physical dimensions. This system is widely used in the automotive industry and other applications.

Some common standardized lead-acid battery sizes include but are not limited to:

Group 24
    Typical Capacity Range: 18-30 Ah
    Dimensions: 7.13×3.01×6.61 inches
    Common Uses: Lawn mowers, ATVs, motorcycles
Group 34/78
    Typical Capacity Range: 40-80 Ah
    Dimensions: 10.24×6.76×7.68 inches
    Common Uses: Cars, light trucks
Group 35
    Typical Capacity Range: 60-100 Ah
    Dimensions: 11.10×6.89×8.39 inches
    Common Uses: Full-size pickup trucks
Group 65
    Typical Capacity Range: 100-200 Ah
    Dimensions: 12.17×6.61×9.49 inches
    Common Uses: Commercial trucks, RVs, marine
Group 31
    Typical Capacity Range: 85-105 Ah
    Dimensions: 12.01×6.61×9.16 inches
    Common Uses: Trolling motors, golf carts
Group 27
    Typical Capacity Range: 55-70 Ah
    Dimensions: 10.28×6.81×8.70 inches
    Common Uses: Mobility scooters, wheelchairs
Group 30
    Typical Capacity Range: 55-70 Ah
    Dimensions: 11.10×6.89×8.39 inches
    Common Uses: Solar energy storage Lead-acid batteries are typically placed in dedicated trays or holders located near the internal combustion engine (ICE). These trays or holders are designed with dimensions conforming to standard battery sizes to secure the battery and prevent movement or tipping during operation. Common standard lead-acid battery sizes used in vehicles and equipment are set out above.

To further secure the battery, some examples employ a metal strap or clamp attached to the tray or other anchor points in the vehicle or equipment. The strap firmly holds the battery in the properly sized tray or holder to prevent shifting during motion.

Other examples use a hold-down bolt that passes through a bracket or hole on the top of the battery and tightens down, securing the battery firmly in the tray or holder. The hold-down bolt and bracket system immobilize the battery and prevents movement. Some examples may employ more complex mechanical attachment systems to hold the battery in place. These attachment systems may include brackets, straps, or other components made of durable metals or plastics designed specifically to interface with standard battery sizes and shapes. The brackets firmly grasp the battery and attach to anchor points in the tray or holder, ensuring a tight and secure fit regardless of vibration or motion. Multiple attachment points distribute forces and enhance stability. The battery attachment systems may be customized to work with standard battery dimensions and prevent shifting or dislodgment.

Lead-acid batteries are also widely used in electric vehicles to power 12V (or other operating voltage) utility systems, due to their low cost, robustness, cold temperature performance, widespread availability, and compatibility. 12V systems power auxiliary systems including but not limited to lights, sensors, safety systems, and equipment like windshield wipers and infotainment. Lead-acid batteries can also provide backup power if propulsion batteries are depleted. However, in electric vehicles lead-acid batteries still have unpredictable failure modes and need replacement or jump-starting, inconveniencing the user.

There is a need for an improved system to replace lead-acid batteries quickly, easily, and compatibly. The present disclosure provides such a system utilizing advanced lithium or other battery chemistries while overcoming barriers to the adoption of lithium or other advanced battery types.

Overview

Examples relate to apparatus and methods for replacing a commercially available lead-acid battery (or equivalent battery of any chemistry) with a base unit, which may be permanently mounted in a vehicle or may be a movable, portable base unit. The base unit comprises a form-fit compatible battery case or housing containing one or more bays, each capable of holding a swappable modular replaceable battery (e.g., a shareable battery). The battery comprises a lithium battery or other compatible battery chemistry.

This allows the user to quickly and easily remove a discharged shareable battery and replace it with a new or fully charged shareable battery. It also allows the user to swap a charged with a discharged shareable battery, so that the vehicle's charging system can recharge the discharged battery.

The base unit can be mounted in the same or similar position since it can be designed to be the same size or smaller (given an equivalent stored energy) to the original lead-acid battery it is replacing. The base unit connects to the existing positive and negative electrically conductive battery cables that were previously connected to the original battery prior to its removal. In some examples, the base unit may be significantly smaller than the lead-acid battery it replaces given equivalent stored energy. This is because the energy density of an LFP (i.e., Lithium Iron Phosphate) battery may range from about 90 to 160 Wh/l (Watt-hours per liter) whereas the energy density of a lead-acid battery may range from about 50 to 90 Wh/l. For an equivalent amount of stored energy (e.g., kWh), a LFP battery can be roughly 1.8 to 3 times smaller than a lead-acid battery allowing the base unit to be smaller than the lead-acid battery it replaces by up to the same factor.

The shareable battery comprises one or more battery cells, which may use various rechargeable battery chemistries depending on the specific application and requirements. While lithium-ion and lithium polymer batteries offer advantages like high energy density, fast charging, and long cycle life, the present disclosure is not limited only to lithium-based battery chemistries for the battery. Other potential battery chemistries that may be used in the battery include:

Lead-acid-Lead-acid chemistry remains a cost-effective option for less demanding applications. Different lead-acid variants like absorbed glass mat (AGM) and gel cell can be optimized for factors like cycle life, discharge depth, weight, and operating temperature range.

Nickel-metal hydride (NiMH)—NiMH batteries offer good energy density, lower cost than lithium-ion, and tolerance for overcharging.

Nickel-cadmium (NiCd)—NiCd batteries are very robust and can handle high discharge rates. But they suffer from relatively low energy density.

Nickel-zinc (NiZn)—NiZn chemistry offers higher power density and energy density compared to lead-acid and NiCd.

Sodium-ion—Sodium-ion batteries share similarities with lithium-ion but may offer lower cost.

Compatible batteries with improved performance that may be developed in the future could be used as a sharable battery.

The base unit and shareable battery incorporate quick connect/disconnect electrical connectors to facilitate connecting and disconnecting the positive and negative terminals of the battery and base unit. They also comprise mechanisms for mechanically retaining and releasing the shareable battery from the base unit bay(s).

Additionally, the base unit may include an inverter and/or Edison receptacles to allow the use of the battery to power 120V AC devices when the vehicle is operating or not operating. When operating, both the base unit battery and vehicle charging system power the load. When not operating, only the battery powers the load.

The present disclosure also provides apparatus and methods for rapidly charging shareable batteries such as lithium batteries, so they are ready to replace discharged shareable batteries when needed. Charging modules can recharge shareable batteries in less than one hour for example.

The base unit and shareable battery may further include compatibility features to ensure proper charging of shareable batteries using legacy lead-acid charging systems. They may also incorporate diagnostics to monitor the state of charge and condition of the shareable battery.

A mobile base unit variant comprises one or more shareable batteries, each with a quick connect/disconnect connector. The mobile base unit may include a 120V AC power supply to charge its batteries and an inverter to power external AC devices. This allows an unlimited supply of battery power to a device by swapping discharged and charged shareable batteries in the mobile base unit bays. A mobile base unit may supply DC power from its shareable batteries and AC power from its inverter to external devices. Battery Assembly 102—Extending/Protruding Carry Handles 310

FIG. 1 is a perspective view of a battery assembly 102, according to some examples, which includes a permanently mounted base unit (BU 104) and multiple modular replaceable batteries (MRBs 106).

The BU 104 has a base unit housing 108 (shown in FIG. 4) and contains multiple docks or bays 110 to removably receive, accommodate, and secure the MRBs 106 with the BU 104. The bays 110 include alignment keys 402 (shown in FIG. 4) to ensure proper orientation of the MRBs 106.

The BU 104 is designed with the same (or similar, or smaller) physical form factor and electrical connectors as a standard lead-acid battery for a vehicle allowing it to directly replace such batteries. Examples of standard battery sizes the BU 104 can conform to include Group 24, Group 27, Group 31, 34/178, 35, 65 etc. As described above, given equivalent stored energy to the lead-acid battery it replaces, the BU can be designed to be significantly smaller. This enables one size BU to potentially replace more than standard battery group size. In some examples, one size BU could replace multiple group size batteries commonly used in cars, trucks, or commercial vehicles.

A reduced BU size along with configurable mechanical mounting and electrical connection options will allow a one BU size to replace more than one standard battery group sizes leading to a simplified and cost-effective battery replacement process.

The BU 104 contains internal electrical connectors 602 (FIG. 6) to route power from the MRBs 106 to external connectors. In some examples, the external terminals include a negative terminal 112 and positive terminal 114 which mate with the existing battery cables (e.g., vehicle interface 804 shown FIG. 8) in the vehicle or device. These electrical terminals include connection lugs of a similar size, shape, and location as the electrical connection terminals (e.g., connection posts, bolts, and the like) on the original battery or in other examples, electrical connectors that allow direct connection to the vehicle's battery cable's conductive wires after removal of the original battery's terminal connectors. Some examples include spring-loaded jaws, screw actuated clamps, WAGO lever actuated spring clamped connectors or equivalent, wire nuts or equivalent, split bolt splices or equivalent, crimped or soldered ring terminals or equivalent designed to grip and/or securely mechanically capture and thereby make a low resistance electrical connection to the electrically conductive wires within the cables previously removed from the original lead-acid battery.

Figure 7:
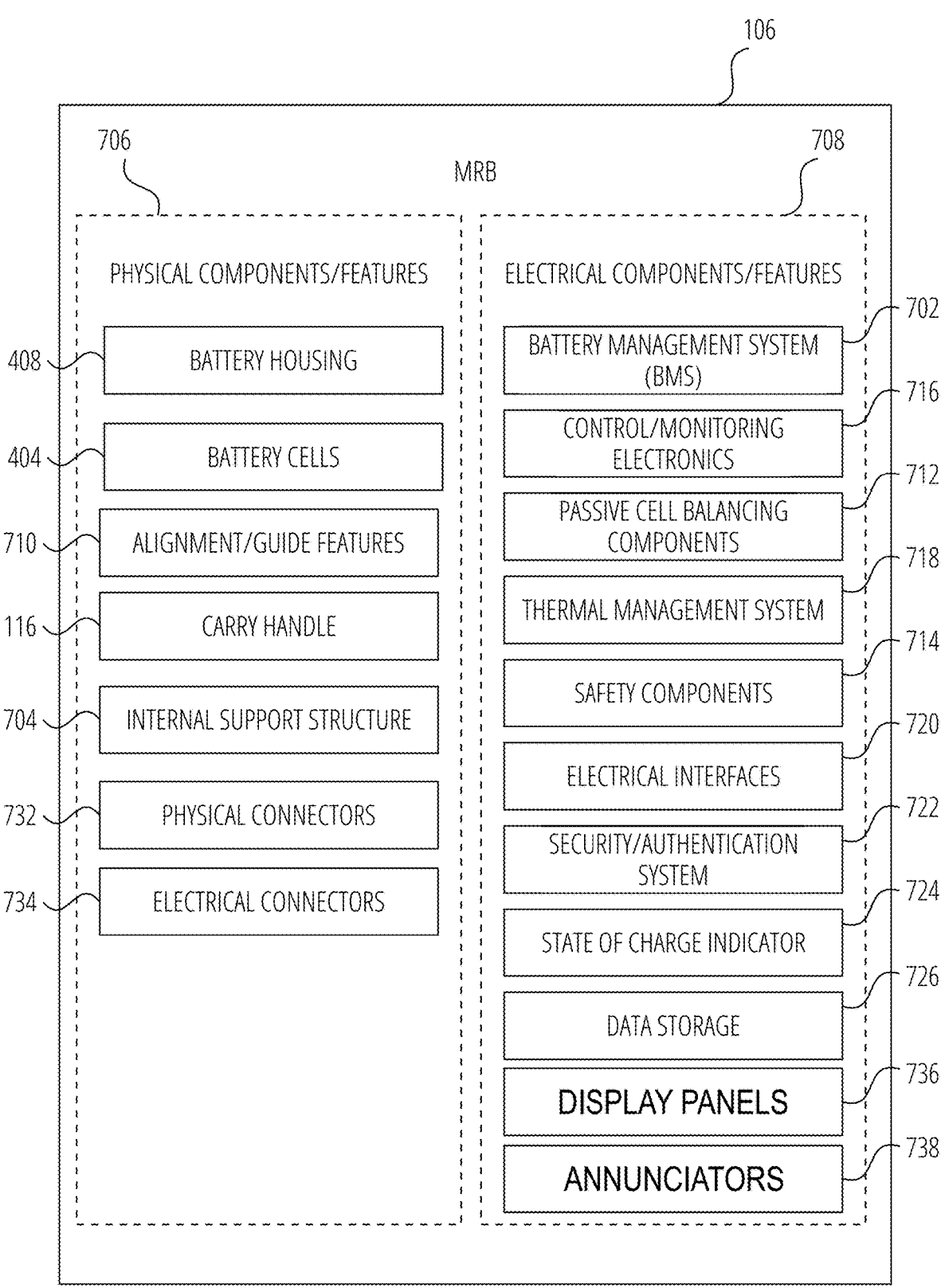
FIG. 7 is a perspective view illustrating a battery assembly, according to some examples.

Each MRB 106 has a carry handle 116 that enables easy insertion into and removal from the bays 110 of the BU 104. The MRBs 106 contain the battery cells 404 (FIG. 4) and internal battery management system (BMS) 702 (FIG. 7).

In the battery assembly 102 shown in FIG. 1 the BU 104 is configured to accommodate multiple MRBs 106. The MRBs 106 may have different physical sizes, capacities, and voltages tailored to specific applications. Accordingly, the bays 110 defined within the base unit housing 108 are sized to receive MRBs 106 of varying form factors.

For example, a larger primary MRB 106 may provide the bulk of power and capacity needs, while a smaller secondary MRB 118 provides supplemental or backup functions. In some examples, the secondary MRB 118 acts as a "keep alive" battery that maintains the operation of critical electronic systems in the host device or system during swaps of a primary MRB 106.

Specifically, "keep-alive" MRB 118 may provide continuous power to electronics controlling security systems, lights, clocks, computer memory retention, and other features when the primary MRB 106 is disconnected. This prevents having to completely shut down the host device or system during servicing of a battery assembly 102 (e.g., battery swapping), enhancing the convenience and transparency of the battery assembly 102.

The keep alive MRB 118 may be sized to provide adequate runtime for electronics loads over a determinable swap duration of a primary MRB 106. It may use an internal battery optimized for high cycle life and low self-discharge rather than maximum capacity.

For example, in an automotive application, a primary MRB 106 may operate at a standard 12V nominal voltage commonly used for vehicle electrical systems, although it could also be designed to operate at any other vehicle electrical system voltage (e.g., 24V or 48V). This 12V supply powers components including ignition, lighting, infotainment, etc. The primary MRB 106 is, in such examples, configured to deliver high surge currents, up to several hundred to several thousand Amps, for engine cranking. It also provides steady-state currents of up to several hundred Amps 100 A during normal vehicle operation or when providing power through BUs external to the vehicle. Capacity on the order of 50-150 Ah at 12V (or ~500 to ~2,000 Wh), allows for adequate runtime before recharging is needed with a weight and form factor consistent with portable operation.

The keep alive MRB 118, in such examples, operates at a similar 12V (or other) nominal voltage to maintain compatibility with vehicle electronics. In some examples, the keep alive MRB 118 has enough current capacity and energy storage to start a vehicle with an ICE and supply the off-state loads for a reasonable time (e.g., from a few hours to a few weeks) if the primary MRB 106 is not present or is replaced with a discharged MRB. In some examples, the keep alive energy storage capacity is lower, as it primarily needs to supply critical electronic loads. For example, energy storage capacities of a keep alive MRB 118 may be in the 2-10 Ah at 12V (or ~20 to ~150 Wh) range with peak starting current capacity of tens of Amps in some examples (e.g., for use in an electric motor powered vehicle) and up to several thousand Amps in other examples (e.g., for use in an ICE powered vehicle). It may also incorporate advanced features like self-discharge compensation. Sensitive electronics may require steady, clean power, so the keep alive MRB 118 may incorporate filtering and regulation circuitry.

In some examples, the battery assembly 102 may be a hybrid battery that combines two different battery chemistries in parallel to take advantage of the benefits of each.

In some examples, the keep alive MRB 118 and primary MRB 106 may utilize different chemistries as desired. For example, the keep alive MRB 118 may comprise a super capacitor or other chemistry optimized for frequent shallow discharge cycles, while the primary MRB 106 may be lithium ion or another chemistry optimized for deep discharge.

Some examples may utilize both the keep alive MRB 118 and the primary MRB 106 operating in parallel, forming a hybrid battery. This allows the combined hybrid battery to exhibit advantageous properties of both battery types. For example, the lithium-ion MRB provides high energy density providing higher stored energy per unit volume and lighter weight, while the lead-acid battery provides high surge current for engine starting. In other examples a hybrid battery may comprise a super capacitor connected in parallel with a chemical battery.

In some examples, the hybrid battery may be controlled by a battery management system (BMS) that can selectively connect or isolate the keep alive battery and/or primary MRB as needed. For example, both batteries could be connected in parallel to start a vehicle engine, providing ample starting current from the lead-acid battery. Once started, the lead-acid battery could be isolated and only the lithium ion MRB used to power driving range and accessories. The BMS manages the switching and charging protocols to optimize performance and lifetime of the hybrid battery. Thus, the hybrid battery combines two complementary chemistries in parallel to provide a single battery system with enhanced performance characteristics. The BMS actively controls connectivity of the two battery elements to maximize capabilities.

In some examples, the keep alive MRB 118 may be built into the BU 104 and is not designed to be replaced, while the primary MRB 106 can be removed and replaced as needed.

The keep alive MRB 118 may, in some examples, be designed to be replaceable, though potentially only as needed (e.g., once every 10 years or longer). To facilitate replacement, the BU 104 may include a trap door or removable panel. This trap door would provide access to the battery terminals and allow the MRB 118 to slide out when opened. For example, the trap door may be located on the side or bottom of the BU 104. To replace the MRB 118, a user opens the trap door using an integrated tab or latch mechanism. The MRB 118 can then slide out of the BU 104, disengaging from the terminals. A new MRB 118 may be slid back into place, contacting the terminals, and the trap door is closed to secure it. The trap door allows the keep alive MRB 118 to remain user-replaceable without needing to be fully removable from the top of the housing. This could provide a more integrated, secure installation while still enabling periodic replacement.

Further the keep alive MRB 118 may be designed for replacement only by a technician with special tools, rather than an end user. For example, the BU 104 or trap door may require disassembly with screwdrivers or other tools to access the MRB 118 for replacement.

In some examples, the keep alive bay is located separately from the main bay 110 to prevent simultaneous disconnection. Intelligent battery management and charging circuitry coordinates power draw and recharging between the MRBs 106 to maintain full system functionality.

The intelligent modular architecture centered around standardized MRBs 106 and BUs 104 enables flexible, scalable electrification across multiple host systems, as will be more fully described below.

Battery Assembly 102—Recessed Slot 406

Figure 2:
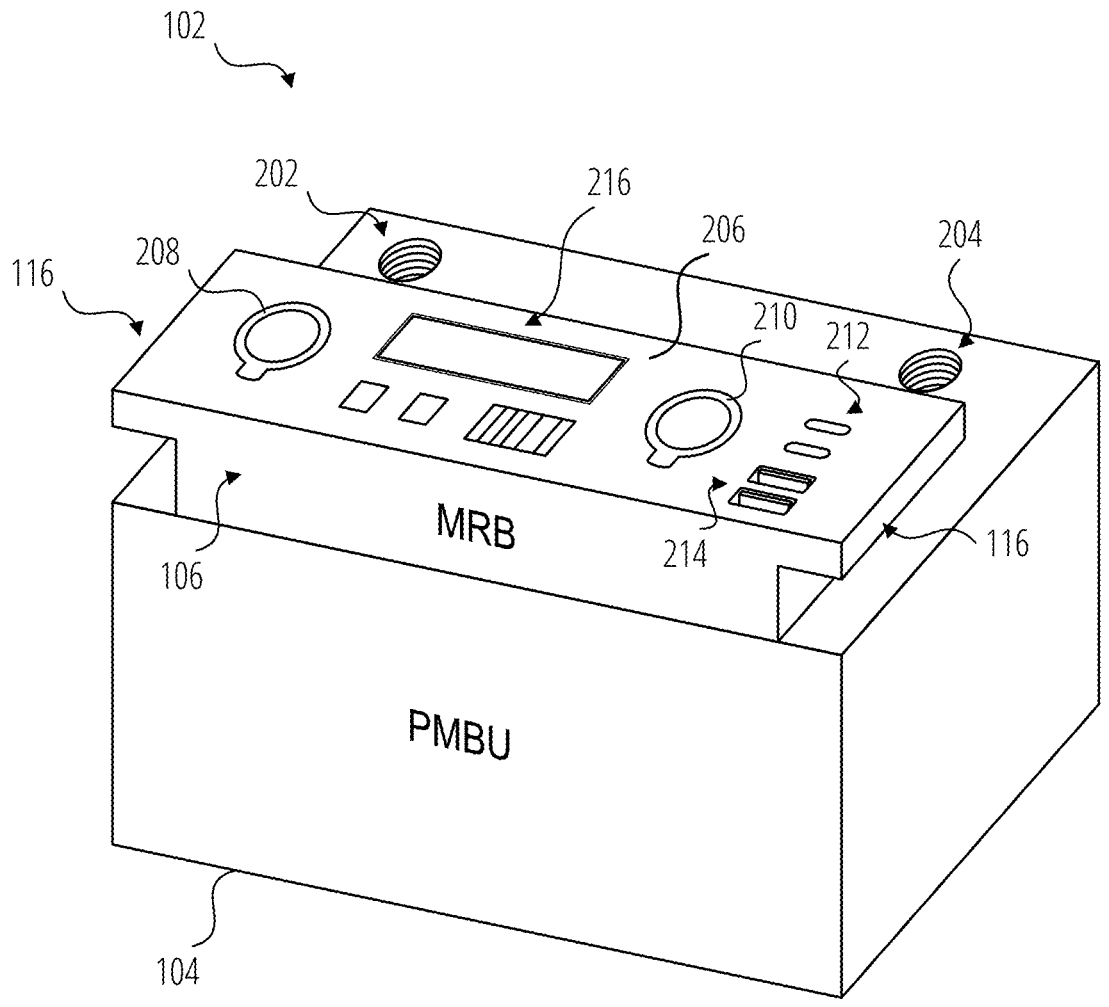
FIG. 2 is a perspective view illustrating a battery assembly, according to some examples.

FIG. 2 is a perspective view of a battery assembly 102, according to some examples. Here, a single MRB 106 is securely mounted within the permanently mounted BU 104, without protruding above its upper surface.

The BU 104, a specific component or device, is equipped with two distinct battery connection points. Point number 202 serves as the negative (−) terminal, while point number 204 functions as the positive (+) terminal for battery connections.

Each of these terminals has been designed to accommodate threaded battery connection posts (which are not depicted here). This means that users can insert and securely fasten a threaded battery connector into either terminal, ensuring proper electrical linkage between the device's power source and its internal components.

This design feature allows for flexibility in connecting various types of batteries with appropriate connectors while maintaining standardized polarity to prevent any potential damage from reversed connections.

Figure 4:
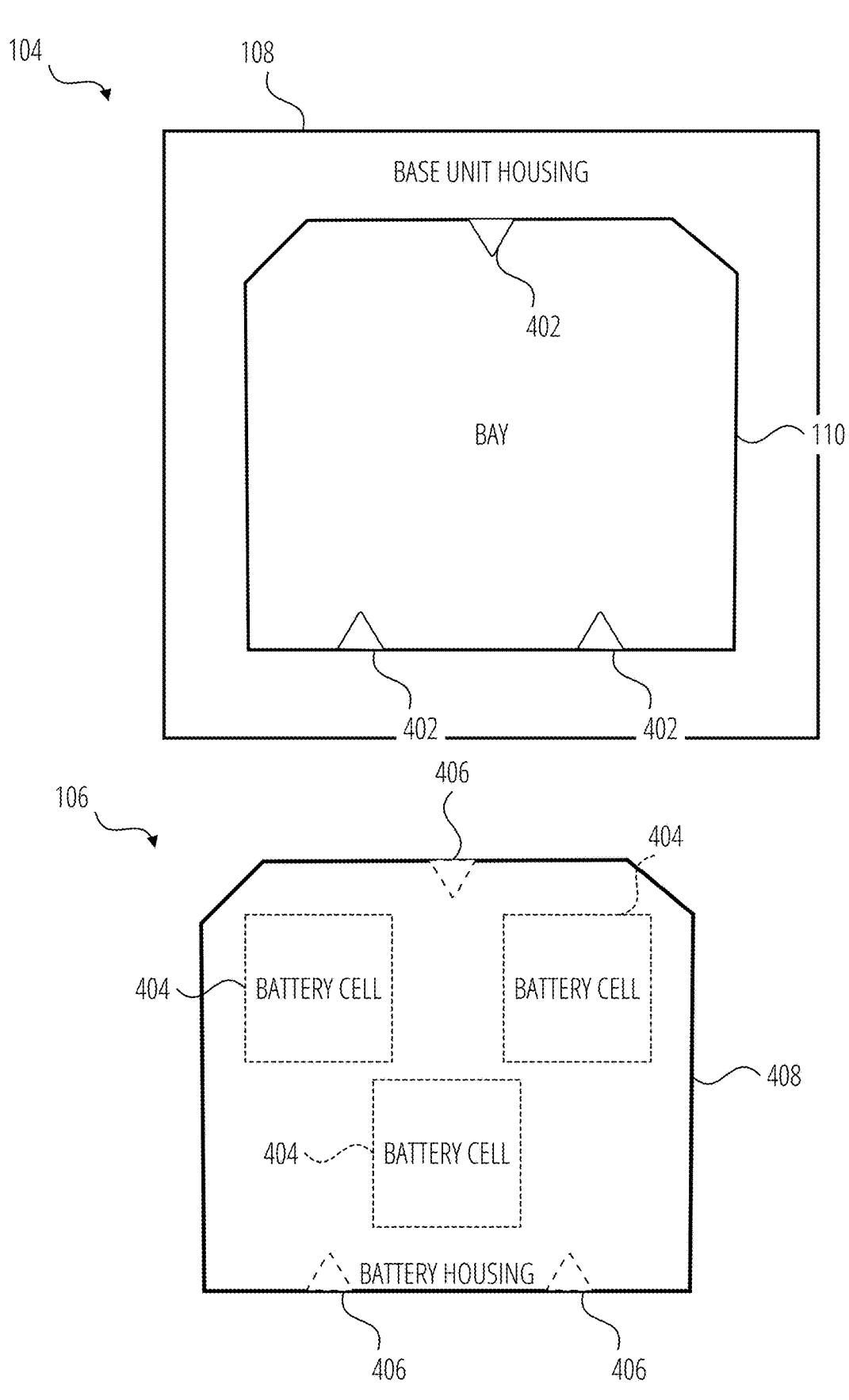
FIG. 4 is a perspective view illustrating a battery assembly, according to some examples.

In FIG. 4, the MRB 106 is housed completely within a base unit housing 108 of the BU 104. The battery housing 408 of the MRB 106 is shaped to conform to the bay 110 and alignment keys 402 ensures proper orientation. Robust electrical connectors 602 provide power transfer between the MRB 106 and the BU 104.

The MRB 106 has carry handles 116 that allow for easy insertion, extraction, and transportation of the MRBs 106.

Figure 31:
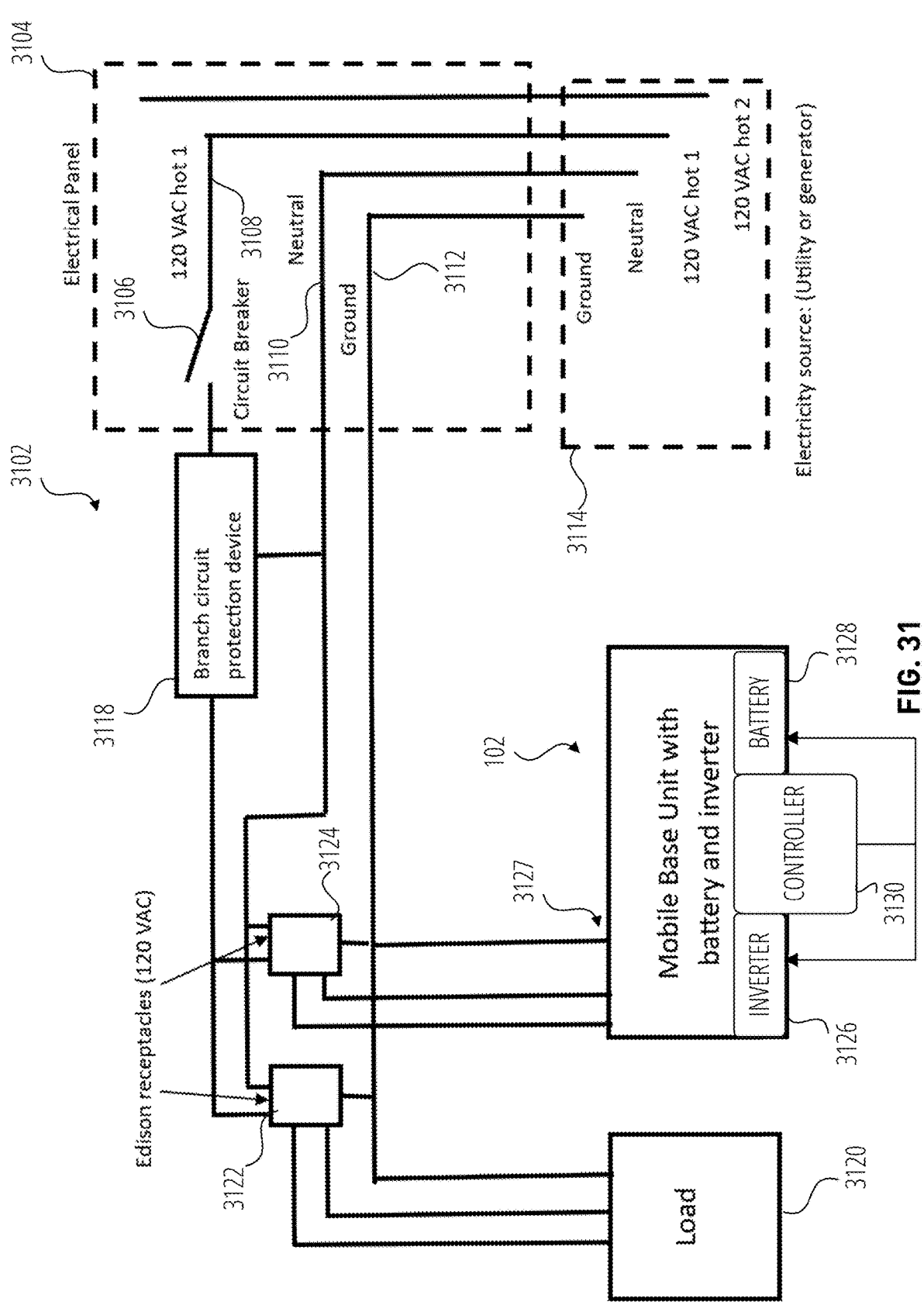
FIG. 31 is a diagrammatic depiction illustrating a connection configuration for a battery assembly to safely provide supplemental electrical power to devices on a branch circuit in a building, according to some examples.

The MRB 106 incorporates multiple connectivity options to accommodate various power input and output requirements, as well as data transfer interfaces. Example specifications of the MRB 106 are outlined below:

12V input connector 208: This connector enables the MRB 106 to be charged from an external electricity source 3114 (FIG. 31). The 12V input connector is designed to accept compatible cables and connectors.

12V output connector 210: The opposite end of the 12V power supply chain is facilitated by this connector, which enables devices connected to the MRB 106 to receive a 12-volt power source for their operation.

USB-C ports 212: The MRB 106 includes two USB-C ports, which are high-speed connectivity interfaces that support data transfer and power delivery. These ports conform to the Universal Serial Bus C (USB-C) standard, offering backward compatibility with legacy USB Type-A devices while providing improved functionality such as faster charging speeds and enhanced data transmission rates.

USB-A ports 214: In addition to the USB-C ports 212, the MRB 106 features two standardized USB Type-A connectors that enable users to connect a wide range of devices with traditional USB interfaces. These ports are compatible with most common peripherals and accessories, such as flash drives, keyboards, mice, and other low-power devices requiring less than the high-speed capabilities provided by the USB-C interface.

By incorporating these diverse connectivity options, the MRB 106 caters to various user needs, offering a comprehensive power supply and data transfer solution for multiple applications while maintaining compatibility with existing accessories and peripherals.

The MRB 106 is further equipped with displays 216 and displays 206, which provide an interface for interaction and feedback. These displays serve example functions:

Informing Users of Status: The displays 206 on the MRB 106 constantly update the user on the status of the device. This includes information such as battery level, charging state, power output, and operational status. Real-time updates ensure that users are always aware of the device's performance and readiness.

Indicating Needed Actions: The displays 216 can prompt users to perform specific actions required for optimal operation of the device. For example, it may indicate when it is time to recharge the battery, connect or disconnect peripherals, or perform maintenance tasks.

Providing Prompts: Interactive prompts guide users through various functions and settings of the MRB 106. These prompts can assist in configuring the device, updating firmware, or adjusting settings to match user preferences or specific operational conditions.

Issuing Warnings: The displays 216 may issue warnings in cases of errors, malfunctions, or potential hazards. For instance, if the device experiences overvoltage, overheating, or low battery levels, the displays 216 may alert the user to take immediate corrective action, thereby preventing damage or unsafe operation.

A flush mount design of the MRB 106 enables the convenient replacement of a buried or inaccessible lead-acid battery in a vehicle or device. For instance, the battery assembly 102 can directly replace a hidden lead-acid battery located beneath manifolds and other engine compartment equipment.

The flush mount design where the MRB 106 fits entirely within the base unit housing 108 of the MRB 106 seeks to provide an advantage for replacing old lead-acid batteries in cramped or confined spaces. Many vehicles have the lead-acid battery positioned in narrow compartments (within or outside of the engine compartment) or buried beneath other equipment like manifolds and hoses. This makes it very difficult to access and replace the battery, often requiring partial disassembly of the surrounding components. The flush mount BU 104 and MRB 106 address this problem by conforming to the same battery profile and connections of a replaced lead-acid battery. This allows the BU 104 to be directly swapped into the same tight battery compartment without needing to alter or remove any surrounding vehicle components. Once the BU 104 is installed, the slim profile MRB 106 can be easily extracted and inserted thanks to the recessed carry handles 116 despite the confined space although it may be necessary to remove surrounding obstacles or move them out of the way. No tools may be needed for the quick connect electrical connectors 602 and alignment key 402 to ensure proper orientation. This simplifies maintenance, as the MRB 106 can be conveniently swapped with a reduced need to disturb hoses, manifolds, etc. that would otherwise block battery access.

The intelligent modular architecture allows the possibility for MRB 106 to be hot-swapped without shutting down host vehicle critical systems, enabled by a secondary battery in the BU 104. The standardized MRBs 106 and BUs 104 provide flexible, scalable electrification solutions across multiple applications and form factors.

Handle 302

Figure 3:
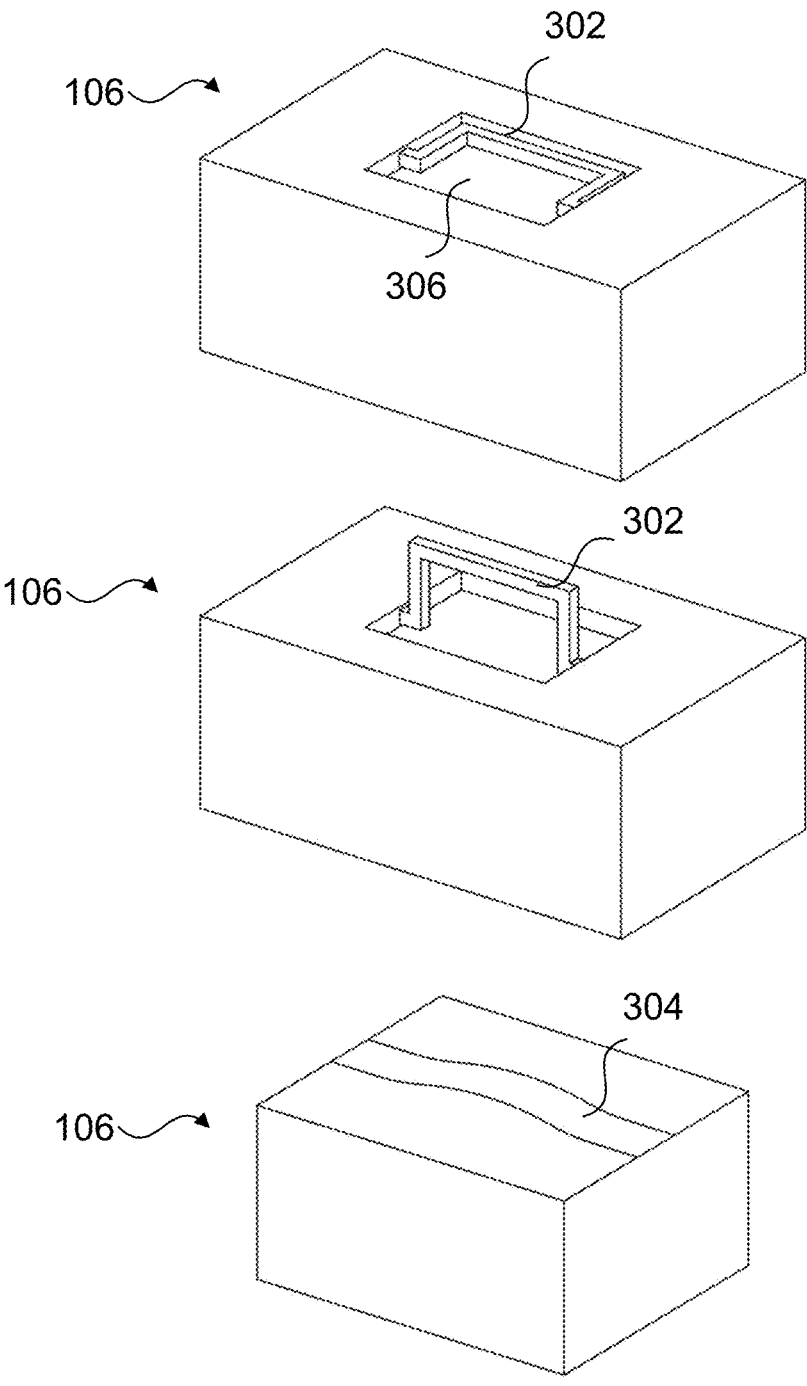
FIG. 3 is a perspective view illustrating a battery assembly, according to some examples.

FIG. 3 is a perspective view of an MRB 106, according to some examples, with carrying structures.

An MRB 106 may have a recessed pivotable handle 302 to facilitate convenient removal and portability. This handle 302 comprises two rigid arms made of steel, aluminum or an appropriate metal or plastic that are joined by a grip crosspiece. The arms pivot along pins that attach them to the inside walls of a recess 306 defined within the plastic casing (e.g., battery housing 408) of the MRB 106. When not in use, the handle 302 resides entirely within the recess 306 so the MRB 106 has a smooth exterior profile.

To deploy the handle 302, the user simply pulls up on the central grip crosspiece. This causes the arms to pivot upwards until they lock in the extended position protruding perpendicular from the casing.

The pivotable handle 302 provides a flush exterior for compact storage and aesthetics. But when needed, the handle 302 can be quickly deployed to turn the MRB 106 into an easy-to-carry unit. This facilitates conveniently transporting MRBs 106 to and from BUs 104, charging stations, or swapping depleted and charged MRBs 106 in the field.

For additional portability, some MRBs 106 may include an integrated flush-mounted carrying strap 304. For example, a nylon webbing strap forms a loop for inserting a hand or hooking to a pole or hoist when lifting the MRB 106. The strap 304 may utilize high-strength fasteners and steel inserts molded into the plastic casing of the MRB 106. In other examples, strap 304 could be passed through molded-in rectangular openings at the edges of the plastic casing of MRB 106.

The integrated handle 302 and strap 304 features allow easy manual manipulation of MRBs 106 without needing external lifting equipment. This maximizes the mobility and usability of the modular battery architecture. The stream-lined industrial design also maintains durability and aes-thetic appeal.

Alignment Keys 402

FIG. 4 shows top views of a BU 104 and an MRB 106, according to some examples.

The BU 104 comprises a rigid base unit housing 108 that defines one or more bays 110 with an asymmetrical trap-ezoidal shape. The bays 110 have multiple alignment keys 402 that extend from the interior walls into the cavity of the bay 110. The shorter, upper surface of the bay 110 has a single alignment key 402, whereas the lower, longer surface has a pair of spaced alignment keys 402 that extend into the interior.

The alignment keys 402 may be constructed from rigid plastic, metal, or composite materials to ensure precise alignment with the MRB 106. Different profiles are possible, such as cylindrical pins, rectangular tabs, or tapered wedges.

The MRB 106 is shown to have an asymmetrical trap-ezoidal shape corresponding to that of a bay 110, and accommodates multiple battery cells 404 in a battery hous-ing 408. The battery cells 404 may use lithium-ion chemistry but other battery chemistries may also be used. The battery cells 404 are electrically connected in series and parallel configurations to provide the required voltage and capacity.

Slots 406, corresponding to each of the alignment keys 402, are defined within the battery housing 408. The asym-metrical shape and alignment keys 402 ensure the MRB 106 can only be inserted in the proper orientation. This prevents reverse polarity connections and damage to the BU 104 or a host system.

The battery housing 408 of the MRB 106 may be con-structed from durable, lightweight materials such as impact-resistant plastics. Internal support structures 704 (FIG. 7) maintain the geometry under loading.

Figure 5:
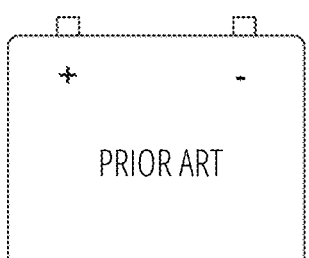
FIG. 5 is a perspective view illustrating a battery assembly, according to some examples.
Figure 5:
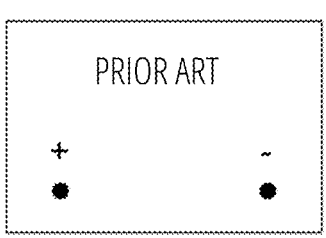
Figure 5:
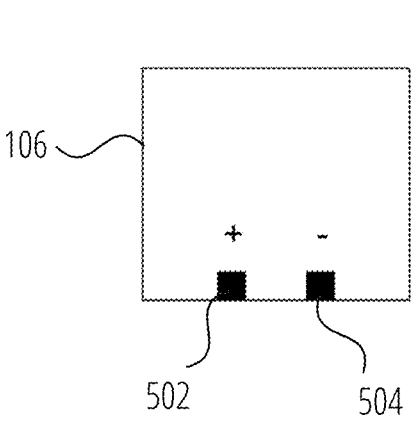
Figure 5:
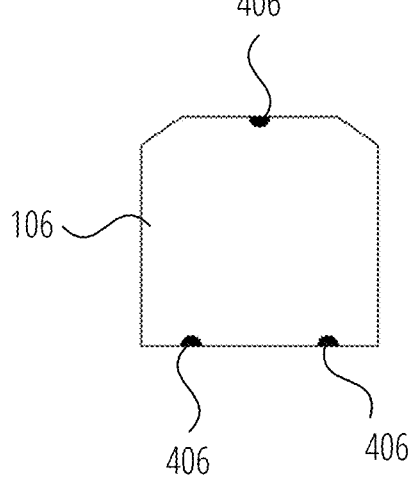
Figure 5:
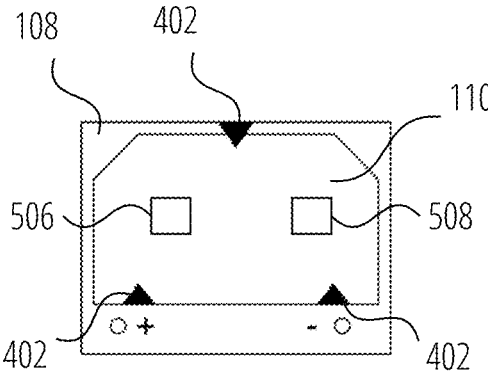

FIG. 5 shows side views and top views of an MRB 106, according to some examples. The top view illustrates the asymmetrical polygon profile of the battery housing 408 of the MRB 106, and the locations of alignment slots 406 within the battery housing 408. The asymmetrical profile and the alignment slot 406 together ensure correct orienta-tion and secure positioning when an MRB 106 is inserted into a bay 110 of the base unit housing 108.

The unique outline of the battery housing 412 mates with the complementary shaping of the bay 110, while the slot 406 receives the alignment key 402 from the base unit housing 108. This keyed engagement system provides proper alignment between the MBU 106 and base unit housing 108, prevents incorrect insertion, and secures the MBU 106 firmly in place.

The side view of the MRB 106 indicates the locations of a positive electrical terminal 502 and a negative electrical terminal 504 (of the electrical connectors 602) on the battery housing 408 which operationally mate with corresponding BU terminals (BU electrical terminal 506 and BU electrical terminal 508) on the interior of a bay 110 when the MRB 106 is inserted and secured within the bay 110. Metal blades, fingers, prongs, tabs, pins, or robust spring-loaded pogo pins, and complementary electrical contact points including spring-loaded receptacles, contact pads, or other electrical connectors 602 make low-resistance, self-wiping and or surface oxide piercing, stable, high current-carrying capac-ity electrical contacts between MRB terminals (positive electrical terminal 502 and negative electrical terminal 504) and BU terminals (BU electrical terminal 506 and BU electrical terminal 508) to complete the high-current elec-trical connections safely. BU electrical terminal 506 and BU electrical terminal 508 are internally electrically connected to external connection terminals enabling electrical connec-tion to the vehicle's electrical system.

FIG. 5 also shows a side view of the base unit housing 108 having a bay 110. Alignment keys 402, extending from interior walls of the bay 110, protrude into the bay 110 so as to enable aligned engagement between the MRB 106 and the base unit housing 108. The alignment keys 402 insert into the slots 406 in the battery housing 408, securing the MRB 106 in a proper orientation for the electrical connections. This keyed physical interface provides precision alignment, enhanced reliability, and simplified insertion for the user.

The shaped and slotted modular battery housing 408, mating base unit bay 110, and protruding alignment keys 402 together form robust physical connectors 604 to accu-rately align, securely mount, and electrically connect an MRB 106 to the base unit housing 108. This creates a safe, reliable, and user-friendly battery swap architecture.

Components of BU 104

Figure 6:
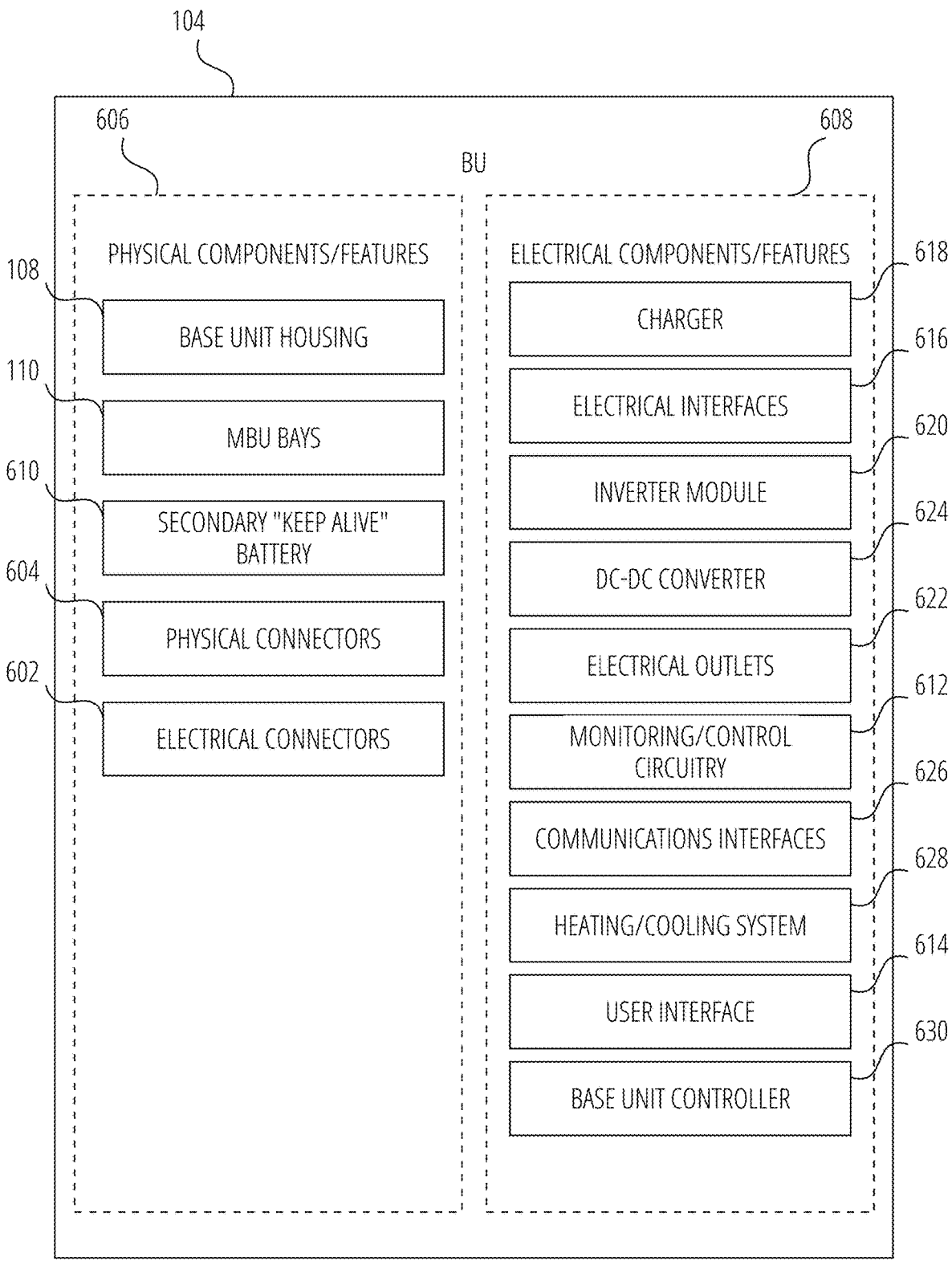
FIG. 6 is a perspective view illustrating a battery assembly, according to some examples.

FIG. 6 is a block diagram illustrating components of a BU 104, according to some examples, having physical compo-nents/features 606 and electrical components/features 608. It will of course be appreciated that components may have both physical and electrical aspects.

The physical components/features 606 include a base unit housing 108 that in turn accommodates contains multiple internal components, including both the physical compo-nents/features 606 and the electrical components/features 608. The base unit housing 108 of the BU 104 is configured to be mounted in a vehicle and provides mechanical pro-tection and mounting points for the base unit components. The base unit housing 108 may be constructed from molded or machined plastic or from machined aluminum or steel or other suitable metals for ruggedness. Additionally, the base unit housing 108 contains features such as openings or mounting plates to facilitate installation in vehicles and connection to electrical systems of vehicles.

Inside the base unit housing 108 are one or more battery unit bays 110, each configured to receive a modular MRB 106 enclosed in a battery housing 408. The bays 110 include alignment keys 402 which align the MRBs 106 during insertion and provide accurate positioning. The alignment keys 402 may include machined rails and receiving channels which have precise tolerances to ensure proper battery fitment. This enables a user to smoothly insert and remove the MRBs 106.

Each MRB 106 comprises, in some examples and as is described in more detail with reference to FIG. 7, an array of lithium-ion battery cells 404 assembled into a battery pack assembly. Different quantities and arrangements of battery cells 404 can be included to achieve the desired system voltage and capacity levels. MRBs 106 are designed to be hot-swappable within the BU 104 and easily replaced in the field without tools. MRBs 106 may utilize cylindrical, pouch or prismatic lithium-ion cells.

The physical components/features 606 of the BU 104 also include a secondary battery 610, which may operate as a "keep-alive" battery. The secondary battery 610 is a small reserve battery that provides power to critical vehicle sys-tems in the event an MRB 106 of the BU 104 becomes fully discharged or is removed from the BU 104. The secondary battery 610 may utilize a lead-acid or lithium-ion chemistry or an energy storage component such as a super or ultra capacitor and is designed to maintain a charge as long as possible. Typical capacity is in the range of 1-10 Amp-hours or higher at 12V (e.g., 12-120 Wh), however, the system voltage may be 12V, 24V, 48V, etc. depending on vehicle type. In some examples, the secondary battery 610 has enough current capacity and energy storage to crank and start an ICE to and supply the off-state loads for a reasonable time (e.g., from a few hours to a few weeks) if the primary MRB 106 is not present or is replaced with a discharged MRB. In some examples, such as in motor driven vehicles or when the primary battery or MRB 106 is capable of starting the ICE on its own, the secondary battery may not be required to crank and start an ICE.

The secondary battery 610 may directly power essential electronics of a vehicle, such as the main control module/ ECU, security system, telematics, and memory/clock circuits that require continuous operation. This maintains functionality and prevents data loss or system reset if the MRB 106 fails or is disconnected. The secondary battery 610 is connected to a dedicated always-on power bus that supplies keep-alive power to critical systems within MRB 106.

Physical or electronically actuated mechanical or solid-state switches, diodes or other circuitry may be included to isolate the MRB 106 from the secondary battery and the vehicle's electronic system. In some examples, battery monitoring/control circuitry 612 may be included to track the voltage and temperature of the secondary battery 610 to generate an alert (e.g., via a user interface 614) if it becomes discharged or damaged. The secondary battery 610 may be integrated into the base unit housing 402 or mounted externally. It charges continuously from a connected MRB 106 or a solar trickle charger/maintainer when the vehicle is not in use. In some examples, an external charging port of the electrical interfaces 616 is provided to allow the secondary battery 610 to be maintained independently as required. Intelligent power management systems switch loads to the secondary battery 610 only when needed to maximize its operating life.

The secondary battery 610 thus serves as an emergency backup power supply to keep essential vehicle electronics powered on even in the absence of an MRB 106 in the BU 104, providing a critical reserve capability and preventing shutdowns or reboots during battery swaps or failures. Continuous float charging and intelligent load switching may be included to optimize longevity over extended service.

The BU 104 may also include various physical connectors 604 and electrical connectors 602 to securely mount the MRB 106 and connect it electrically.

The physical connectors 604 provide robust mechanical mounting of MRBs 106 into the base unit housing 108. Physical connectors 604 may include structural features like alignment keys 402, alignment pins, and retention clips molded into the base unit housing 108 that mate with corresponding features on the battery housing 408. Locking latches, spring clips, and threaded fasteners may also be incorporated to create a rigid interconnection.

The physical connectors 604 retain the MRB 106 in proper positional alignment within the BU 104, prevent vibration/shocks from dislodging it, and facilitate easy insertion and removal by the user. The physical connectors 604 withstand harsh environmental conditions and large numbers of mating cycles (e.g., 100's or 1000's) with acceptable levels of wear or deterioration. Materials are selected to avoid galvanic corrosion between dissimilar metals.

The electrical connectors 602 provide low-resistance electrical connectivity between an MRB 106 and the BU 104 across multiple high-current terminals. Separate electrical connectors 602 may be utilized for the main positive and negative terminals, and suitable alternate connectors may be used for other analog and digital signals as well as internal power supply and ground connections. Electrical connectors 602 for transmitting low power signals between electrical contact points on BU 104 that align with matching contact points on MRB 106 such as analog sensor inputs or outputs, control and/or digital signals may utilize edge connectors, spring-loaded pogo pins, or other self-wiping and or surface oxide piercing electrical contacts. Electrical connectors 602 for transmitting high power and/or high current between electrical contact points on BU 104 that align with matching contact points on MRB 106 may utilize self-wiping male-female connectors with blades, fingers, prongs or tabs and mating receptacles or androgynous connectors (such as Anderson style connectors) with symmetrical opposing fingers, prongs or tabs or other spring-loaded self-wiping electrical contacts.

Redundant connections ensure reliability. The electrical connectors 602 incorporate high-conductivity metals like copper or gold-plated contacts rated for hundreds of Amps. Positive locking and preloaded springs maintain secure connections without overheating. The electrical connectors 602 can withstand vibration, shocks, and temperature swings while maintaining a low-resistance connection capable of safely carrying maximum load currents during engine cranking and vehicle operation as needed in specific applications.

Together, the physical connectors 604 and electrical connectors 602 facilitate a robust, long-lasting mechanical and electrical coupling between an MRB 106 and a BU 104 to give confidence in the battery swap system across demanding conditions.

Turning to the electrical components/features 608, a charger 618 is included with the base unit housing 108 of, or may be external to, the BU 104. The charger 618 is an electrical circuit capable of recharging the modular battery units (MBUs) 106 by supplying electrical energy to replenish the battery cells 404. The charger 618 may be integrated into the base unit housing 108 or implemented as a standalone external charging module.

The charger 618 contains a converter that provides power electronics to convert AC line voltage to the DC levels required by the battery chemistry and charging protocol. For example, the charger 618 may convert 120 VAC to 12 VDC (nominal) and generate the required multi-stage constant-current, constant-voltage profiles for lead-acid, lithium, or other battery chemistries. The charger 618 regulates current and voltage levels to optimize recharge times while avoiding damage to battery cells 404.

The charger 618 interfaces with the battery cells 404 of an MRB 106 internally through electrical interfaces 616 (e.g., connectors) from the base unit housing 108 to the battery housing 408. These electrical interfaces 616 allow bidirectional energy transfer for both charging and discharging an MRB 106. For external charging modules, standardized connectors allow the charger 618 to be connected to the corresponding electrical interfaces 616 on the BU 104. The charger 618 may incorporate temperature sensors and communications interfaces to monitor battery status and terminate charging when complete. The inclusion of an integrated or external charger 618 with each BU 104 provides the capability to conveniently recharge an MRB 106 to sustain the modular, swappable architecture. The charger 618 replenishes an MRB 106 with energy from a source external to the BU 104 (e.g., a vehicle charging system 806 or other external battery) to restore their capacity and prepare them for the next use cycle.

The BU 104 provides various electrical interfaces 616 to connect the MRBs 106 to the vehicle's electrical system, an integrated inverter module 620, and other components. The electrical interfaces 616 distribute power and signals throughout a system (e.g., the system 800 discussed with reference to FIG. 8). The electrical interfaces 616 may include bus bars, wiring harnesses, and connectors to conduct high currents. Signal connections may use industry-standard automotive interfaces.

An inverter module 620 converts DC power from the MRBs 106 into 120V or 240V AC power to run appliances, tools, and other devices by connecting to electrical outlets 622. The inverter module 620 may use a high-frequency H-bridge transformer topology with advanced switching devices to generate the required AC waveform and voltage. For example, a high-frequency H-bridge inverter topology using MOSFETs or IGBTs may provide DC-to-AC conversion. The inverter module 620 switches at 20 kHz+ to output a high-quality sine wave at 60 Hz. For lower power units up to 500 W, a full-bridge topology with 4 switches may be used. For higher power levels up to 3000 W, a half-bridge configuration with 2 switches and a center-tapped transformer may be implemented.

The inverter module 620 may include control and driver circuitry, such as an ASIC or microcontroller plus gate driver ICs. This generates PWM signals to drive the inverter switches and regulate the AC waveform. Feedback loops stabilize voltage and frequency.

For output power capacity, smaller BUs 104 may have 200-500 W inverter modules 620 to power smaller loads like laptops and phones. Larger 2000-3000 W inverter modules 620 would allow powering of household appliances. Multiple AC outlets may be provided on a battery assembly 102.

Inverter modules 620 are designed to operate over the full range of DC input voltage from the MRBs 106. As the lithium cells discharge, a nominal 10-15 VDC range may be covered. Input fusing and filtering may be included. For 240 VAC output, a split-phase configuration with a center-tapped transformer may be used, in which case separate inverter circuits generate two 120 VAC legs 180 degrees out of phase. This enables compatibility with 240 VAC appliances.

A DC-DC converter 624 steps down the nominal battery voltage to lower DC levels like 12V or 5V as needed to charge accessory devices. The conditioned DC current is output via additional electrical outlets 622. The DC-DC converter 624 regulates the voltage precisely.

Monitoring/control circuitry 612 tracks battery state of charge and health, regulates charging/discharging, and provides system diagnostics. The monitoring/control circuitry 612 help optimize performance and life of the MRBs 106. The monitoring/control circuitry 612 may comprise microcontrollers, FPGAs, or ASICs. The monitoring/control circuitry 612 may be programmed to disconnect the electrical connection between BU 104 and the vehicle if the state of charge of one or more or all the batteries drops below a predetermined level in order to preserve battery life as long as possible in the event that the vehicle is not used for a prolonged period of time.

Communications interfaces 626 exchange vital data between components within the BU 104 and with external devices. The communications interfaces monitoring/control circuitry 612 may use automotive standards like Controller Area Network (CAN) bus or wireless protocols like Bluetooth.

A heating/cooling system 628 regulates battery temperature for optimal charging and operation. The heating/cooling system 628 may comprise resistive heaters, cooling fans, and precise temperature sensors.

User interfaces 614 allow users to view system status information and control certain functionality. The user interface 614 may comprise LED indicators, OLED displays, and membrane buttons.

Onboard base unit controller 630 may be included to run operating programs, allow wireless software updates, provide user interface capability, and enable advanced battery management functionality through embedded code.

Components of MRB 106

FIG. 7 is a block diagram illustrating internal components of a shareable MRB 106, according to some examples. The MRB 106 comprises a number of physical components/features 706 and electrical components/features 708.

Turning first to the physical components/features 706, the MRB 106 is shown to include the battery housing 408, one or more battery cells 404, internal support structures 704, one or more carry handles 116, and alignment/guide features 710. Additionally, it includes further physical connectors 732, which provide robust mechanical attachment points, and electrical connectors 734, which ensure secure electrical connections for power transfer and communication between the MRB 106 and the base unit.

The battery housing 408 may be constructed of a rigid, high-strength injection molded plastic such as ABS, PC/ABS, or PPE/PA. Metal inserts may be embedded in the plastic for enhanced fastening capability. The battery housing 408 is designed as appropriate to withstand mechanical shock, vibration, dust, moisture, and temperature extremes encountered in vehicular and outdoor use.

The alignment/guide features 710 may include slots 406 are integrated molded features running longitudinally along the sides of battery housing 408. The slots 406 interface with corresponding alignment keys 402 in the BU 104 to provide precision alignment as the MRB 106 is inserted and removed. The interface between slots 406 and bay alignment keys 402 maintains positional accuracy within 0.1-0.5 mm in the x/y/z directions depending on specific product requirements.

The battery cells 404 may be high energy density lithium-ion cells such as lithium-iron phosphate (LiFePO4), lithium manganese oxide (LiMn2O4), lithium-nickel-manganese-cobalt oxide (NMC), Lithium Nickel Cobalt Aluminum Oxide (NCA), Lithium Nickel Cobalt Aluminum Oxide (NCA), Lithium Cobalt Oxide (LCO), and Lithium Titanate (LTO) with liquid or solid-state electrolyte. One or more individual battery cells may be wired together in series and/or in parallel forming a battery pack capable of providing the voltage and current capabilities desired for each specific application. Individual battery cells 404 may be packaged in cylindrical metal cans, pouches, or prismatic aluminum enclosures. High electrical conductivity metallic (e.g., copper, copper alloy, nickel-plated copper, aluminum) interconnects (e.g., tabs, bus bars, wires) are welded or otherwise mechanically and electrically attached to the cell terminals to connect them together in series and parallel blocks. The quantity and arrangement of cells battery cells 404 is selected to generate the desired system voltage and capacity. For example, a 48V 20 Ah battery pack may comprise 16 lithium-ion or NMC cells in series, each cell being 3.6V and 20 Ah rated. Alternatively, a nominal 12V battery pack may comprise 4 lithium iron phosphate (LFP) cells in series (each with a nominal cell voltage of 3.2V)

providing an overall voltage of 12.8 V. Additional cells can be added in parallel to achieve a desired total stored energy and current capacity.

A carry handle 116 enables a user to conveniently carry and handle MRB 106, for transport, and also for insertion or extraction from a BU 104.

Internal support structures 704 use, for example, interlocking plastic frames with integrated alignment features to securely retain the battery cells 404 and circuit boards. The internal support structure 704 may be designed to meet specific product requirements such as automotive standards such as being able to withstand 20G vibration and 100G shock pulses. Polymeric damping materials may be added for noise reduction.

Tuning now to the electrical components/features 708, a battery management system (BMS) 702 may continuously monitor cell voltages of the battery cells 404 and individual cell currents (monitoring accuracies and resolutions are specified as needed to meet specific product requirements, e.g., cell voltage to ~5 mV and cell current to ~10 mA) using precision analog interface circuits connected to each battery cell 404. Temperature sensors may track cell temperatures to within 1° C., for example. The battery management system (BMS) 702 may actively balance cells as needed by shuttling current via switches or passive elements to prevent under/over voltage conditions and maximize capacity.

A battery management system (BMS) 702 may provide monitoring and protection at the individual cell level. The functions and components of the battery management system (BMS) 702 may be distributed within the BU and the primary and secondary batteries and may contain specialized integrated circuits and embedded software algorithms to provide key functions including:

Cell balancing—The battery management system (BMS) 702 continuously monitors the voltage of each battery cell 404 in an MRB 106 and activates bypass circuits as needed to shuttle energy from higher charged cells to lower charged cells via passive cell balancing components 712. This balancing maximizes overall pack capacity and life.

Over/under voltage protection—If any cell voltage exceeds preset limits, the battery management system (BMS) 702 can trigger shunt circuits to dissipate excess energy or open switching circuits to disconnect the MRB 106. This protects against damage from overcharging or over-discharging.

Overcurrent protection—Current sensors allow the battery management system (BMS) 702 to disconnect the pack using safety components 714 such as fuses or electronic or electromechanical actuated switches if electrical current exceeds safe thresholds. This prevents catastrophic battery failures from excessive current draw.

Temperature monitoring—Distributed temperature sensors enable cell-level monitoring. The battery management system (BMS) 702 reduces charge/discharge rates or disconnect the MRB 106 if temperatures rise above safe operating limits.

Voltage measurement—The battery management system (BMS) 702 digitizes and sums the voltages across each battery cell 404 to determine overall pack voltage. Current sensors provide pack current data.

State of charge estimation—Using the cell data, the battery management system (BMS) 702 runs algorithms to estimate state of charge and remaining run time.

Control/monitoring electronics 716 measure overall battery voltage, current draw, temperature, and other parameters. The control/monitoring electronics 716 may comprise a dedicated microcontroller and interconnect with the battery management system (BMS) 702 via a standardized protocol like SMBus. Monitoring data can be used to determine the state of charge, time remaining, and charging status with high accuracy.

Passive cell balancing components 712 may comprise precision high-wattage resistors connected in parallel with each battery cell 404. The resistors bleed off excess charge from cells at higher voltages to prevent them from overcharging and reaching upper voltage limits sooner than weaker cells. This enables consistent utilization of full pack capacity.

A thermal management system 718 may comprise temperature sensors in contact with battery cells 404, heat sink plates, and variable speed cooling fans. Fans may be added to force airflow through channels in the plates to maintain cell temperatures within an optimal range (e.g., 15-35° C.) to maximize charging efficiency and cell lifespan.

Safety components 714 may include multiple levels of overcurrent protection. For example, resettable fuses and bimetallic thermal breakers may provide short circuit and over temperature protection. Latching contactors may permanently open under severe overcurrent faults above 500 A. Protections may be independently implemented to prevent cascading failures.

Electrical interfaces 720 may utilize high conductivity copper, copper alloy, or plated (e.g., with gold, silver, or nickel) contacts designed to accommodate analog or digital signals or carry up to hundreds of Amps continuously and thousands of Amps peak during engine cranking. Electrical connectors may be provided for both high-current, high-power connections and low-power, low-current connections. Electrical connectors may use the same contactors for all connections or may be mixed with some providing high-current, high-power connections and some providing low-power, low-current connections for analog and digital signals and internal electronics power supplies and ground.

A security/authentication system 722 may use cryptographic identity authentication and encryption to prevent unauthorized usage of the MRB 106. The security/authentication system 722 may exchange security certificates with the BU 104 and disables functionality if the public key is invalid, indicating the devices have not been paired. The security/authentication system 722 may include a dedicated security IC chip with built-in key storage.

A state of charge indicator 724 may include a linear array of RGB LEDs to display remaining capacity. For example, the LED colors may range from green to amber to red as charge decreases. The LED brightness may vary with capacity and also flash when nearing fully discharged.

Data storage 726 may comprise a microcontroller-interfaced EEPROM IC with capacity to log over 10,000 charge/discharge cycles along with time stamps and operating conditions like temperature extremes. The data storage 726 may assist in analyzing battery usage patterns and lifespan characteristics.

Further, the electrical components/features 708 include display panels 736, which provide detailed visual feedback and information about the battery status, such as current charge level, voltage, temperature, and operational parameters. These panels may also display diagnostic information, error messages, and maintenance reminders to ensure optimal performance and longevity of the battery. Additionally, annunciators 738 offer audible alerts or notifications to indicate specific conditions or warnings, such as low battery charge, overheating, or connection issues. These alerts help users quickly identify and address potential problems, enhancing the safety and reliability of the battery system.

Charger 618

Figure 8:
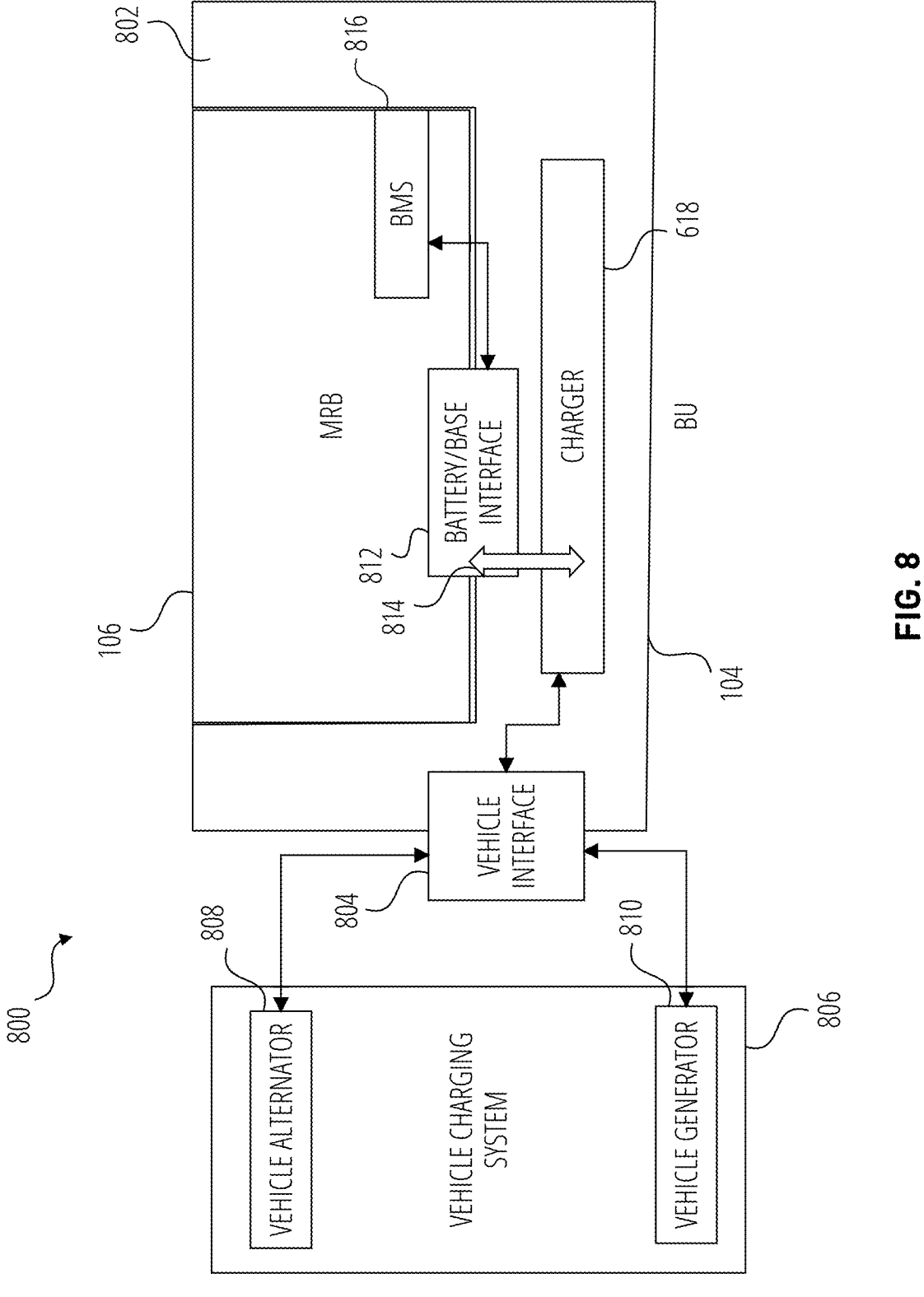
FIG. 8 is a block diagram illustrating a system for charging a removable modular replaceable battery in a base unit, according to some examples.

FIG. 8 illustrates a block diagram of a system 800 for charging a removable MRB 106 in a BU 104, including a charger 618, according to some examples.

The system 800 comprises an MRB 106 inserted into a base unit housing 802. The base unit housing 108 is installed in a vehicle in place of a conventional lead-acid battery and connected to the vehicle's electrical system.

A lead-acid vehicle charging system 806 connects to the base unit housing 108. This provides a nominal 12.6-14.5 V supply when the vehicle alternator 808 or vehicle generator 810 is operating. Vehicles may be equipped with differing charging systems depending on vehicle type and the batteries that their charging system was set-up to charge. For example, flooded lead-acid, AGM, Gel, and Lithium-ion batteries each call for different charging profiles and the charging profile on the vehicle should ideally be matched to the battery that has been installed.

A charger 618 is shown to be located within the base unit housing 802. The charger 618 adapts the 14V lead-acid vehicle charging system 806 to properly charge, for example, a lithium-ion MRB 106.

A charger 618 is shown within the base unit housing 802. The charger 618 adapts the 14V lead-acid vehicle charging system 806 to properly charge, for example, a lithium-ion MRB 106. For the example of an MRB comprising a 4-cell series-connected lithium iron phosphate battery (LFP), the charger 618 adjusts the charging voltage and charging current to ensure compatibility with the batteries installed in MRB 106 and to not overload the vehicle's alternator and or voltage regulator or the battery. This may, in some examples, be done with a buck converter topology, using a high-efficiency synchronous buck regulator IC. The charger 618 regulates charging voltage and limits charging current to safe levels and implements the multi-stage lithium charging profile as required for the battery cells utilized in a specific MRB.

The charger 618 may also limit the maximum charging current via a sense resistor and current amplifier feeding back to the regulator control loop. This prevents lithium cell damage from excessive current. Additionally, the charger 618 may implement a multi-stage charging profile suited to lithium cells, transitioning from constant current to constant voltage charging once the target voltage is reached. The stages and voltage/current levels may be programmed into a regulator IC.

To adapt to different lithium cell counts or different battery chemistries in an MRB 106, the charger 618 may also be configurable to output voltages and currents. The battery management system (BMS) 702 of an MRB 106 (or the base unit controller 630 of the BU 104) may communicate the cell count or other information to the charger 618 to adjust the charging profile accordingly.

The charger 618 is designed for robustness to protect the lithium cells from electrical noise and transients in the automotive environment. Components like fuses, TVS diodes, filters, transient suppression devices discussed elsewhere in this document, and shielding may be included.

In some examples, the charger 618 may be implemented as an external module or component (as opposed to the internal component of the BU 104) and be connected between the existing lead-acid vehicle charging system 806 and the base unit housing 108. The charger 618 adapts the electrical interface appropriately.

The charger 618 enables drop-in replacement of lead-acid batteries with lithium MRBs 106. The charger 618 adapts the charging system 800 for safe, efficient charging of the configuration of battery cells used in the MRB. Diagnostic capabilities provide user feedback and protect the lithium battery investment. In some examples, a circuit may be included to bypass the charger during times when the battery is being discharged such as during engine starting or the need to power load when the ICE is off.

Battery/Base Interface 812

A battery/base interface 812, according to some examples, includes data connections 814 between the MRB 106 and base unit housing 108 which allow battery state and diagnostic data to be exchanged. This supports smart charging and monitoring. The battery/base interface 812 is operationally supported by, or includes the electrical interfaces 616 of the BU 104 and the electrical interfaces 720 of the MRB 106.

The data connections 814 between the MRB 106 and the BU 104 may be implemented in several ways For example, a dedicated physical data bus using a multi-contact connector carrying various data and control signals between the battery management system (BMS) 702 and the base unit controller 630. A standard bus protocol like Inter-Integrated Circuit (I2C) or Controller Area Network (CAN) may be implemented on a 10-20 pin connector. This allows rich data exchange between the modules for monitoring and control of the battery state. For example, battery state, diagnostics data, and control commands may be exchanged between the battery management system (BMS) 702 and the base unit controller 630. More specifically, a multi-contact connector with 10-20 pins may be used to connect the BU 104 and the MRB 106. This connector carries various data and control signals between the modules.

Considering an example where the I2C standard may be implemented, I2C uses two bidirectional contacts for clock (SCL) and data (SDA). The battery management system (BMS) 702 may act as an I2C slave device, with the base unit controller 630 as the I2C master. The battery management system (BMS) 702 may further have an I2C slave controller integrated circuit that interfaces with the battery cells and other monitoring hardware. It thus responds to I2C read/write commands from the base unit controller 630 to exchange data. Data sent from the Battery Management System (BMS) to the Permanently Mounted Base Unit (PMBU) may include:

Battery voltage

Individual cell voltages

Battery current and power

Battery temperature

State of charge (SOC)

State of health (SOH)

Fault conditions

The base unit controller 630 may periodically poll this data over I2C to monitor the MRB 106 state. The base unit controller 630 may also send configuration commands to the battery management system (BMS) 702 over I2C, such as setting charge current limits.

The CAN bus protocol may also be used for robust communications. CAN uses a 2-wire differential bus and advanced message framing and arbitration techniques.

The dedicated physical data bus with an I2C, CAN, or similar interface enables rich data exchange between the MRB and PMBU for smart battery management, monitoring, and diagnostics.

The battery/base interface 812 may also include wireless interface like Bluetooth Low Energy to periodically exchange battery state data between the battery management system (BMS) 702 and base unit controller 630 without physical connections. Wired connections may still be needed for high currents.

In some examples. The battery/base interface 812 may also support power line communication that encodes data signals on top of the DC power transmission between the MRB 106 and BU 104 (e.g., via the electrical interfaces 616 and electrical interfaces 720). This leverages existing electrical links but limits data rates.

The base unit controller 630 may also implement wireless interfaces like WiFi or cellular to convey system state information externally to devices like smartphones for remote monitoring.

Figure 9:
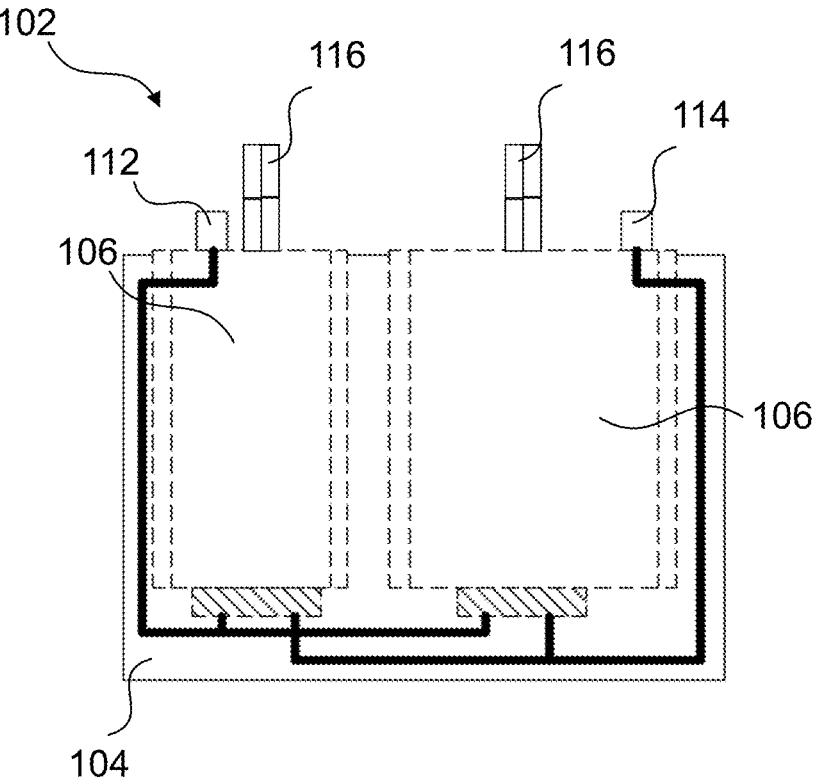
FIG. 9 is a side view illustrating a configuration of a battery assembly, according to some examples.
Figure 9:
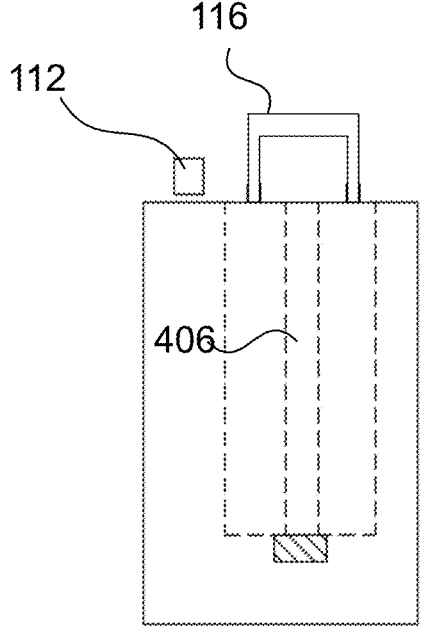
Figure 10:
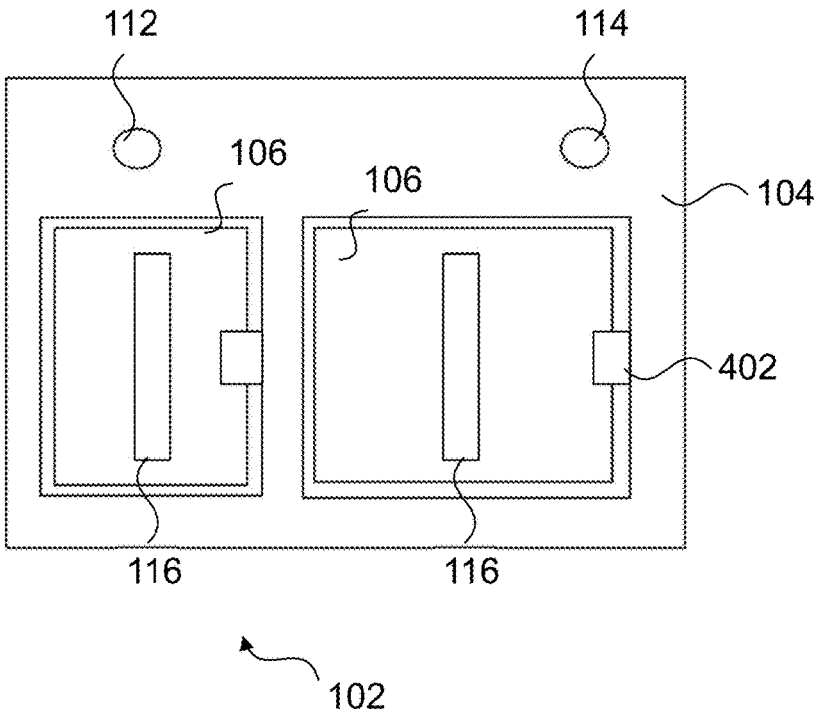
FIG. 10 is an end view illustrating a configuration of a battery assembly, according to some examples.
Figure 10:
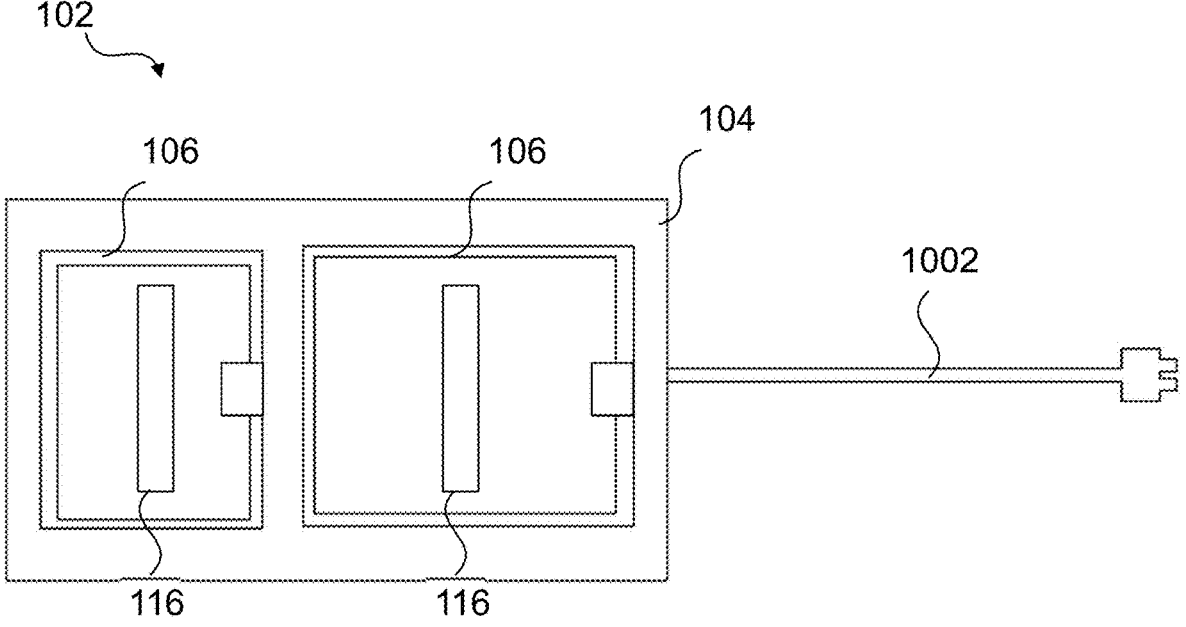

FIG. 9 and FIG. 10 illustrate various views of a configuration of a battery assembly 102, according to some examples. With reference to FIG. 9, a side view shows that the battery assembly 102 comprises a pair of MRBs 106, each of a different size, and accommodated within respective bays 110 defined within the BU 104.

Each MRB 106 has a carry handle 116 to enable convenient transportation, insertion, and extraction of the MRB 106 from the BU 104 by a user. The carry handles 116 provide easy portability so that depleted MRBs 106 can be easily swapped for charged replacements.

The base unit housing 108 is also shown to have a pair of terminals, namely negative terminal 112 and positive terminal 114, that are conveniently connectable to leads 808, 810 (FIG. 8) of a vehicle or other machine to supply electrical charge from the battery assembly 102.

BUs 104 operationally mate connect/disconnect electrical connectors 602 with corresponding connectors of the electrical connectors 734 (FIG. 7) on each MRB 106. The quick connect/disconnect electrical connectors 602 provide safe, robust electrical links between the BU 104 and the MRB 106 to deliver high currents required for engine starting and vehicle operation.

The end view of the battery assembly 102 also illustrates the alignment structure comprising the slots 406 and alignment keys 402. The slots 406 on the battery housings 408 of an MRB 106 receive the alignment keys 402 in the bays 110 of a BU 104 to ensure precise orientation and secure retention of the MRB 106.

This alignment system allows an MRB 106 to be hot-swapped easily while maintaining correct positional and electrical connection. The battery assembly 102 combines multiple MRBs 106 in a flexible, scalable architecture.

FIG. 10 also shows a battery assembly 102 having an electrical power source connection 1002 that allows for charging and discharging on the MRBs 106 within the BU 104 of the battery assembly 102.

Figure 11:
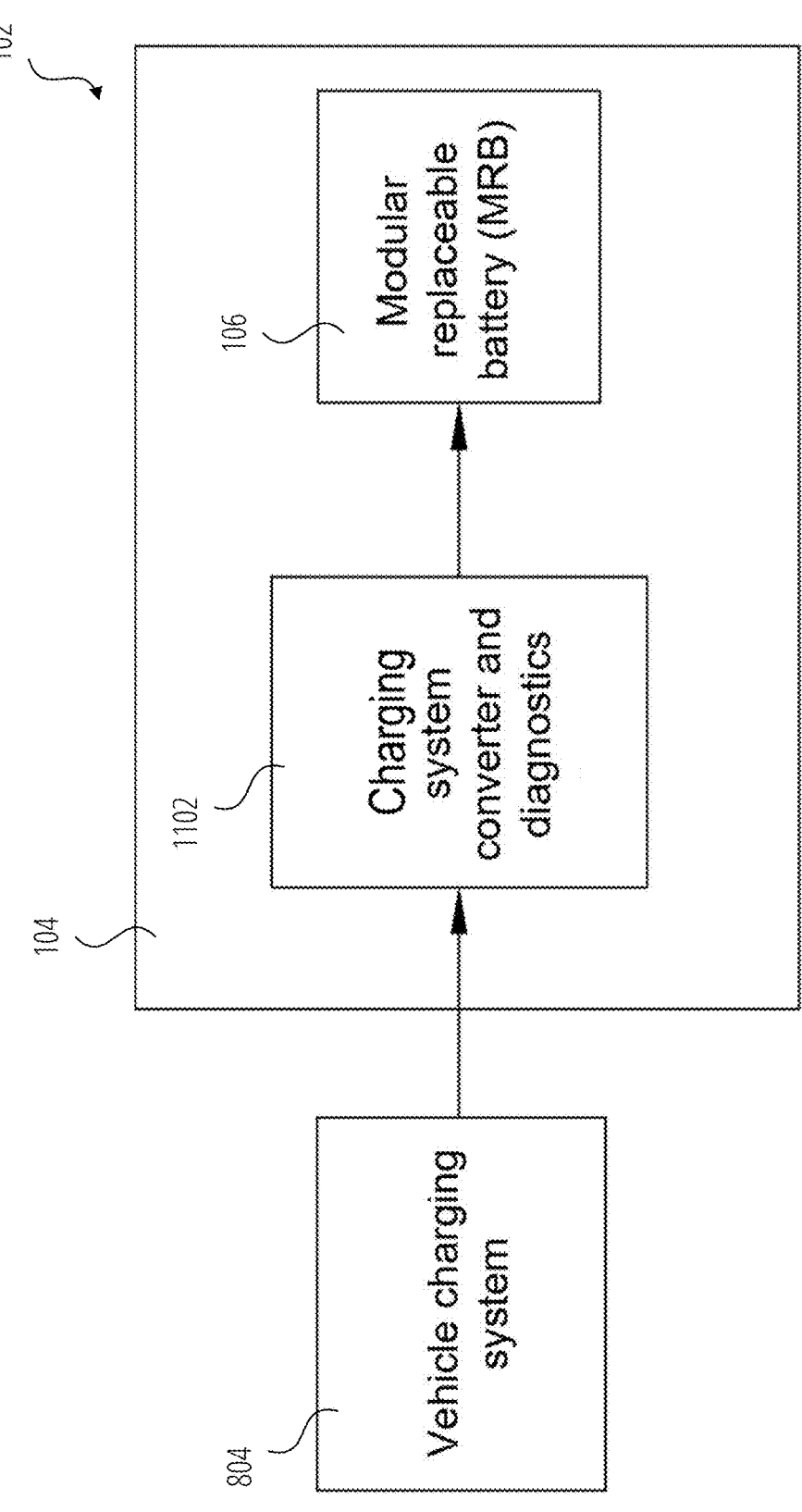
FIG. 11 is a block diagram illustrating a battery assembly installed in a vehicle and connected to a vehicle charging system, according to some examples.

FIG. 11 shows a block diagram of a battery assembly 102, according to some examples, as installed in a vehicle and connected to a vehicle charging system 806 to enable charging of the battery units (MRBs 106).

As noted above, the battery assembly 102 contains a rigid base unit (BU 104) that is designed to be permanently mounted in place of a standard lead-acid battery in the vehicle. The BU 104 mechanically and electrically interfaces with the vehicle's existing battery cables and mounting points for seamless integration.

Inside the BU 104 is an integrated charging system 1102 that connects to the vehicle's 12V, 24V, 48V, etc. vehicle charging system 806, which may consist of an alternator and voltage regulator. The charging system 1102 contains specialized power electronics circuitry to convert the vehicle charging system's DC output to the required voltage and current levels to safely charge the MRBs 106 based on their lithium battery chemistry and capacity specifications. It may also contain circuits distributed between the BU 104 and the MRBs 106 that allow the batteries to be hot-swapped at differing states of charge and circuitry that bypasses the charging circuitry and routes battery power directly to the vehicles electrical system in order to start and ICE.

For example, the integrated charging system 1102 may contain a buck-boost converter topology to efficiently adjust the charging voltage and charging current profiles to ensure compatibility with a nominal 12V lithium iron phosphate (LFP) MRB 106.

The integrated charging system 1102 may also incorporate monitoring and diagnostics capabilities to track battery state of charge (SoC), cell voltages, temperatures, and other parameters. This data helps optimize the charging process and provides the user with battery status information via a display or interface.

By integrating an intelligent charging system 1102 within the permanently mounted BU 104, the battery assembly 102 enables drop-in replacement of standard lead-acid batteries with lithium MRBs 106 that can be charged quickly and safely using the existing vehicle charging infrastructure.

Figure 12:
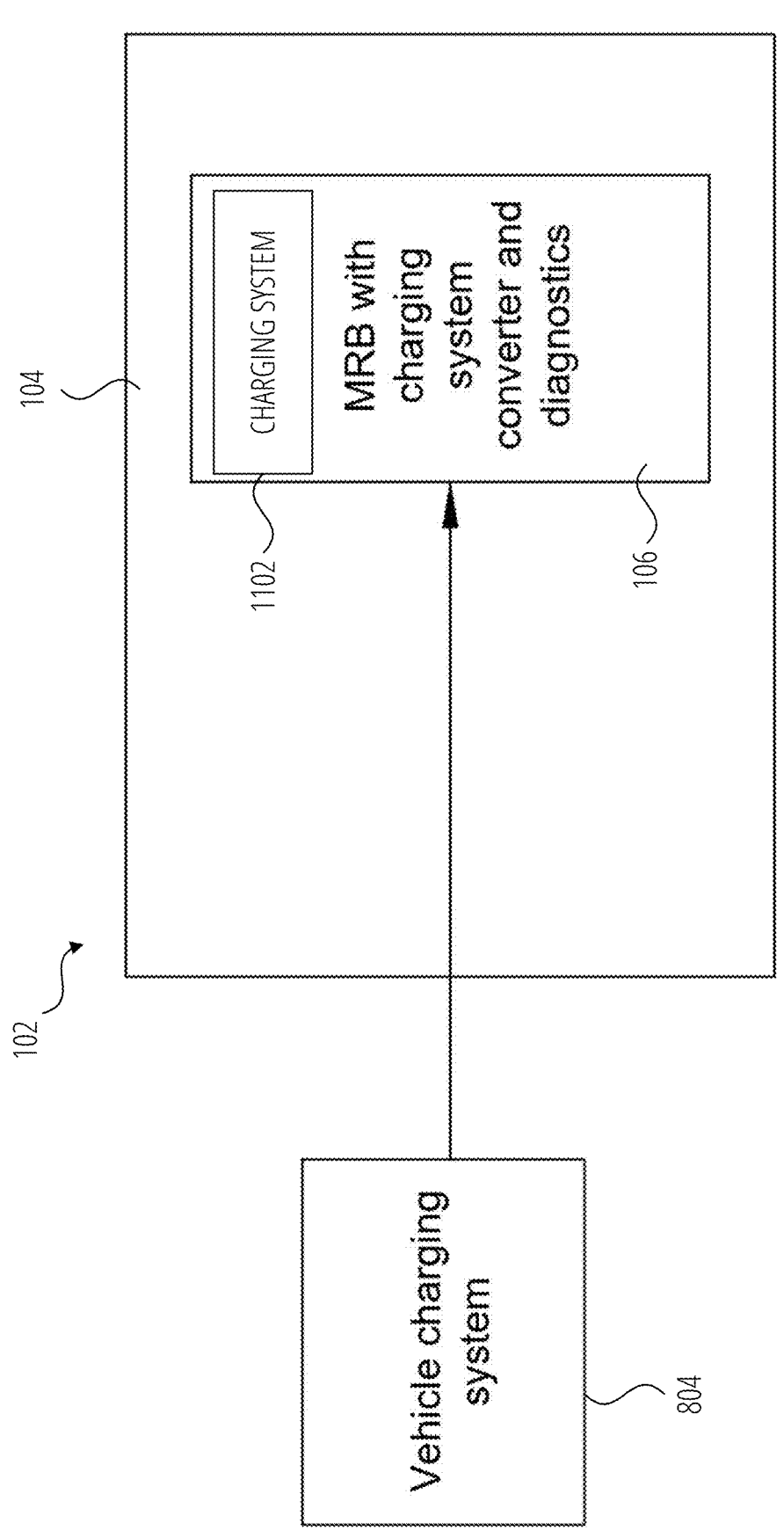
FIG. 12 is a block diagram illustrating a battery assembly, according to some examples.

FIG. 12 shows a block diagram of a battery assembly 102, according to some examples, with the charging system 1102 components integrated into the swappable modular replaceable battery (MRB 106) rather than the BU 104.

Inside the removable MRB 106 is a charging system 1102 that may comprise a DC-DC converter and battery management electronics. The converter adapts the voltage and current available from the vehicle charging system 806 to the levels required to safely charge the MRB's lithium battery cells\. The converter may also include circuitry and components such as diodes, solid-state switches, or electromechanically operated relays that allow current to flow from the MRB as needed such as when the vehicle's charging system is not active, e.g., when the vehicle's ICE is off or at times when the vehicles power demand exceeds the output of the vehicles' charging system. A battery management system (BMS) 702 monitors cell voltages and temperatures to control charging and prevent damage.

With the charging system 1102 integrated into the swappable MRB 106, the batteries can be charged from the vehicle alternator regardless of which bay 110 of a BU 104 they are inserted into. The modular architecture ensures charging compatibility and flexibility.

Diagnostic data stored in the MRB 106 provides insights into the battery usage history and charging profiles.

Inverter Module 620

Figure 13:
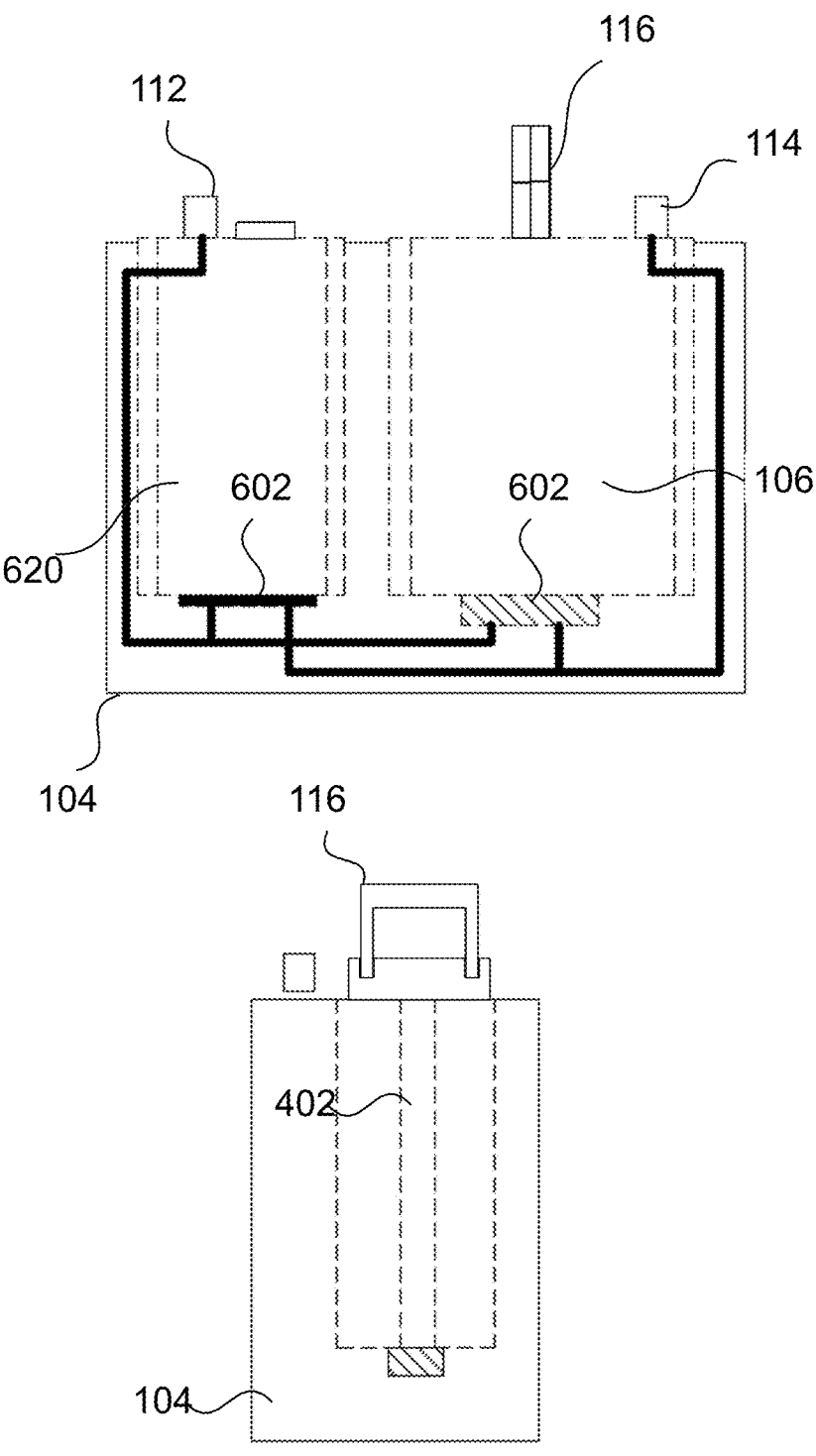
FIG. 13 is a side view and an end view illustrating a battery assembly having a base unit, a modular replaceable battery, and an inverter module, according to some examples.

FIG. 13 provides side and end views of a battery assembly 102, according to some examples, having BU 104, an MRB 106, and an inverter module 620. The BU 104 defines a bay 110 into which the MRB 106 is removably locked.

The inverter module 620 may be permanently or removably secured within the BU 104, and is accommodated within a second bay 110 of the BU 104. Connections within the BU 104 establish the connection between the MRB 106, the inverter module 620, and the terminals (negative terminal 112 and positive terminal 114).

Figure 14:
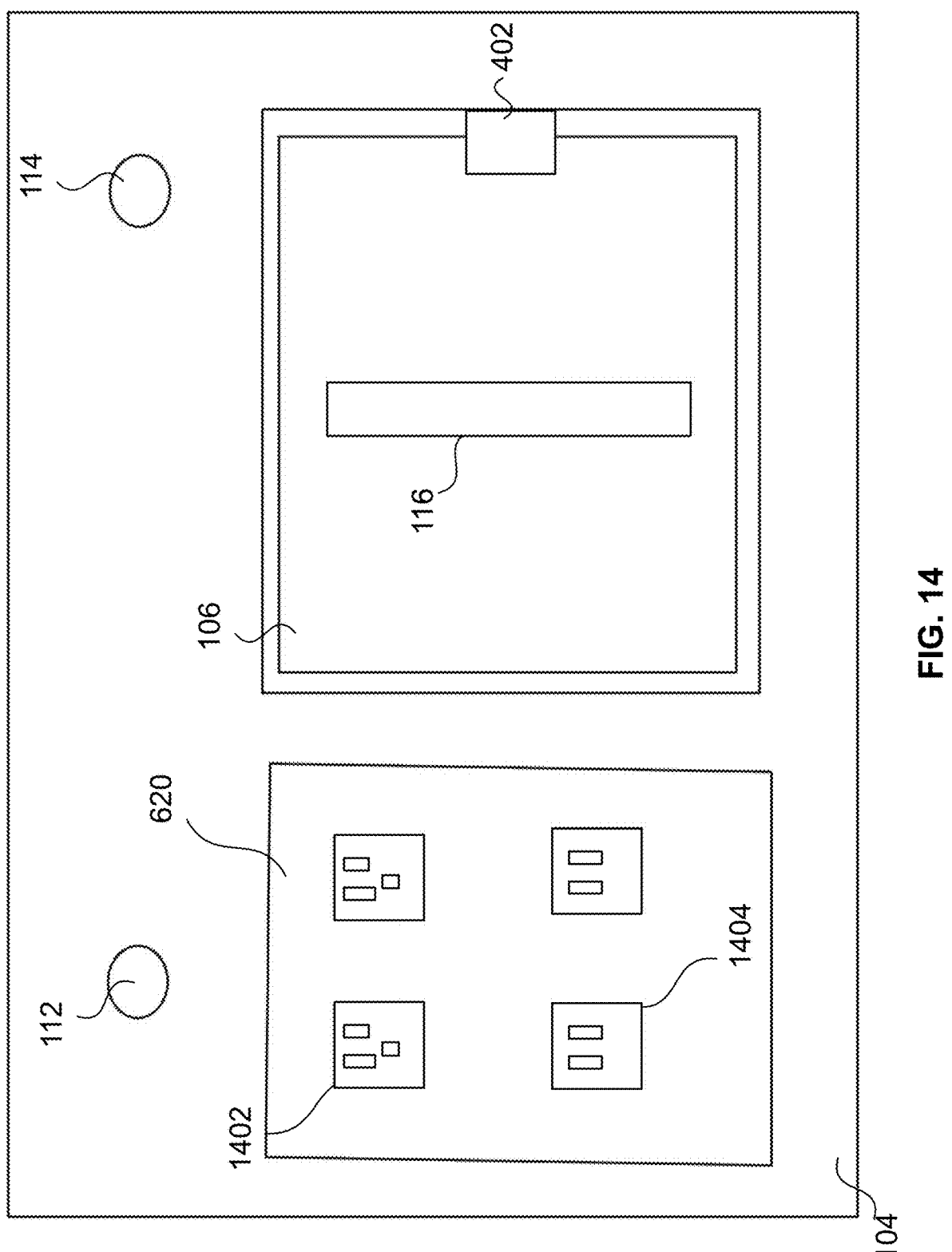
FIG. 14 is a block diagram illustrating a battery assembly having a base unit with multiple modular replaceable batteries and a 12V power supply or charger, according to some examples

FIG. 14 is a top view of the same battery assembly 102 depicted in FIG. 13. It displays the top panel of the inverter module 620, which features Edison receptacles 1402 for powering 120-volt AC devices. The inverter module 620 also includes multiple battery-charging output connector 1404 that provide 12-volt AC output to power other devices.

As noted above, the inverter module 620 converts the DC power from the MRB 106 into standard 120V AC power that can be used to operate various appliances, tools, and devices. The inverter module 620 may use a high-frequency H-bridge transformer topology with switching components to generate a stable, regulated 120V AC waveform from the DC input. The switching components may be implemented using high-power MOSFETs or IGBTs.

The inverter module 620 may also incorporate control and monitoring circuitry including microcontrollers, voltage and current sensing, driver circuits for the switching devices, and safety mechanisms like overcurrent protection.

The inverter module 620 electrical connections may include:

Input connections to the MRB 106 positive and negative terminals to receive DC power. These connections are made internally within the BU 104 and may involve cabling, busbars, or other conductors rated for high current capacity.

Output connections to the Edison receptacles 1402. These wiring harnesses deliver the generated 120V AC power to standard NEMA 5-15 or 5-20 outlet receptacles for connecting appliances and devices. The Edison receptacles 1402 are high quality commercial and industrial grade to support prolonged use.

Connections to the battery-charging output connector 1404. Additional circuitry like DC-DC converters within the inverter module 620 generate 12V DC power from the input from the MRB 106. This 12V DC output is provided on automotive style power outlets or circular connectors to enable charging or powering 12V equipment and accessories.

The inverter module 620 is designed for high efficiency to minimize power losses. Some examples may incorporate maximum power point tracking (MPPT) to optimize the DC input voltage from the MRB 106 for efficiency. Thermal management like cooling fans maintains safe operating temperatures under high electrical loads.

Dual MRBs 106 and an Inverter Module 620

Figure 15:
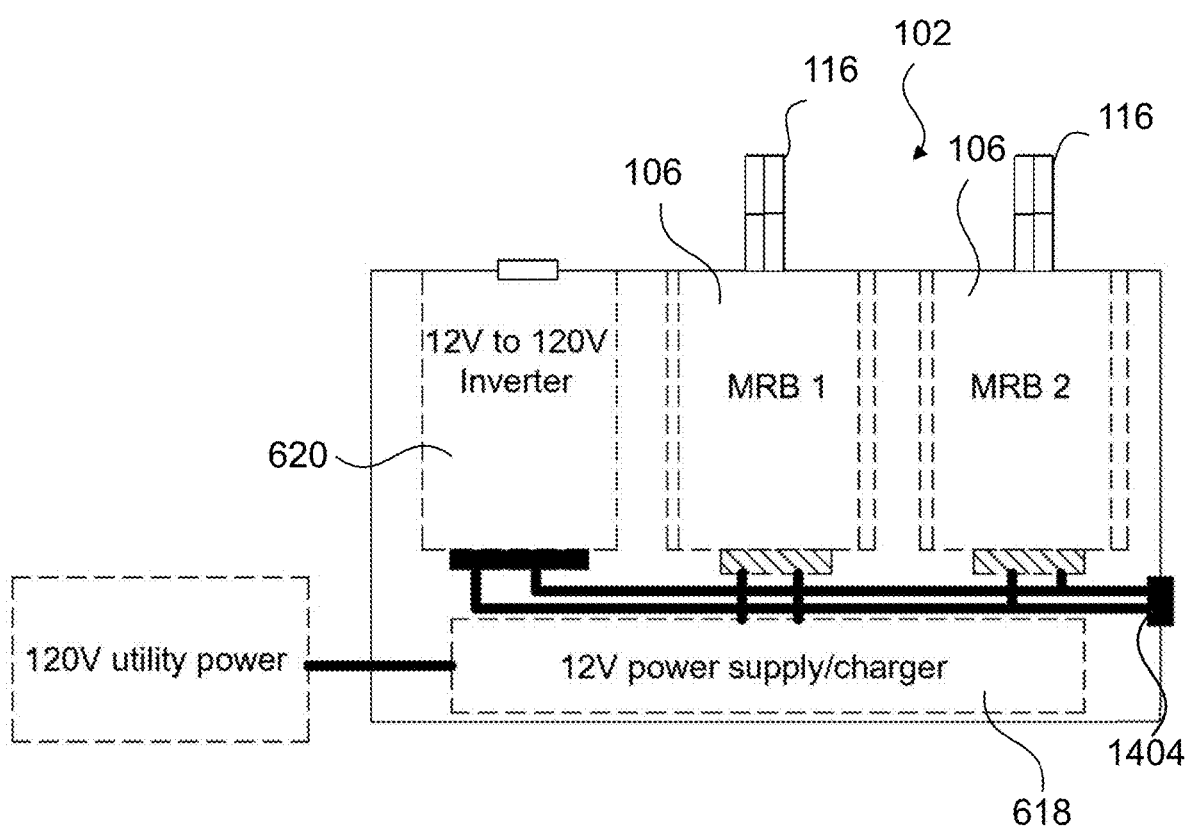
FIG. 15 is a block diagram illustrating a battery assembly having a base unit with multiple modular replaceable batteries, a 12V power supply or charger, and a 120V AC inverter, according to some examples.
Figure 15:
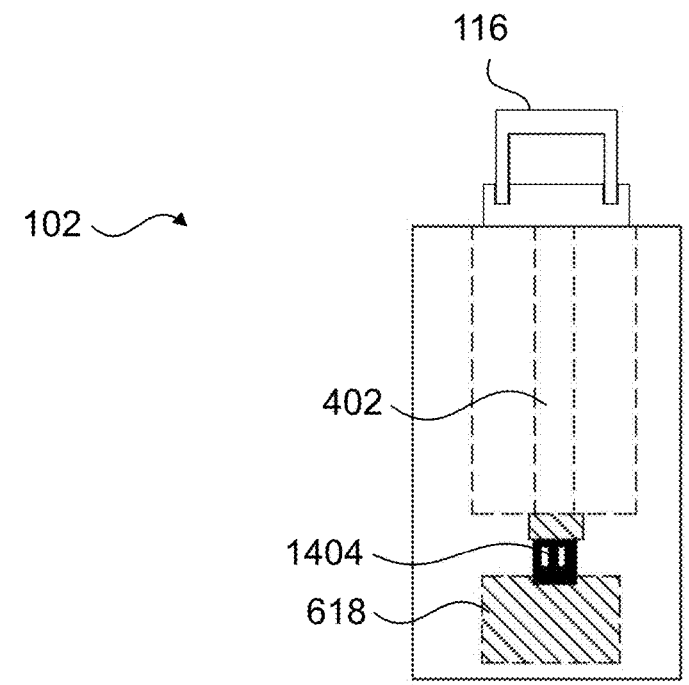
Figure 16:
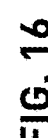
FIG. 16 is a top view illustrating a battery assembly with NEMA 5-15 Edison receptacles for 120V AC output, according to some examples.

FIG. 15 and FIG. 16 depict varying views of a battery assembly 102, according to some examples. The battery assembly 102 in these examples contains two MRBs 106 installed in respective bays 110 of the BU 104.

Having two or more MRBs 106 may, in some situations, be advantageous for the following reasons:

Increased total energy capacity and runtime—The combined capacity of two MRBs 106 is doubled compared to an MRB 106. This extends the operational runtime of the battery assembly 102 before recharging is needed.

Redundancy and backup—If one MRB 106 becomes discharged (or fails) and needs to be swapped out, the second MRB 106 can continue powering a connected system. This prevents downtime.

Higher peak power—Both MRBs 106 can deliver current simultaneously to meet high transient load demands. Their power combines.

Continuous operation—One MRB 106 can discharge to supply loads while the second MRB 106 charges from an external source. The roles can alternate, enabling continuous uninterrupted operation.

Voltage/capacity scaling—MRBs 106 of different voltages and capacities can be combined for unique configurations optimized for specific requirements.

Either battery can be hot-swapped in or out, allowing one battery to be recharged while the other is providing power to a system or vehicle, via the BU 104. This allows the battery assembly 102 to provide a source of uninterrupted power. For example, this capability is valuable when powering critically important electrical devices such as internet routers and WiFi systems during a power outage.

The BU 104 is equipped with a 12V power supply or charger 618, which connects to a standard 120V AC utility outlet. This allows the two modular replaceable battery MRBs 106 to be conveniently recharged by plugging the assembly 102 into any wall outlet. The integrated 12V charger 618 contains power electronics to convert the 120V AC input into a nominal 12V DC output tailored to safely charge the MRBs 106 per their lithium battery specifications.

The side wall mounted 12V DC access point or output connector 1404 allows the 12V DC output from the inverter module 620 to be utilized externally, such as for charging 12V automotive batteries or powering lights, accessories, or tools.

The top panel provides access to two NEMA 5-15 Edison receptacles 1402. These allow the 120V AC output from the inverter module 620 to connect various appliances and devices.'

Moving on to FIG. 16, a top view of a battery assembly 102 is shown. The top panel provides access to two NEMA 5-15 Edison receptacles 1402. These allow the 120V AC output from the inverter module 620 to connect various appliances and devices.

The hot-swapping function may be implemented in various ways. In some examples, the battery assembly 102 battery assembly 102 comprises two batteries installed at the same time. An integrated BMS intelligently manages which battery is connected and providing power to the battery assembly 102 based on its knowledge of the state of charge of each battery. In this configuration, only one battery provides power at a time and the second battery can be removed and recharged when it becomes depleted while the other battery continues to power the system. In other examples, the user can instruct the integrated BMS to connect both batteries in parallel if their states of charge are similar (e.g., within pre-determined limits). This allows for more power availability or a longer run time depending on user choice.

A removed MRB can be recharged with a mobile BU connected to a source of power such as a generator, solar panel, or electrical utility or with a vehicle installed BU. For an ICE based vehicle, the energy required to recharge the MRB comes from an operating ICE but ultimately from the fuel consumed by the ICE. In EVs, the energy used to recharge the MRB comes from either the propulsion battery, the utility battery, or an external charger or combinations thereof.

In some examples, the integrated BMS monitors the state of charge of both installed batteries. Once the active battery is depleted to a predetermined level, the system automatically switches to the battery with the higher state of charge without interrupting the power being provided to external devices.

In some examples, at least two MRBs are installed to provide power to the battery assembly 102, allowing one of the installed MRBs to be removed and recharged. The system BMS provides electrically actuated electronic or mechanical switching devices to electronically switch out either the first or second battery when either battery becomes discharged to a predetermined level if both batteries are installed. The battery assembly 102 includes a state of charge indicator for both batteries so that the battery with the least state of charge can then be removed, recharged and re-installed by the user while the system continues to deliver power to external electrical devices. This battery swapping and recharging cycle can be repeated by removing the battery with the least state of charge, recharging it, and hot-swapping it back into its original place. If both batteries are installed at or near the same state of charge, the user can instruct the system to operate with the combined power of the two batteries connected in parallel.

Figure 17A:
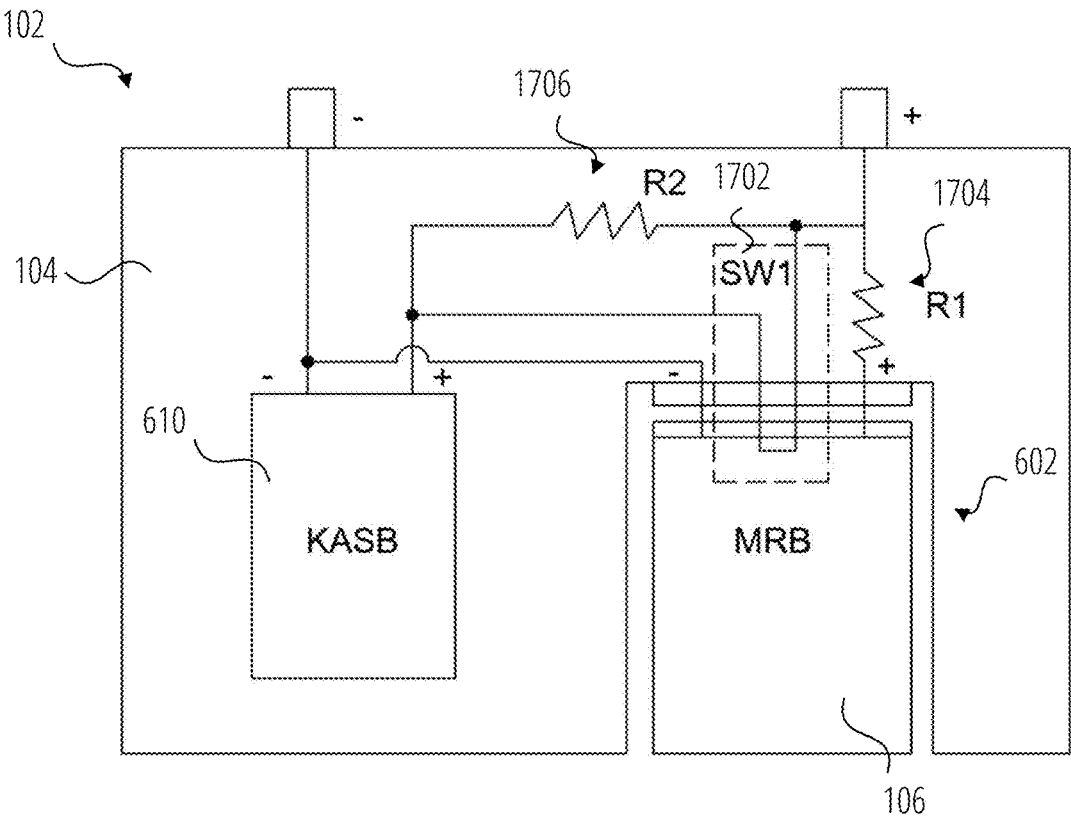
FIG. 17A and FIG. 17B are block diagrams illustrating battery assemblies with arrangements to support a keep-alive or secondary battery, according to some examples.
Figure 17B:
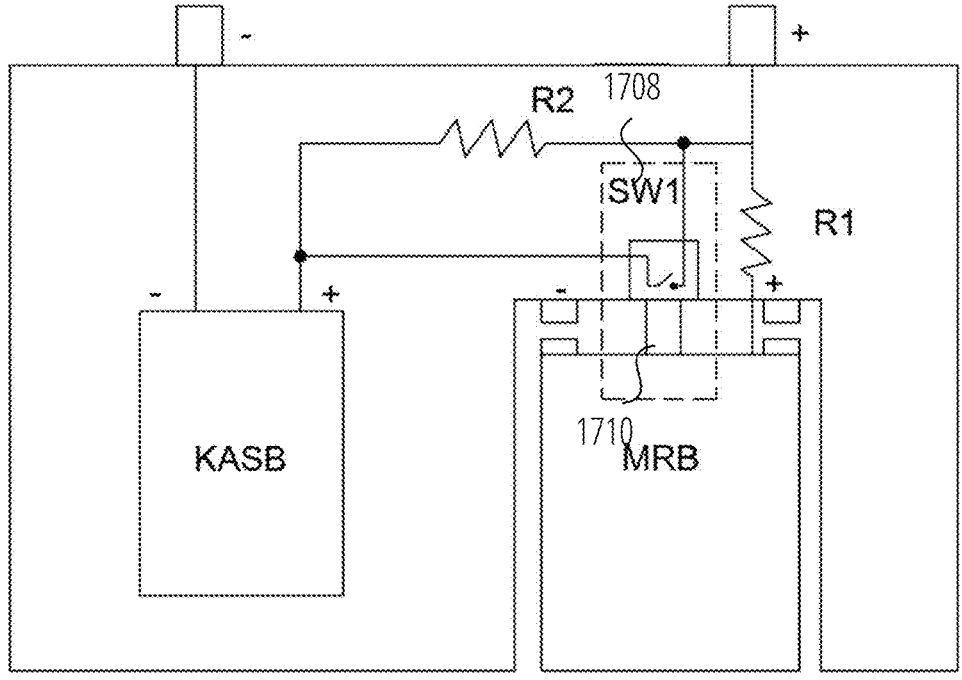

FIG. 17A-FIG. 17B illustrate a series of battery assemblies 102, according to some examples, with arrangements to support a keep-alive or secondary battery 610 that forms part of the battery assembly 102.

FIG. 17A illustrates a modular battery system, according to some examples. highlighting the battery assembly 102 and BU 104.

The BU 104 contains several components to facilitate its functionality. This includes a secondary battery 610, which acts as a Keep-Alive Starting Battery (KASB). The secondary battery 610 utilizes a small form factor battery with enough capacity to provide multiple engine cranking pulses to start the vehicle when needed. It may contain lithium-ion or lead-acid chemistry.

The BU 104 also contains an MRB 106, which is designed to slide into a mating bay 110 in the BU 104 of the battery housing 408. The MRB 106 includes the main battery pack, such as lithium-ion battery cells 404, which provides primary power to the vehicle. It has a high capacity to meet the electrical loads during operation either in the vehicle or if moved to another vehicle or an external mobile base unit.

To facilitate the safe insertion and removal of the MRB 106 quick connect/disconnect electrical connectors 602 are built into the BU 104 and MRB 106. These allow the MRB 106 to be easily detached and exchanged as needed. The electrical connectors 602 may utilize male-female or androgynous high-current, high-power connectors for connections to the MRB battery pack and or KSAB or low-current, low-power connectors for analog and digital signals as described elsewhere.

A start-disable switch SW1 1702 provides a safety interlock function by disabling the engine starting when the MRB 106 is removed. This helps to prevent theft and unintentional starting without the high-current modular battery connected. The start-disable switch SW1 1702 opens to cut off power from the secondary battery 610 when the MRB 106 is disengaged.

To protect the vehicle alternator and batteries within BU 104 from excessive current when charging an MRB 106, current limiting resistor R1 1704 is included. R1 may be in the range of 0.01 to 5 Ohms. Current limiting resistor R1 1704 limits current by creating a voltage drop but may be replaced with an active circuit providing improved performance and efficiency. In some examples, the active circuit could limit charging current to a value deemed safe for the vehicle's charging system and battery's BMS but during times of transient high demand, such as starting or other transient loads, the active circuit could increase the current limit to a larger value either limited by the battery's capacity or an otherwise pre-determined upper limit. In some examples, the active circuit would comprise a switch and possibly other components across R1, producing a controllable lower resistance, which would allow the flow of higher currents, such as for starting an ICE. In some examples, a resistor or active circuit could be inserted in series with SW1 and KSAB 610 to limit charging current to safe operating levels while allowing higher discharge currents for staring and ICE or powering other transient loads.

A keep-alive feed resistor R2 1706 (e.g., 1-10 Ohms) provides a small amount of sustained power, such as 50-100 milliamps, to maintain vehicle electronics and security features even when the MRB 106 is removed. This keeps critical control modules and settings active. The keep-alive current is supplied by the secondary battery 610 through the keep-alive feed resistor R2 1706. R2 may also be replaced with an active circuit providing improved functionality and efficiency in supplying off-state current and maintaining the KASB in a charged state.

KASB 1808 (FIG. 18) and MRB 106 are connected in parallel through resistor R1 or an active circuit whose purpose is to control charging currents and voltages to both protect the vehicle's charging system, KASB 1808 and MRB 106 and optimize charging and discharging of MRB 106. KASB 1808 can either be charged or discharged directly by the vehicles charging system or through a component or circuit similar or identical to R1 called R* (not shown). R* circuit could be connected in series with SW1 and KSAB 610 and could be used to optimize the charging and discharging of KASB 1808. KASB 1808 and MRB 106 are intentionally connected in parallel to provide a hybrid battery capable of providing high performance cold cranking current (e.g., >300 A) and energy storage capacity (e.g., >50 Ah) while serving a stable and reliable power source for the vehicle's electrical system. Under control of R1 and R*, KASB 1808 and MRB 106 could either be connected in parallel or be individually connected to the vehicle's electronic system as determined by a higher-level electronic controller.

FIG. 17B demonstrates an alternate configuration with a different start-disable switch SW1 1708 implementation. Rather than an electronic switch, it utilizes a mechanical plunger 1710. The plunger 1710 is depressed when the modular battery 106 is inserted, closing the switch SW1. When the MRB 106 is removed, the plunger 1710 is released, opening start-disable switch SW1 1708. This simple mechanical linkage disables starting without the MRB 106.

These examples utilize modular architecture with strategic circuits to deliver robust and safe battery-swapping functionality. The components integrate the MRB 106 while protecting the electrical system and providing keep-alive power when the MRB 106 is exchanged.

Figure 18:
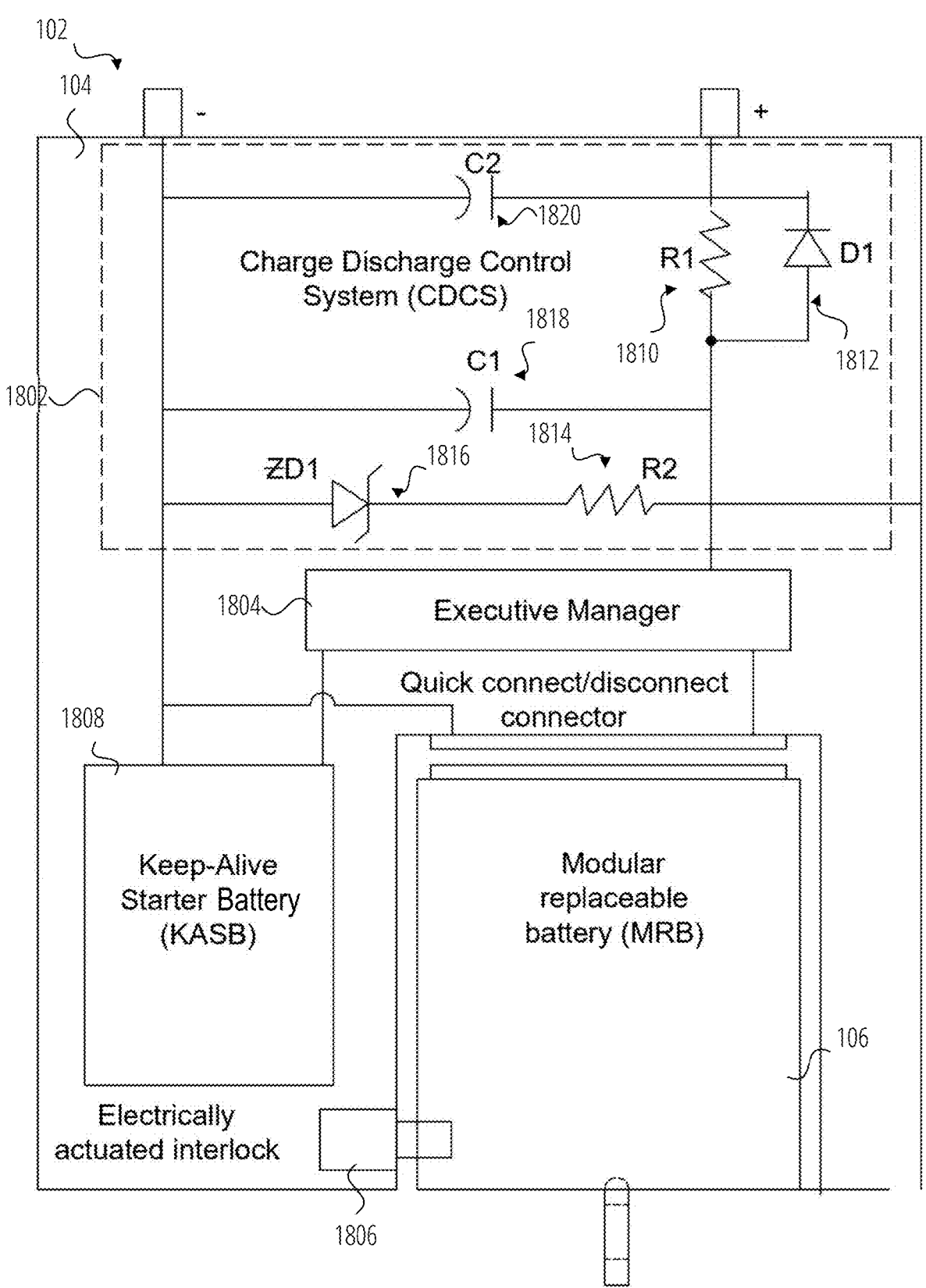
FIG. 18 is a block diagram illustrating a battery assembly comprising a base unit with a Charge Discharge Control System and an Executive manager with electrical and electronic components, according to some examples.

FIG. 18 illustrates a battery assembly 102, according to some examples, comprising a BU 104 with a Charge Discharge Control System (CDCS) 1802 and an Executive manager 1804 with electrical and or electronic components, logic circuits and/or a microprocessor, an electronically activated interlock 1806, a secondary battery 610 in the form of a Keep-Alive Starting Battery (KASB 1808), and MRB 106.

The Charge Discharge Control System (CDCS) 1802 comprises electronic components to limit the charging current available to a fully or partially discharged MRB 106 to a safe value to not cause overload, overheating, and otherwise prevent damage to a vehicle alternator 808 and or voltage regulator or the MRB. Electronic circuit components of the Charge Discharge Control System (CDCS) 1802 may include a series resistor R1 1810 (e.g., 0.01 Ohms<R1<5 Ohms) to limit the charging current and high-current silicon or low-voltage drop Schottky diode D1 1812 in parallel with the series resistor R1 1810 to optimize available current for cranking an ICE and or operating the vehicle's electrical system. Multiple components may be combined to increase the current, voltage, and power capabilities as needed to handle a specific situation. For example, the series resistor R1 1810 and the diode D1 1812 may be replaced with an active circuit and devices that perform this function more efficiently or robustly. In some examples, electronic components used for taking action or exerting control may include solid-state or electromechanically controlled switches or relays, digital to analog converters, high power field effect and bipolar transistors, thyristors, diodes, and other similar components known to those skilled in the art.

In the unlikely event that a battery management system (BMS) 702 of the MRB 106 (not shown) and the battery management system (BMS) 702 in the KASB 1808 (not shown) both enter fault conditions due to temperature, current, or other fault triggering parameters or combinations thereof being out of pre-defined BMS limits and disconnect the KASB 1808 and the MRB 106 while the alternator is operating, the Charge Discharge Control System (CDCS) 1802 may include electronic circuits to protect the vehicle's alternator and voltage regulator by simulating a connected battery that stabilizes the voltage applied to the vehicles' electronic system. Such circuit components may include a resistor R2 1814 (e.g., where 0.01 Ohms<R2<5 Ohms) in series with a Zener diode ZD1 1816 in parallel with a super capacitor C1 1818 (e.g., 1F<C1<1000 F) to simulate a battery whose voltage is established by the breakdown voltage of Zener diode ZD1 1816 (e.g., 15-20V). Circuit components may include a super capacitor C2 1820 (e.g., 1F<C1<1000 F) connected between the positive and negative terminals of the BU 104.

In some examples, an active circuit comprising analog or digital active devices and an optional microcontroller could be configured and/or programmed to simulate a fully charged battery, thus minimizing the load on the vehicle's battery charging system and the power it must dissipate.

In some examples, such a circuit might regulate the voltage presented to the vehicle's charging system to the fully charged or float voltage of the battery it was originally designed to work with, while adjusting its current draw to just enough to produce a determinably stable output voltage. Maintaining such an optimum output voltage would minimize the load on the vehicle's charging system and the power dissipated by the regulating circuitry.

In some examples, if the energy required to start an ICE with a 12.5 V system was ~1 Amp-hour or about 12.5 Watt-hours, a super capacitor of about 576 F may be large enough to store that amount of energy. Capacitors with lesser or greater values may also offer adequate protection depending on the characteristics of a specific vehicle's electronic system and be provided as a buffer against voltage or current transients.

In examples of FIG. 18, the KASB 1808 is connected directly to the negative terminal of the BU 104 and through the Executive manager 1804 to the positive terminal of the BU 104. The executive manager 1804 is fully programmable and provides functionality to ensure that the KASB 1808 can provide a full starting current to the vehicle even if a partially or fully discharged MRB 106 is inserted into the BU 104 before trying to start the vehicle. Executive Manager 1804 may include logic and circuitry (e.g., microprocessors, programmable logic, relays, solid-state switching devices, etc.) to isolate KASB 1808 from MRB 106 as deemed necessary. The executive manager 1804 in the KASB 1808 and or MRB 106 (not shown) such as when high/low limits are exceeded for charging or discharging currents or temperature extremes (or combinations thereof), or due to KASB 1808 or MRB 106 battery cells becoming out of balance. The Executive manager 1804 may include a battery heater manager that can heat the battery pack within the KASB 1808 and or MRB 106 if needed by supplying current to a heater (not shown) in the KASB 1808 and or MRB 106.

The Charge Discharge Control System (CDCS) 1802 may connect to components such as the vehicle voltage regulator or external temperature or current sensors to allow control of the charging currents to the KASB 1808 and or the MRB 106. Charging current control may be exercised using an internal controllable current limiting device, communicating with or otherwise controlling the vehicle's voltage regulator, or by directly controlling its alternator field current in order to achieve a desired set point or to effectively switch it on or off. The Charge Discharge Control System (CDCS) 1802 may further sense the temperature of the alternator or battery pack or current flowing from the alternator and, in conjunction with the executive manager 1804, reduce the battery charging current by either reducing the supply of current from the vehicle or the amount of charging current available to the KASB 1808 and or the MRB 106.

The executive manager 1804 may detect the presence or absence of an MRB 106 and implement rules for determining whether to allow the vehicle to start or to charge the MRB 106. For example, the executive manager 1804 may be programmed to not allow the KASB 1808 to start the vehicle if it senses that an MRB 106 is not present, or it is defective or the Executive manager 1804 may decide to disconnect the MRB 106 to prevent charging if it diagnoses the MRB 106 to be in a fault condition or potentially defective. Alternatively, the executive manager 1804 may prevent an MRB 106 from being inserted or removed by the appropriate use of the electrically activated interlock 1806. Executive manager 1804 may employ mechanical or solid-state relays, and or other solid-state switching devices to switch or control the currents flowing from the KASB or MRB.

In some examples, it may be desirable for executive manager 1804, BMS 702, DBMS 3302 or other controller within BU 104 to be able to detect or otherwise acquire knowledge of different inherent features, characteristics, components or historical exposure records of an installed MRB. Therefore, in some examples, the MRB may be designed to be able to store and or collect this information. The information to be stored may include but is not limited to battery chemistry (e.g., LFP, NMC, NCA, lead-acid) and associated charging profiles, upper and lower voltage, current, and temperature limits, individual battery cell specifications, cycle history, temperature exposure history, shock and vibration history, etc. Example methods for storing and collecting these kinds of information and data may include physical pin encoding and digital communication encoding. In physical pin encoding, the features to be stored are encoded through a specific configuration of pins in a connector such as the quick disconnect connector of an MRB. In digital communication encoding, a logic circuit or digital microcontroller in combination with solid-state memory in the MRB communicates with the BU over a standardized serial interface (e.g., I2C, SPI, or UART, CAN bus). Executive manager's microcontroller can store data in the MRB and ask the microcontroller or logic circuitry within the MRB to transmit it to the BU when connected and prompted.

The KASB 1808 may be a lead-acid battery, a Lithium Polymer, other type of Lithium or other battery optimized for cranking an ICE and keeping alive the 12V system in a vehicle, boat, or other system comprising an ICE. The KASB 1808 may also be or comprise a super capacitor.

Figure 19:
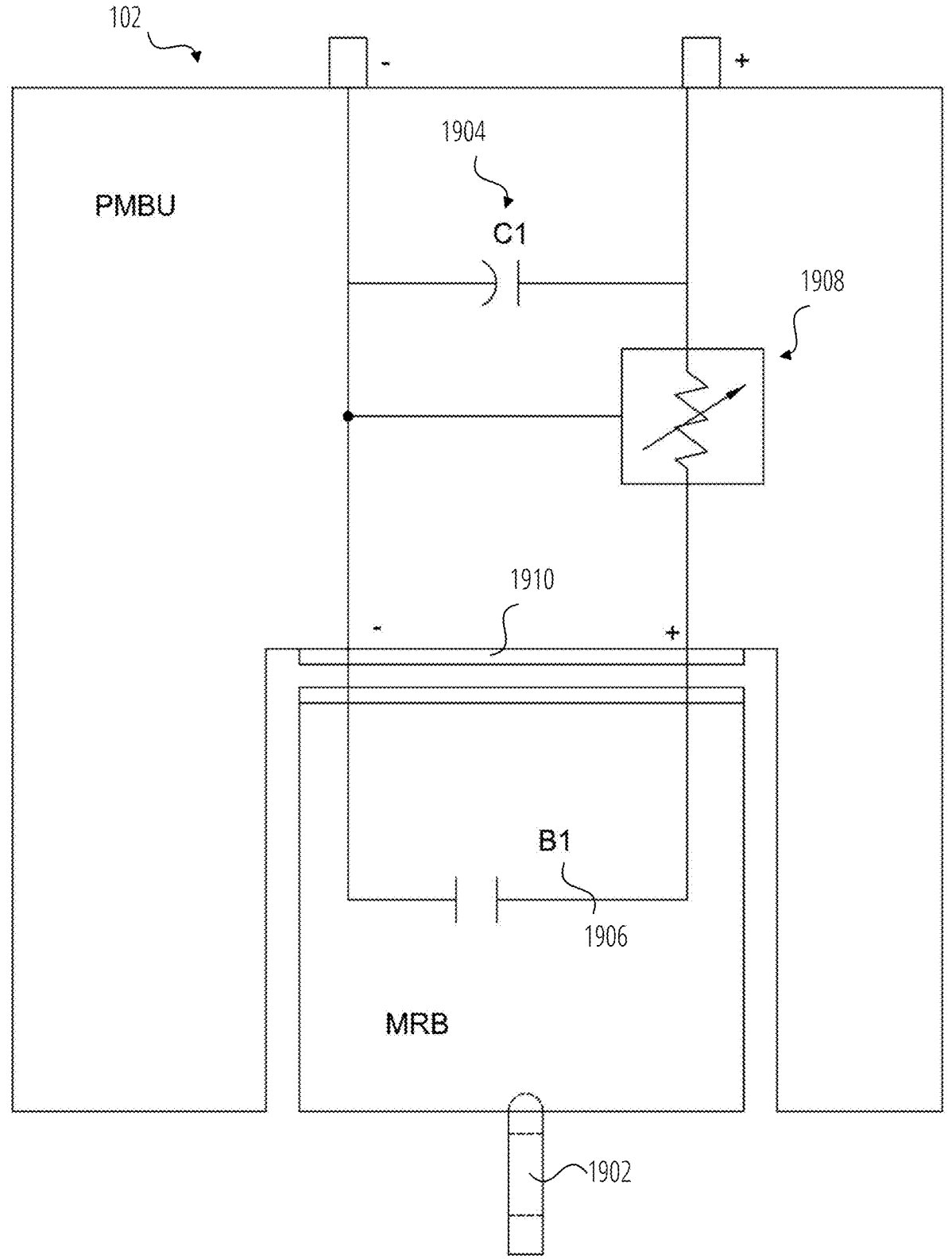
FIG. 19 is a block diagram illustrating a battery assembly comprising a base unit with a Charge Discharge Control System and an Executive manager, according to some examples.

FIG. 19 illustrates battery assembly 102, according to some examples, comprising a battery assembly 102 with a base unit (BU 104) having with a flush-mount fold-out handle 1902, a super capacitor C1 1904, an MRB 106 with battery B1 1906, a charge-discharge control device (CDD1 1908), and a quick connect/disconnect connector 1910.

The BU 104 contains several key components to facilitate modular battery operation. This includes the super capacitor C1 1818 which can provide supplemental high-current pulses to assist with engine cranking. The super capacitor C1 1818 may have a capacitance from 1 to 1000 Farads, adequate to store energy to start a typical 12V vehicle engine.

An MRB 106 is designed to slide into the BU 104, making a quick connect/disconnect electrical connection. The MRB 106 contains a primary battery B1 1906 to power the vehicle's electrical loads. Battery B1 1906 may use lithium-ion or other chemistry optimized for the application.

The charge-discharge control device (CDD1 1908) regulates energy flow between the super capacitor C1 1818, battery B1 1906, and vehicle electrical system. CDD1 1908 may be implemented using solid-state devices and control circuits. It can limit the charging current from the alternator, boost voltage and provide an optimized charging profile to fully charge and maintain the battery B1 1906 and manage discharging to optimize starting and operation.

In the event the MRB 106 is disconnected, the super capacitor C1 1818 can supply keep-alive power to maintain critical vehicle electronics for a period of time before the voltage drops below 10V. For example, a 576F super capacitor may power a 10 mA keep-alive load for approximately 6 hours before the voltage drops below 10V.

An additional backup battery B2 (not shown) may be included to extend keep-alive capability and be provided in parallel with super capacitor C1 1904. Battery B2 may contain lead-acid or lithium cells optimized for repeated engine cranking. The charge-discharge control device CDD1 1908 coordinates between the various energy storage elements to maximize performance and lifetime.

The flush mount design allows the modular architecture to conveniently retrofit vehicles with confined battery compartments. Quick connect/disconnect electrical interfaces enable simple MRB 106 swapping for maintenance.

The modular battery system may incorporate protective devices and circuits to shield the vehicles' electrical system and the base unit (BU) 104 and its components from potentially damaging electrical conditions such as transients, overloads, and fault conditions. Potentially damaging electrical conditions may include voltage or current spikes or electrical disconnections caused by one or more components of vehicle's electrical system and or from BU 104 or MRB 106.

Electrical transients such as voltage or current spikes and electrical disconnections can originate from multiple sources:

The vehicle's electrical system—load switching and electrical faults may induce transients on the battery supply lines.

Within the BU 104 or MRB 106—failure of BMS or other internal faults may lead to voltage/current spikes or battery disconnection. Exceeding overcurrent or high and low temperature limits could cause a BMS to enter a fault state and disconnect the battery.

External events—a lightning strike or contact with an external power source like a residential electrical circuit can cause overloads or induce spikes.

To suppress these transients, protective components can be utilized:

Metal oxide varistors (MOVs)—These clamp voltage spikes by changing to a low resistance state above a threshold voltage. They absorb transient energy and can handle high surge currents.

Zener diodes—Reverse-biased Zener diodes will avalanche and conduct above their breakdown voltage, clamping spikes. Multiple diodes may be used in series/parallel to increase rating.

Crowbar circuits—These rapidly short the power lines in response to overvoltage or other fault condition thereby causing a protective fuse to blow or tripping a circuit breaker. An SCR or TRIAC activated by the transient switches on to short the lines through a low resistance, crowbarring the supply.

The protective components may be combined into networks and properly rated for the expected electrical disconnections and or transient voltages and energies. They may be connected across the supply lines on the input and outputs of the BU 104 and MRB 106. The circuits safely shunt transient currents away from sensitive electronics. Proper transient protection helps improve reliability and resilience of the modular battery system in demanding electrical environments common in vehicles. Protective functions may be implemented at higher levels, for example by including an executive manager 1804 in BU 104 of FIG. 18 with the ability to reset fault conditions initiated by the BMS associated with battery B1 1906 of MRB 106 without user intervention once the fault condition was cleared. For example, an algorithm implemented within the executive manager 1804 may be designed to clear a BMS battery disconnection fault caused by exceeding limit of current or voltage or temperature once the executive manager detected that the fault condition was cleared.

Figure 20:
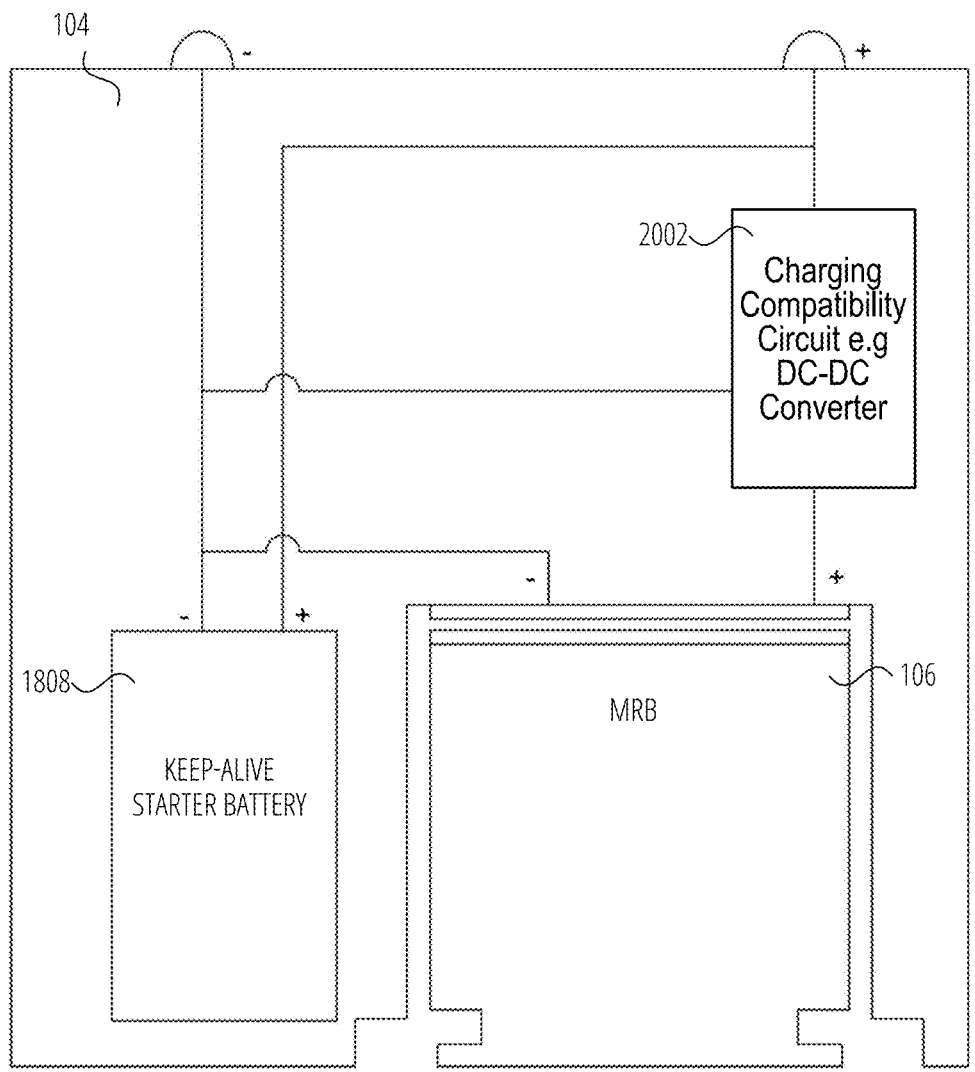
FIG. 20 is a block diagram illustrating a battery assembly comprising a base unit with a Charging Compatibility Circuit to manage energy flow between modular components, according to some examples.

FIG. 20 illustrates a battery assembly 102, according to some examples, comprising a base unit (BU 104) with a Charging Compatibility Circuit (CCC 2002) to manage energy flow between the modular components.

The CCC 2002 contains electronic circuits designed to protect the vehicle charging system from overloads when charging a depleted MRB 106 For example, the MRB 106 may have a 12V lithium-ion battery pack with 40-90 Amp-hour capacity that accepts high charging currents. The CCC 2002 limits this current to prevent alternator or voltage regulator overheating. The CCC 2002 may also limit charging current to protect the battery within the MRB by keeping it within the safe charging limit.

The CCC 2002 also provides an optimized charging profile tailored to the battery chemistry and pack configuration of the specific MRB 106. This may involve multistage charging with constant current and constant voltage regions to maximize charge rate while avoiding damage. The CCC 2002 ensures compatibility between the MRB 106 and a vehicle charging system.

The BU and MRB may be equipped with physical or electronic means to identify and detect MRBs with different features and or battery chemistries. For example, A keep-alive starting battery (KASB 1808) is directly connected to the positive and negative terminals of the BU 104. The KASB 1808 contains a 12V lead-acid or lithium-ion battery pack sized to provide multiple engine cranking pulses, typically 10-30 Amp-hours. This ensures the KASB 1808 can start the engine even with a fully depleted MRB 106 present.

The KASB 1808 may use absorbed glass mat (AGM) lead-acid batteries which are optimized for cyclic engine cranking rather than long deep discharge cycles. Lithium chemistries like LiFePO4 may also provide high cranking currents, long cycle life, and wide temperature operation.

The CCC 2002 coordinates charging and discharging amongst the KASB 1808 and MRB 106 to maximize service life and performance. The modular architecture with managed charging current enables flexible system configurations. In some examples, the positive lead from the keep-alive starter battery may be connected to the vehicle's electrical system through CCC 2002 to allow greater control of charging and discharging currents.

The battery assembly 102 in FIG. 20 may incorporate additional battery management capabilities in the base unit (BU) 104:

A Starting Manager function to ensure that adequate cranking current is available to start an ICE, even with an undercharged MRB 106 is present. Custom logic controls the current draw from the KASB 1808

A BMS Fault Manager detects and responds to fault conditions from the MRB battery management system (BMS) 702, such as over temperature or under/over voltage. It may disconnect or limit the charging of a faulty MRB 106.

A Battery Heater Manager activates heating elements in the MRB 106 when needed to warm the battery for safe charging operation in cold weather.

The Charging Compatibility Circuit (CCC 2002) may connect to external temperature sensors or current shunts to monitor charging conditions. This data helps control the alternator field current to properly charge batteries within safe operating limits.

The MRB 106 may contain an integrated electric heating element that warms the lithium-ion or other battery pack to an optimal 15-35° C. temperature range when cold. This enables safe fast charging in cold ambient conditions.

The MRB 106 also incorporates its own Battery management system (BMS) 702 with cell monitoring and balancing. It exchanges vital data with the BU 104 to coordinate charging, discharging, and fault mitigation. The integrated battery management system (BMS) 702 maximizes the use of the MRB battery pack capacity and lifespan.

Figure 21:
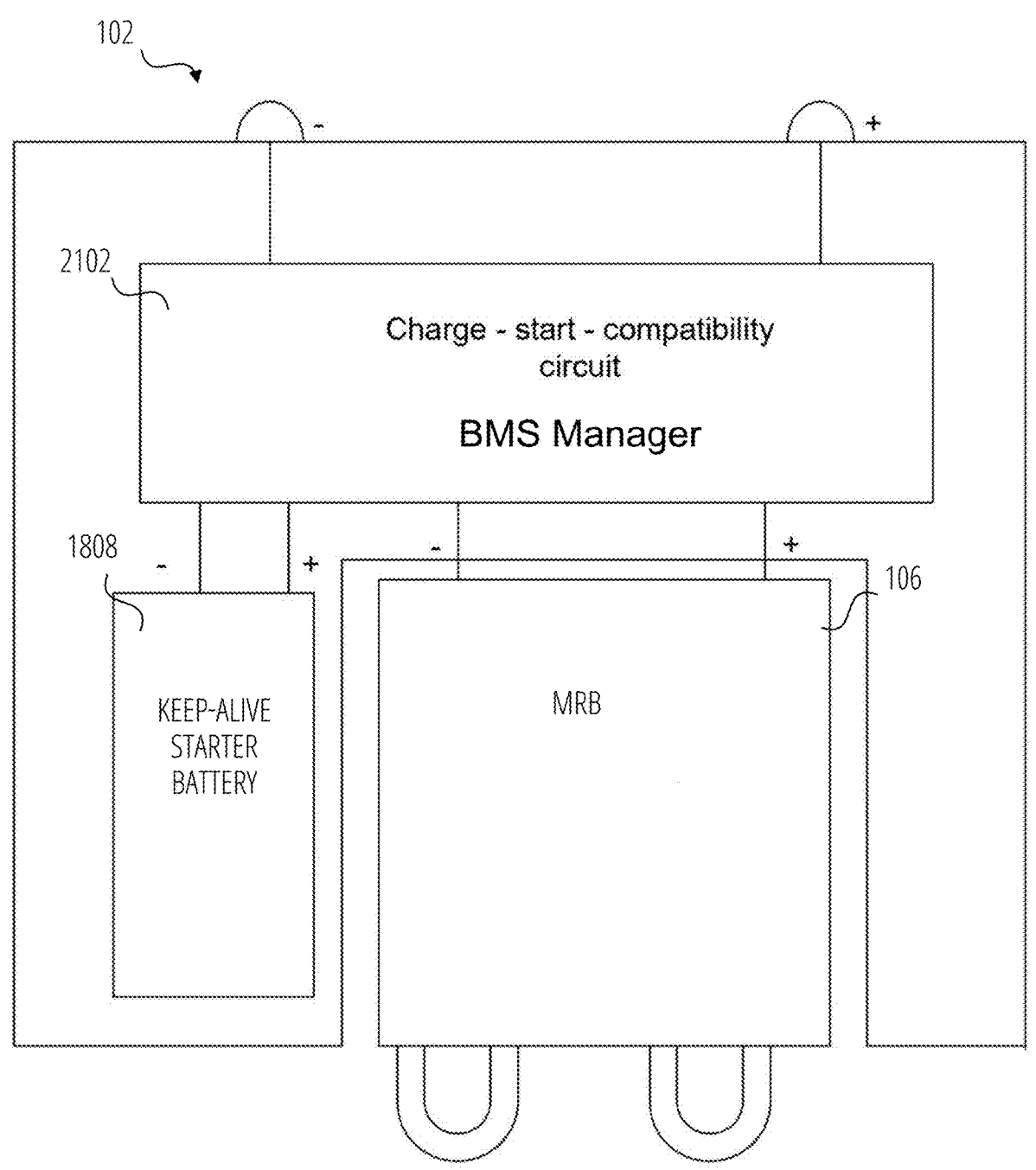
FIG. 21 is a block diagram illustrating a battery assembly comprising a base unit with a Charge Discharge Control System, an Executive manager, and a keep-alive starting battery, according to some examples.

FIG. 21 illustrates a battery assembly 102, according to some examples, comprising a base unit (BU 104) with a sophisticated Charge Start Electronic Control Module (CSCM 2102) to manage the modular battery components.

The CSCM 2102 contains multiple integrated functions implemented using microcontrollers, FPGAs, power management ICs, high-current, and or high-power semiconductor switches, high current relays, and other circuitry. Example capabilities include:

Charging Manager—This monitors current and voltage to limit the charging rate applied to an MRB 106. It prevents overloading the alternator and voltage regulator or battery within the MRB when recharging a depleted MRB 106 battery pack, which may have a capacity of 40-90 Amp-hours or larger in some examples. Larger or smaller battery capacities are possible if more or less space is desired/available for operation.

Starting Manager—Custom logic and current regulation ensure the KASB 1808 can supply adequate starting pulses, even with an undercharged MRB 106 present. This reliable starting may require 10-30 Amp-hours for the KASB 1808 to provide multiple starting pulses (depending on ICE size) and desired keep-alive time (depending on ICE off-state current draw).

BMS Fault Manager—It detects fault conditions in the MRB battery management system (BMS) 702 like over temperature or under/over voltage battery disconnects. The CSCM 2102 can respond by resetting the BMS and reconnecting the battery once the fault condition is resolved or disconnecting or throttling back charging of a faulty MRB 106 to protect the vehicle's charging system and MRB.

Battery Heater Manager—Cold MRB 106 battery packs can be warmed up prior to charging by activating integrated heating elements. The CSCM 2102 controls this heating safely.

The CSCM 2102 hardware may comprise microcontroller and gate driver circuitry mounted on printed circuit boards within the BU 104. The CSCM 2102 connects to external sensors like current shunts and temperature probes to monitor charging/discharging conditions.

The CSCM 2102 may acquire alternator temperature data over the vehicle CAN bus to precisely control alternator field current and charging voltage/current, preventing over temperature. The CSCM 2102 may directly interface with the vehicle voltage regulator to disable or enable charging as needed for protection and optimal performance.

The MRB 106 itself may contain an integrated electric heating mat that warms the lithium-ion or other battery cells for cold weather operation down to −10° C. Heating enables consistent charging and discharging even in freezing conditions.

The MRB 106 may incorporate a dedicated battery management system (BMS) 702 for cell monitoring and balancing. The battery management system (BMS) 702 may exchange battery data like state of charge, temperature, and fault conditions with the BU 104 over the vehicle CAN bus or wireless interfaces such as Bluetooth. This allows the CSCM 2102 to make informed control decisions.

The KASB 1808 may use absorbed glass mat (AGM) lead-acid batteries sized to provide multiple reliable engine cranking pulses. Lithium iron phosphate (LiFePO4, LFP) or Lithium polymer pouch cells may also be used. A super capacitor may be used for high current output, long cycle life, and excellent low-temperature performance.

Figure 22:
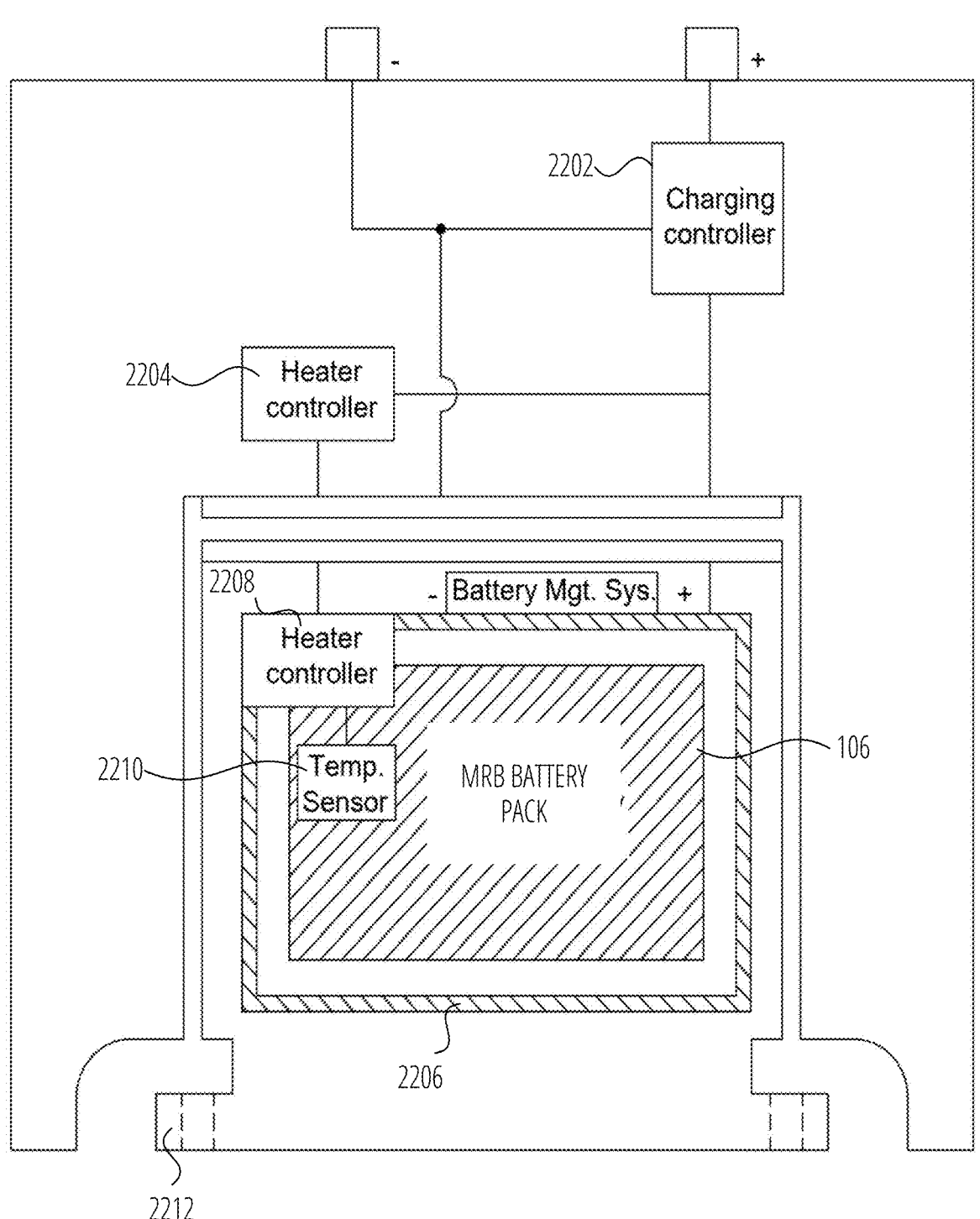
FIG. 22 is a block diagram illustrating a battery assembly with a base unit containing multiple modular replaceable batteries and a keep-alive starting battery, according to some examples.

FIG. 22 illustrates a battery assembly 102, according to some examples, with sophisticated battery management capabilities.

A base unit (BU 104) contains a vehicle charging controller 2202 that regulates energy flow between the vehicle alternator/voltage regulator and the modular replaceable battery (MRB 106). It ensures the MRB 106 battery pack is charged safely and efficiently based on parameters like battery temperature, state of charge, and health. The vehicle charging controller 2202 may comprise DC-DC converter circuits, solid-state switches, and a microcontroller executing custom charging algorithms tailored to the MRB battery type. It may communicate with the vehicle alternator over the CAN bus to modulate charging voltage and current within safe limits. The vehicle charging controller maximizes charging speed while avoiding damage to the MRB battery pack.

The BU 104 also incorporates a heater controller 2204 that governs the operation of integrated heating elements 2206 in the MRB 106 battery pack. When the battery temperature drops below optimal levels, the heater controller 2204 activates the heating elements 2206 to warm the pack for efficient charging. The heater controller 2204 may modulate heater current based on battery temperature data from sensors in the MRB 106 and thus ensures heating proceeds safely and uses minimum energy.

The further heater controller 2208 within the MRB 106 governs its integrated electrical heating element 2206 based on temperature information received from a temperature sensor 2210 that measures the temperature of the MRB 106. This localized control loop activates the heating element 2206 as needed to maintain optimal battery temperature for charging. It helps mitigate low ambient temperature exposure. The further heater controller 2208 receives temperature set points from the BU 104 but runs autonomously.

The MRB heating element 2206 itself comprises resistive traces integrated into the battery pack. Supplying current to these resistive traces generates heat within the battery pack proportional to the resistor power dissipation. The temperature is maintained within safe limits by the heater controller 2208. This heating system design provides consistent battery operation in below freezing environments.

Finally, the MRB 106 incorporates flush mount handles 2212 recessed into the base unit housing 108 of the BU 104 to facilitate installation of the BU in space confined situations. These allow the MRB 106 to be easily inserted and removed from the BU 104 by a user. A lock and key may be added for security purposes or omitted to allow the user to remove the MRB without tools. The handles 2212 facilitate quick pack swapping for maintenance and flexibility. They allow ergonomic handling of the pack for transportation and storage.

Figure 23:
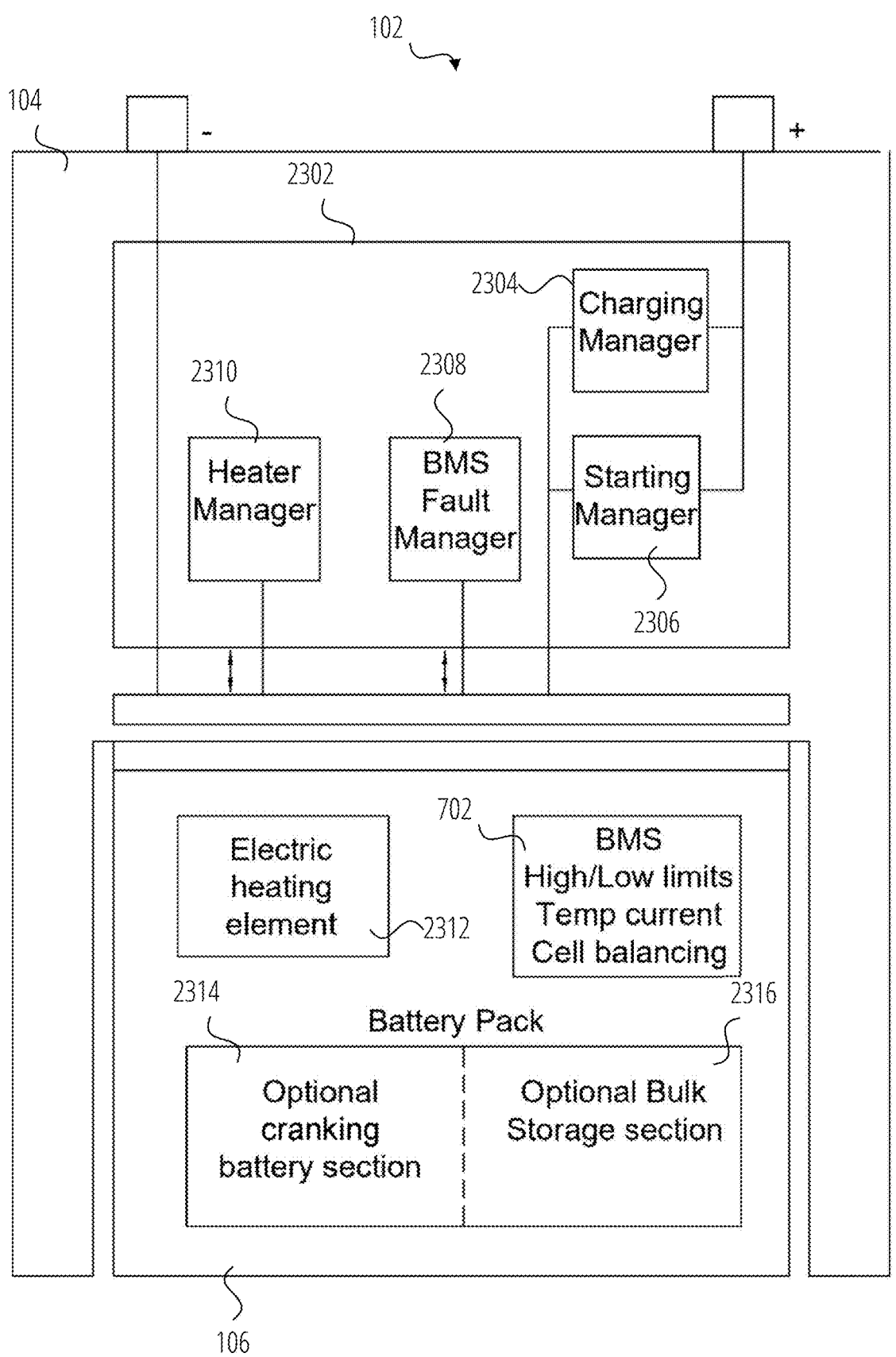
FIG. 23 is a block diagram illustrating a battery assembly with a base unit containing multiple modular replaceable batteries, a keep-alive starting battery, and an inverter for providing AC power output, according to some examples.

FIG. 23 illustrates a battery assembly 102, according to some examples, comprising advanced electronic battery management functions, and includes an electronic control module 2302 and an MRB 106. The electronic control module 2302 implements core battery management capabilities via printed circuit boards and embedded software described below. It may comprise microcontrollers, FPGAs, power management ICs, and other circuitry tailored to the modular architecture.

The electronic control module 2302 includes:

A Charging Manager 2304 to monitor battery voltage, current, and temperature to limit the charging rate applied to the MRB 106. This prevents overloading the alternator and voltage regulator when recharging a depleted MRB 106 and keeps the charging current to within the limits of the battery within the MRB.

A Starting Manager 2306 ensures adequate cranking current can be supplied to start a vehicle engine, even with an undercharged MRB 106 is present. The Starting Manager 2306 may regulate current draw from an integrated cranking battery.

A BMS Fault Manager 2308 detects and responds to fault conditions from the MRB battery management system (BMS) 702, such as over temperature or under/over voltage. The BMS Fault Manager 2308 may further disconnect a faulty MRB 106.

A Battery Heater Manager 2310 governs electric heating elements to warm the MRB 106 battery pack for charging in cold temperatures down to −20° C.

The electronic control module 2302 may connect to sensors like current shunts and thermocouples to acquire data on charging/discharging conditions. The electronic control module 2302 may interface directly with the vehicle's voltage regulator over a CAN bus to enable smart charging.

The MRB 106 itself contains an integrated electric heating element 2312 regulated by a local heater controller. Resistive heating elements warm the lithium-ion or other battery pack of the MRB 106 to 15-35° C. for optimal performance.

The MRB 106 also incorporates a dedicated battery management system (BMS) 702 for cell monitoring, balancing, and protection. It may exchange vital battery data with the BU 104 over CAN bus or other digital signal interface or via a wireless interface such as Bluetooth to support smart charging and discharging.

The battery pack of the MRB 106 may include a cranking battery section 2314 to provide pulse currents exceeding 1000 A to start engines and a bulk storage section 2316 capable of providing the stored energy required for non-cranking applications such as providing back-up or recreational power to electronic systems and devices. The cranking battery section 2314 may be a lead-acid battery, a Lithium Polymer or other type of Lithium or other battery optimized for cranking an ICE and keeping alive the 12V system in a vehicle, boat, or other system comprising an ICE.

In summary, the sophisticated electronic battery management system supports modular pack swapping, protects the vehicle's electrical system, and maximizes battery performance and life.

Figure 24:
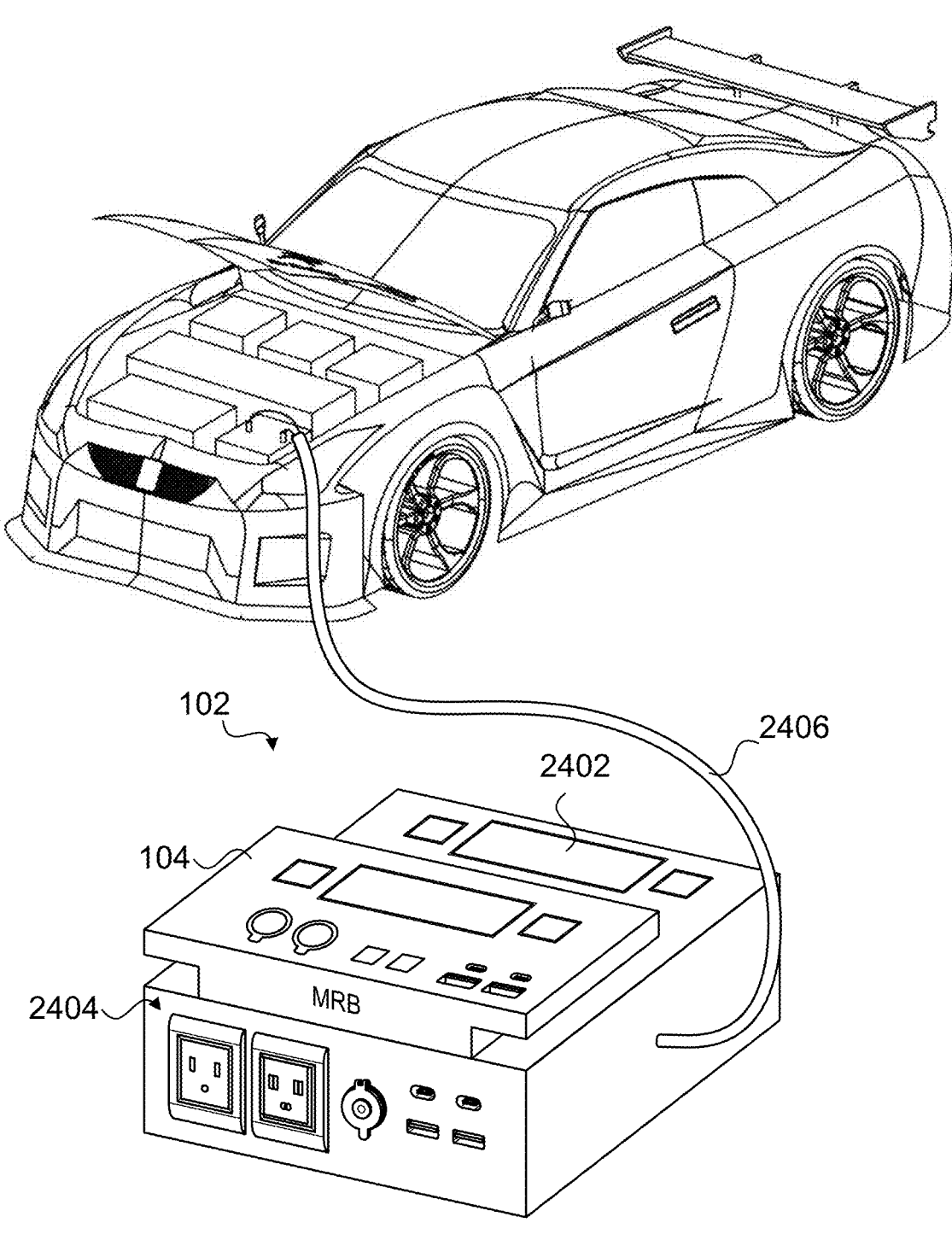
FIG. 24 is a block diagram illustrating a battery assembly having a modular battery architecture and 120V AC inverting capability, according to some examples.

FIG. 24 illustrates a battery assembly 102, according to some examples, having a modular battery architecture and 120V AC inverting capability. Example elements include:

A mobile BU 104;

An MRB 106 comprising a rechargeable lithium-ion or other battery pack.

An integrated display and control panel 2402, secured within the BU 104 allows the user to view battery state of charge and operating data. The display and control panel 2402 may incorporate an LCD or OLED graphical display driven by an embedded controller. Membrane buttons or a touchscreen allow user control of features like activating DC or AC outputs.

A 12V to 120V inverter (not shown) converts the MRB's DC power into 120V 60 Hz AC power compatible with residential and commercial electrical loads. The inverter may utilize a high-frequency H-bridge topology with MOSFET or IGBT switches to generate the AC waveform. Feedback control stabilizes voltage and frequency over the battery discharge curve.

The inverter AC output 2404 is connected to one or more Edison 120V or NEMA 5-15 receptacles to supply standard 120V appliances with up to 15 A current per outlet. The inverter may also incorporate a NEMA 5-20 receptacle for 20 A loads.

The input to mobile BU 104 is connected to a 12V DC automotive receptacle designed to mate with a heavy-duty charging cable 2406. This cable 2406 may have copper clamps or, alternately, a high-current connector and adapter to attach directly to 12V battery terminals in vehicles or other host equipment. It allows recharging the MRB 106 from the host alternator or generator.

Additional 12V DC and USB-A and or USB-C receptacles allow direct connection of electronics like mobile phones, tablets, and notebook computers. These outputs may be fed from DC-DC converters to provide stable, regulated power with overload protection.

Figure 25:
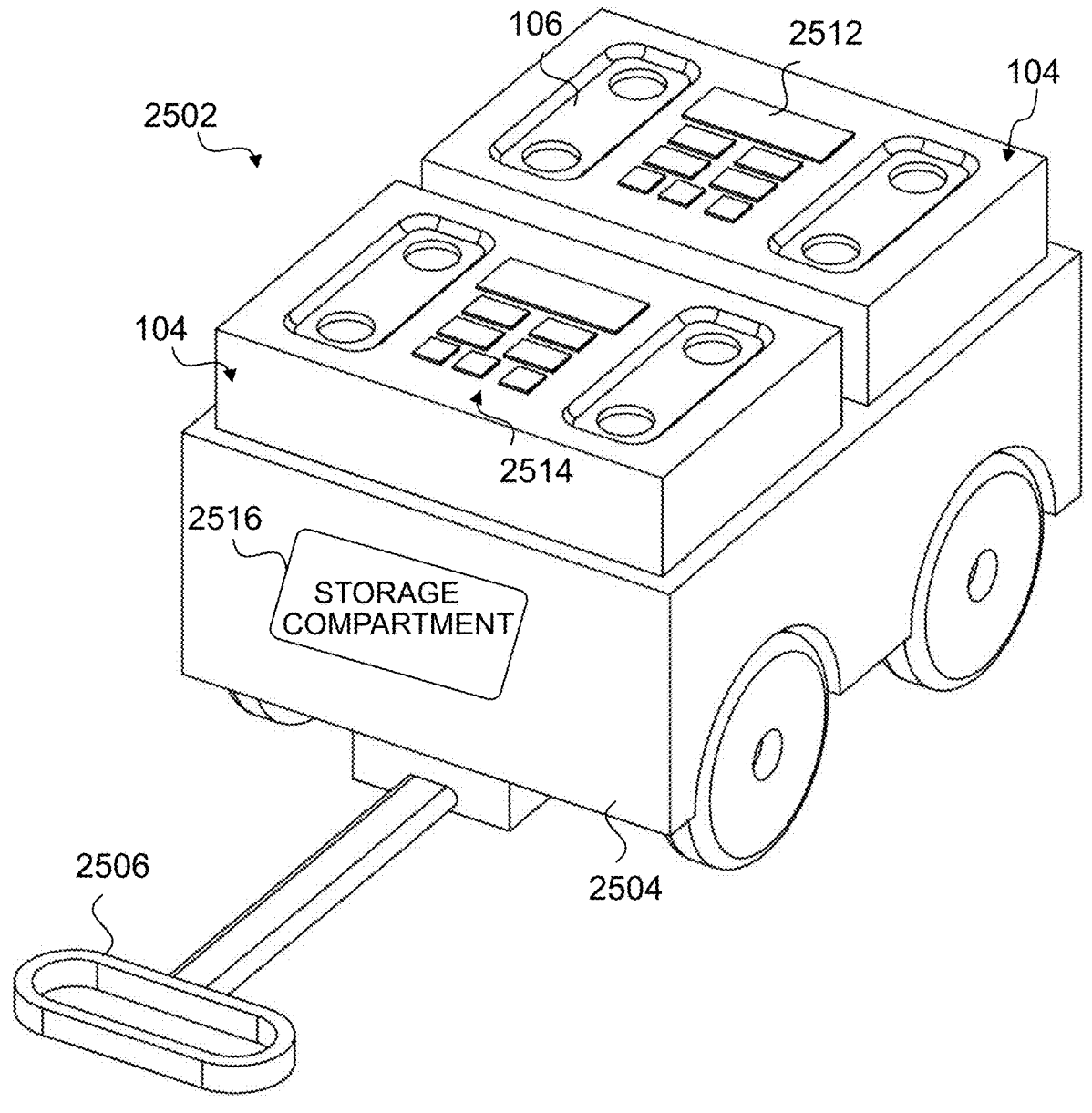
FIG. 25 is a block diagram illustrating a battery assembly with a base unit containing multiple modular replaceable batteries, a keep-alive starting battery, and an inverter for providing AC power output to both internal and external loads, according to some examples.

FIG. 25 illustrates a cart-mounted mobile base unit (CMBU 2502), according to some examples, which provides transportable modular battery capabilities. The CMBU 2502 includes a wheeled cart 2504 with a pull handle 2506 to allow easy movement by a user and storage compartment 2516 to allow for the convenient storage of power cords, cables and other items.

The cart 2504 securely carries two separate mobile BUs 104, each capable of holding one or more MRBs 106 that can be independently inserted and removed from the mobile BUs 104 as needed while the BU 104 remains mounted on the cart.

The BUs 104 provide a source of uninterruptable power by allowing hot-swapping of the MRBs 106. While a first MRB 106 discharges to supply loads, a second MRB 106 can be removed and transported to a charging location. Once recharged, the second MRB 106 is returned to a BU 104 for use, enabling continuous operation and the ability to provide power for an unlimited time.

Each BU 104 on the cart 2504 may comprise an integrated 120V AC line to 12V DC power supply/battery charger. This allows the BU 104 to recharge inserted MRBs 106 from utility power, generators, solar panels, wind turbines, or other AC power sources by converting the AC input to the required DC charging voltage.

The BUs 104 may also each contain a multi-function display 2512 allowing the user to monitor charging status and battery levels. Each BU 104 further incorporates a 12V DC to 120V AC inverter to transform the DC MRB power into standard 120V AC to run tools, lights, appliances, and other electronics. The inverter output connects to one or more NEMA 5-15 receptacles on the MBU housing to deliver the 120V AC power.

Additionally, each BU 104 may have an outlet array 2514 providing 12V DC Edison receptacles 1402, USB-A or USB-C charging outlets, and cigarette charging outlets to power or charge small electronics like mobile phones and other electronic devices. These DC outputs may be regulated to increase stability.

Thus, the CMBU 2502 provides a modular, transportable power platform combining MBUs, swappable MRBs, and AC/DC power delivery and charging capabilities for flexible operation in the field. The integrated cart 2504 allows easy movement and positioning.

Figure 26:
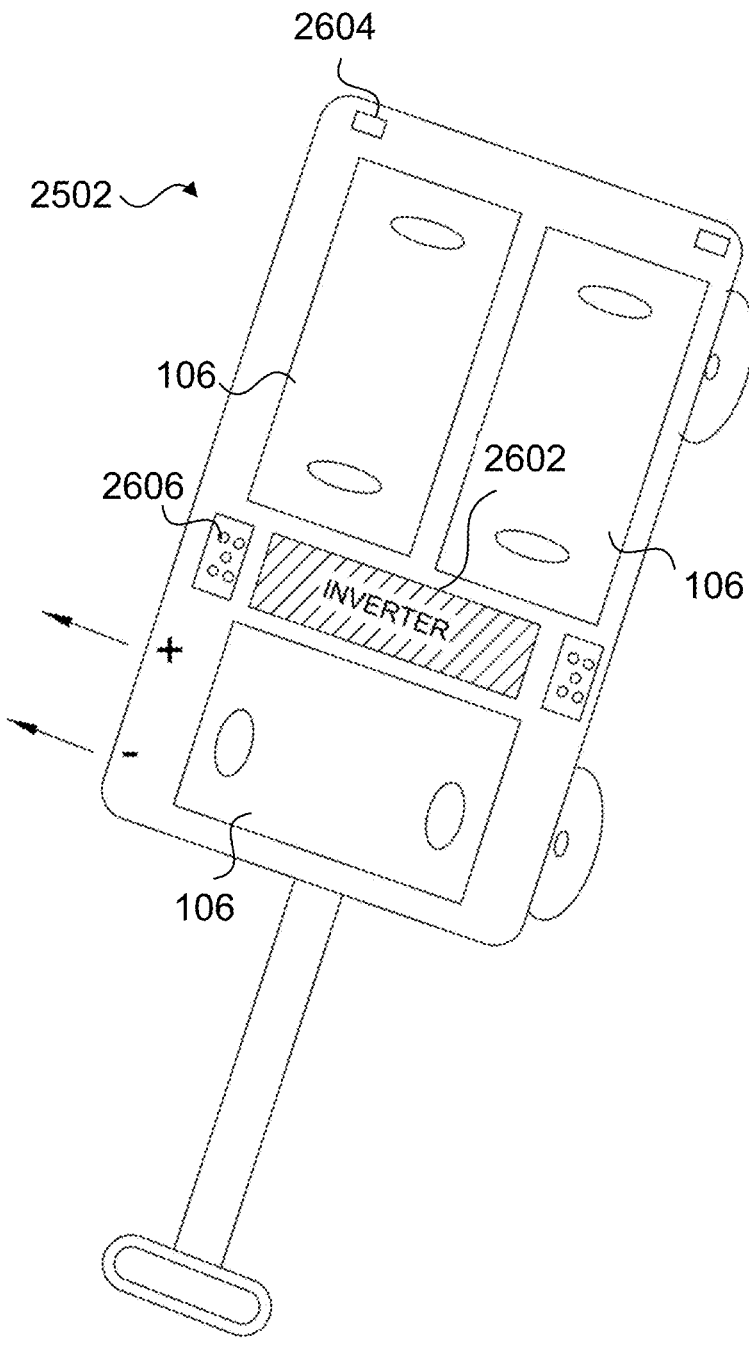
FIG. 26 is a block diagram illustrating a battery assembly with a base unit containing multiple modular replaceable batteries and a keep-alive starting battery, along with a charging system for recharging the batteries from various power sources, according to some examples.

FIG. 26 illustrates a cart-mounted Mobile Base Unit (CMBU 2502), according to some examples, with multiple Modular Replaceable Batteries (MRBs 106) to provide scalable power capacity.

The CMBU 2502 incorporates mounting points for up to three separate MRBs 106, each having a quick connect/disconnect connector and internal electronics designed to allow hot-swapping. This allows the number of installed MRBs 106 to be tailored based on runtime needs.

A display and control panel (not shown) provides operating controls, battery state of charge and voltage readouts, temperature displays, and warning indicators for issues like over-temperature or over-current. This user interface allows monitoring of CMBU 2502 and MRB 106 status.

A built-in power combiner function provided controlled aggregation of the power available from the installed MRBs 106. The power combiner is capable of connecting the individual MRBs 106 in parallel into a single stable DC output or connecting each battery to a separate inverter or DC output. The combined MRB power feeds one or more integrated 12V DC to 120V AC inverters 2602 to generate standard 120V AC electricity for tools, appliances, medical devices, and other electronics needing high-power AC. The inverter's 2602 outputs connect to NEMA 5-15 receptacles on the CMBU housing.

The CMBU 2502 may also provide 12V DC and USB-A and USB-C ports 2604 for charging/powering smaller mobile electronics without inverting and wells as 120V plugs 2606. These DC outputs may be regulated and current-limited for safety. A 120V AC line to 12V DC power supply/battery charger may be included to recharge the installed MRBs 106 from utility power or generators. This allows the CMBU 2502 to be used during power outages to provide a continuous source of power. The CMBU 2502 an be pulled to different locations as needed to recharge and deliver power to desired locations.

A charge controller regulates the MRB 106 charging process based on battery chemistry and capacity. It may incorporate a Bluetooth module to connect with a smartphone app for monitoring and configuration.

Figure 27:
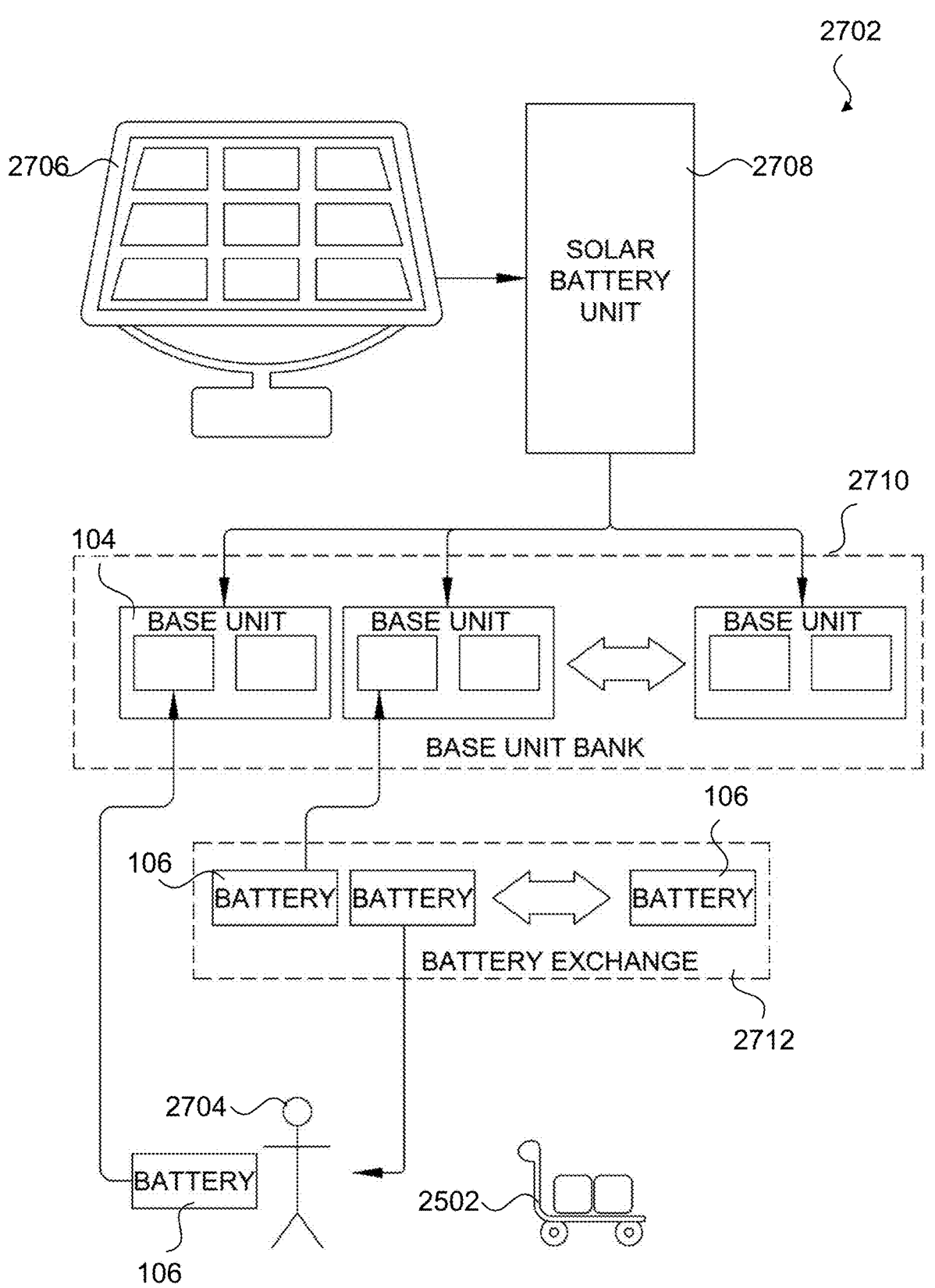
FIG. 27 is a block diagram illustrating a battery assembly with a base unit containing multiple modular replaceable batteries, a keep-alive starting battery, and an inverter, along with a charging system capable of charging from both AC and DC power sources, according to some examples.

FIG. 27 is a schematic diagram of a solar charge station 2702, according to some examples, which enables users 2704 to conveniently exchange and recharge modular batteries (e.g., MRBs 106).

The solar charge station 2702 comprises a solar panel array 2706 coupled to a solar battery unit 2708 which is further connected to a base unit bank 2710 containing multiple base units (BUs 104).

The solar panel array 2706 converts sunlight into electricity to charge the solar battery unit 2708. It may contain an array of high-efficiency monocrystalline silicon or thin-film photovoltaic panels oriented to maximize solar exposure. The solar panel array 2706 may be coupled to a maximum power point tracking (MPPT) DC-DC converter that optimizes the solar voltage and current to maximize power transfer efficiency into the solar battery unit 2708.

The solar battery unit 2708 acts as an intermediate energy storage buffer and comprises rechargeable lithium-ion battery cells capable of high charge/discharge rates. It charges from the solar panel array 2706 when sunlight is available and drives the base unit bank 2710 to charge the modular replaceable batteries (MRBs 106), This allows the lower capacity MRBs 106 to be charged even when direct sunlight is not present. A battery management system (not shown) performs monitoring and control functions to optimize charging, discharging, and protect the longevity of the solar battery unit 2708.

The base unit bank 2710 contains multiple base units (BUs 104), each defining bays 110 to receive, charge, and secure MRBs 106. The base units (BUs 104) adapt the power from the solar battery unit 2708 to provide the required charging voltage and current to the MRBs 106 per the specifications of their lithium-ion battery cells. This may involve DC-DC converters to step down the solar battery unit's voltage.

Users 2704 exchange depleted MRBs 106 for fully charged ones from the battery exchange station 2712. The battery exchange station 2712 acts as a vending machine, dispensing charged MRBs 106 when a user inserts a depleted MRB 106. The depleted MRBs 106 are inserted into the bays 110 of the base unit bank 2710 for recharging.

For example, a user 2704 may arrive in an electric vehicle, such as an e-bike, with a depleted MRB 106. The user 2704 removes this MRB 106 from the vehicle's base unit and inserts it into the battery exchange station 2712 vending machine interface. In exchange, the user receives a freshly charged MRB 106 from the machine's inventory. The depleted MRB 106 is now securely inserted into an available bay 110 of the base unit bank 2710. Integrated electrical connectors 602 mate with the MRB 106 to recharge it once inserted.

A user 2704 may also transport multiple depleted or partially depleted MRBs 106 to the battery exchange station 2712 on a cart-mounted base unit (CMBU 2502), as shown in FIG. 25. The CMBU 2502 provides a convenient way for a user 2704 to collect and transport multiple MRBs 106 that need recharging. It contains a wheeled cart 2504 with an integrated handle 2506 for maneuverability. The cart 2504 securely carries one or more base units (BUs 104), each capable of holding one or more MRBs 106 in bays 110. This allows the user 2704 to gather and transport a large quantity of depleted MRBs 106. For example, the CMBU 2502 may be taken to a construction site that is using MRBs 106 to power tools and equipment. When the MRBs 106 become discharged from usage during the workday, they can be quickly collected by inserting them into available bays 110 of the BUs 104 mounted on the CMBU 2502.

Once loaded up with depleted MRBs 106, the user 2704 simply wheels the CMBU 2502 via handle 2506 to the battery exchange station 2712. At the battery exchange station 2712, the user 2704 can remove the depleted MRBs 106 from the CMBU 2502 and insert them one-by-one or in groups into the vending machine interface of the battery exchange station 2712. The vending machine interface may comprise multiple bays or slots that can each receive an MRB 106. The user simply slides the depleted MRBs 106 into these bays in the machine. Sensors, switches, and locking mechanisms in the vending machine interface detect the insertion of a depleted MRB 106 and unlock a charged MRB 106 from the machine's internal inventory. Conveyors or actuators may move the charged MRBs 106 106 into an accessible slot for the user to remove. Thus, the user exchanges their depleted MRBs 106 by inserting them into the vending machine interface bays and removing an equal number of charged MRBs 106 made available by the machine. This battery-swapping process is quick and convenient.

Some exchange stations 2712 may allow the user 2704 to bypass the vending machine interface and directly insert the depleted MRBs 106 into open bays 110 of the base unit bank 2710. The base unit bank 2710 holding the inventory of charged MRBs 106 can directly exchange depleted and charged MRBs 106 without needing the intermediate vending machine interface. Sensors and indicators on the base unit bank 2710 show which bays 110 contain depleted versus charged MRBs 106. Once the user inserts a depleted MRB 106, an available charged MRB 106 is unlocked for removal by the user. This streamlines the exchange process using intelligent base units 104 with integrated monitoring and control features.

Focusing on the base unit bank 2710, depleted MRBs 106 are securely inserted into the bays 110 of the BUs 104 of the base unit bank 2710 for recharging and return to the battery exchange station 2712.

In some examples, the solar charge station 2702 may not include a battery exchange station 2712. In such examples, the CMBU 2502 is wheeled over to a nearby base unit bank 2710. At the base unit bank 2710, the depleted MRBs 106 in the CMBU 2502 are inserted into open bays 110 of the base unit bank 2710. Once recharged, the CMBU 2502 may be used to transport the replenished MRBs 106 back to the job site for continued use.

The CMBU 2502 system allows easy transportation and handling of multiple MRBs 106 to and from the battery exchange station 2712 using modular, hot-swappable base units 104. This enables convenient swapping and charging of MRBs 106 even when dealing with large quantities.

The solar charge station 2702 may also provide a valuable service for a rural village where modular replaceable batteries (MRBs 106) are used as a primary power source. The MRBs 106 offer a clean, portable means of electricity for houses and transportation.

In such examples, each small home may have a base unit (BU 104) with an inverter to convert the DC power from inserted MRBs 106 into usable 120V AC power for lighting and appliances. When an MRB 106 becomes depleted, the homeowner travels to the centrally located solar charge station 2702 to swap it (or a number of depleted MRBs 106) for freshly charged ones.

Additionally, shared electric vehicles in the community like e-bikes, motorcycles, and cars run on MRBs 106. For example, an e-bike may contain a BU 104 beneath the seat to power the motor. Riders charge or exchange the MRBs 106 at the solar charge station 2702 to quickly get back on the road.

The solar charge station 2702 sustains this ecosystem by continually recharging MRBs 106 using its photovoltaic solar array 2706 and solar battery unit 2708. The solar array 2706 provides renewable energy from the sun, while the solar battery unit 2708 stores this energy to charge MRBs 106 even at night when solar input is unavailable.

The solar charge station 2702 provides a self-contained renewable energy ecosystem to facilitate convenient swapping and charging of modular batteries. The solar panel arrays 2706, solar battery unit 2708, and base unit bank 2710 work synergistically to harness and buffer solar energy for portable use via the hot-swappable MRBs 106. This allows users to keep batteries charged sustainably.

Additional capabilities can be incorporated into the solar charge station 2702 to enhance functionality. For user convenience, wireless communications allow remote monitoring of station status. Cellular, WiFi, or mesh network connectivity enables a central server to track inventory levels, solar generation/charging throughput, and station health metrics. For user convenience, wireless communications from the solar charge station 2702 enable useful notifications and data access. Cellular connectivity allows remote monitoring of station status. A central server aggregates telemetry data on inventory levels, solar generation/charging throughput, and station health metrics.

This information can be accessed by users 2704 via a mobile app or texted directly to users' phones using SMS messaging. Notifications alert users when certain inventory levels are reached, such as when charged modular batteries are near depletion. This helps users plan swap times.

Real-time solar generation data may be used to inform users 2704 of available charging rates. Users 2704 can thus optimize when to swap batteries based on solar conditions. For instance, waiting until mid-day may allow faster charging versus morning hours. Users can also access metrics on the state of charge (SoC) of the solar battery unit 2708. This indicates the stored backup energy available for overnight charging when solar panels are inactive. Users can check if their battery swap can be fully recharged during the day or if it will extend overnight.

Operational diagnostics are also pushed to operators of the solar charge station 2702, such as cooling system function or battery health indicators. Analytics track modular battery lifespan and charging patterns over time. Operators can thus see metrics on their battery usage and station resource consumption overall. This data guides personal usage habits and station planning.

By providing data access and timely notifications, the solar charge station 2702 allows users and operators to make informed decisions on when and how they utilize the community charging resources. This enables an optimization of the shared sustainable ecosystem.

User and inventory tracking provides data like user charging patterns and modular battery lifespans. These analytics may better inform load balancing, pricing, and resource planning. Users may carry RFID cards or use a mobile app for identification at the station.

Touchscreen displays may provide an intuitive user interface for swapping modular batteries. Step-by-step instructions, charging status, account management, and diagnostics data can be accessed. Voice commands may also be supported.

Intelligent diagnostics and control algorithms may optimize operation. For instance, machine learning may be used to forecast solar availability and adjust charging accordingly. Load balancing assigns charging current across base units in an optimal fashion. Cooling fans and thermal management regulate temperatures.

Figure 28:
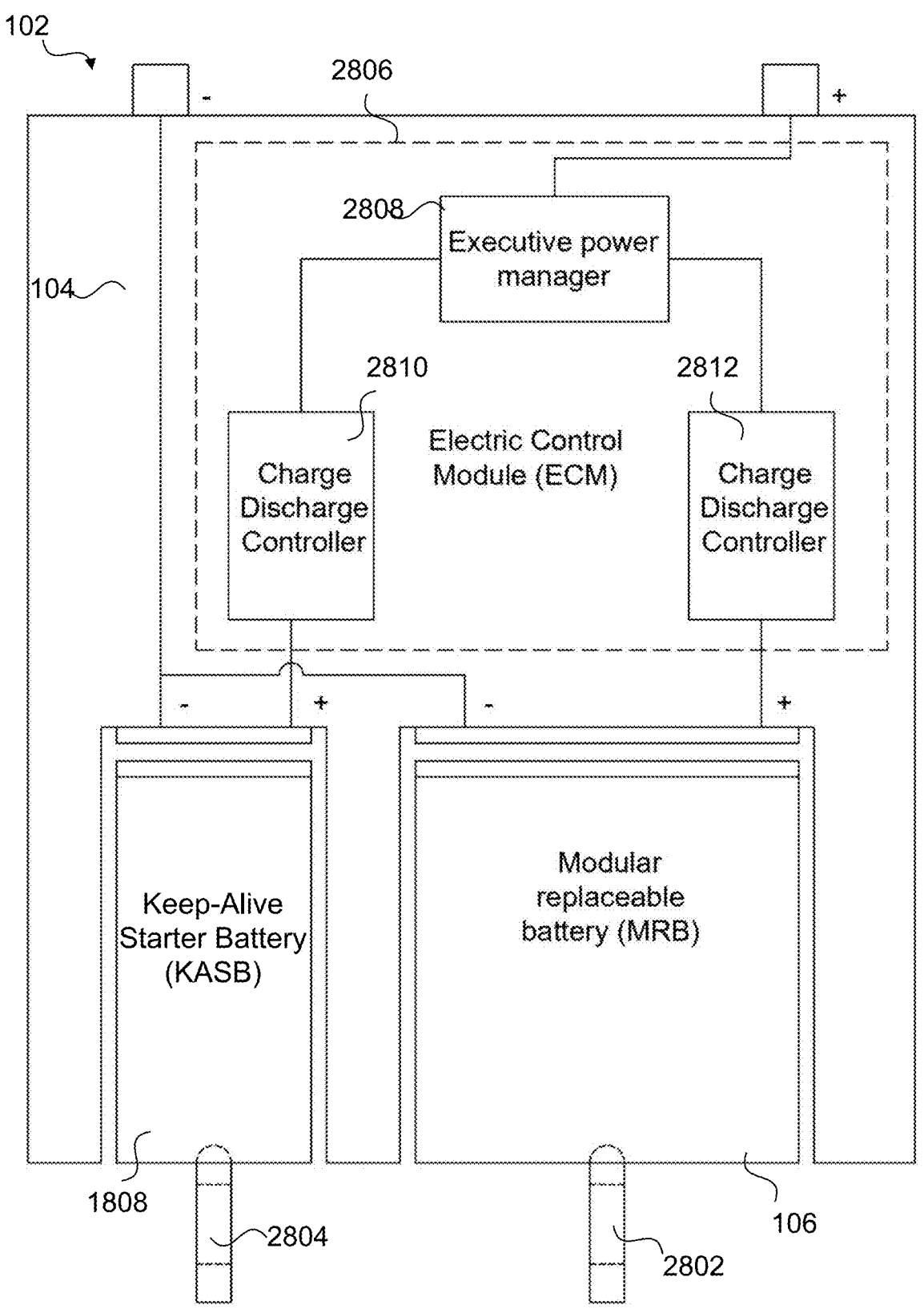
FIG. 28 is a block diagram illustrating a battery assembly with a base unit containing multiple modular replaceable batteries and a keep-alive starting battery, along with a sophisticated battery management system for optimizing battery performance and longevity, according to some examples.

FIG. 28 illustrates a battery assembly 102 with a Permanently Mounted BU 104, according to some examples, with electronic control capabilities and fold-out handles on the Modular Replaceable Battery (MRB 106) and Keep-Alive Starting Battery (KASB 1808).

The MRB 106 contains an integrated flush-mount carry handle 2802 that can fold out to enable easy removal from the bay 110 of the BU 104. This provides a low profile for tight battery compartment installations while still allowing hot-swapping.

Similarly, the KASB vehicle charging controller 2202 contains a fold-out flush handle 2804 to simplify extraction for service or replacement while minimizing protrusions.

An Electronic Control Module (ECM 2806) governs the electrical systems of the BU 104 using an Executive Power Manager (EPM 2808) and associated circuitry, including a charge/discharge controller 2810 coupled to the KASB 1808 and charge/discharge controller 2812 coupled to the MRB 106.

The EPM 2808 may comprise a microcontroller or automotive-grade engine control unit executing advanced embedded software algorithms. It monitors states and manages the BU 104 components based on programming optimized for the modular battery architecture. For example, the EPM 2808 supervises the charging and discharging of both the MRB 106 and the KASB 1808 based on their chemistries using dedicated charge/discharge controllers (e.g., charge/discharge controller 2810 and charge/discharge controller 2812). This regulates currents and voltages for safe, efficient operation.

The EPM 2808 may track key parameters like voltage and the flow of current and power to and from the BU, KSAB, and MRB, operating temperature at multiple locations, and battery state of charge. It may exchange information with the MRB 106 and KASB 1808 battery management systems over the control area network bus.

By intelligently monitoring and controlling electrical systems and components of the BU 104, the ECM 2806/EPM 2808 optimizes the performance, life, and safety of the critical power sources.

For example, the ECM 2806 may limit the charging current to a fully or partially discharged MRB 106 to prevent overloading a vehicle charging system (e.g., alternator and or voltage regulator) or the battery within the MRB or the ECM 2806 may exercise control over the electrical system to ensure that adequate starting current is available to crank the engine and start the vehicle as specified. The ECM 2806 may further detect and respond to BMS fault conditions such as when high/low limits are exceeded for charging or discharging currents or temperature extremes, or battery cells becoming out of balance. The ECM 2806 may also activate electrical heaters within the KASB and or the MRB when needed.

The ECM 2806 may further comprise the capability to connect to components such as external temperature or current sensors to control currents or voltages that affect the vehicle charging system performance (e.g., to sense the temperature of the alternator or the KASB and or the MRB 106 and control the alternator field current to achieve a desired set point or to switch it on or off).

The KASB 1808 and MRB 106 may further include electric heating elements designed to ensure that their respective battery packs are heated to a temperature that is safe for charging even in cold weather.

The KASB 1808 and or MRB 106 may further each have a Battery Management System (BMS) that works in conjunction with the ECM 2806 to ensure safe and optimized operation of the KASB 1808 and MRB 106 battery packs with the vehicle's charging system to optimize the performance of the KASB 1808 and MRB 106 battery packs when they are charging, discharging, or being maintained in an operating or non-operating condition.

The MRB 106 and, optionally, the KASB 1808, are removable and swappable with another BU 104 (e.g., permanently mounted or mobile). This feature may allow one KASB 1808 and MRB 106 to support multiple vehicles, each with an installed BU 104, when it is desired to operate only one vehicle at a time. This feature may also allow the KASB 1808 to keep-alive and even start a vehicle when the MRB 106 has been removed and potentially used in a different location.

Figure 29:
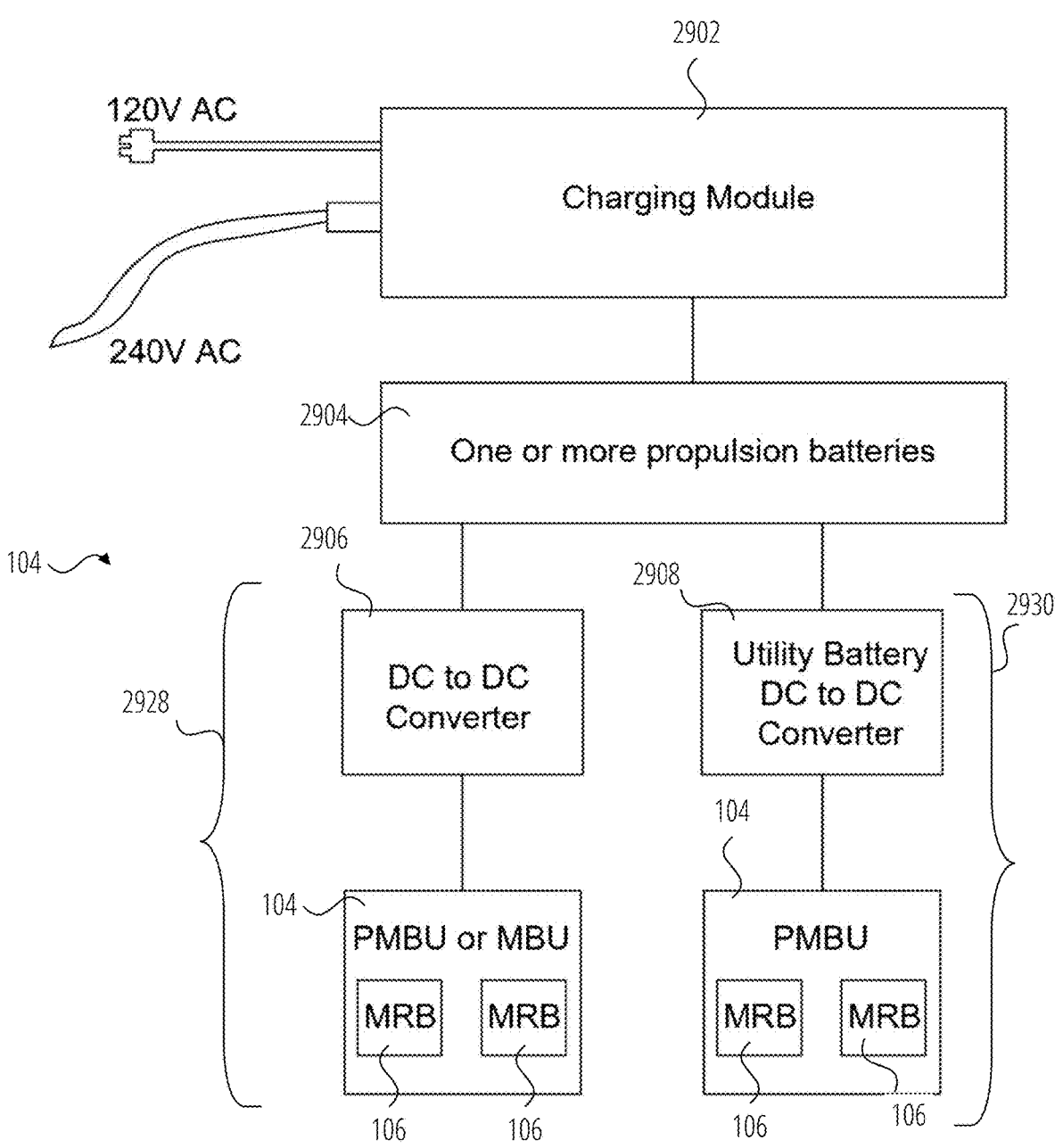
FIG. 29 is a block diagram illustrating a battery assembly with a base unit containing multiple modular replaceable batteries, a keep-alive starting battery, and an inverter, along with advanced monitoring and control systems for managing power distribution and battery health, according to some examples.

FIG. 29 shows configurations using Modular Replaceable Batteries (MRBs 106). Some examples include an electric vehicle (EV) charging module 2902, one or more of the EVs propulsion batteries 2904, connected to either the EV's original equipment utility power system DC-to-DC converter 2908, BU 104, and one or more MRB 106 and an optimized DC-to-DC converter 2906, BU 104, and one or more MRB 106.

A BU 104 may be permanently mounted in the EV or mobile. The BU 104 and one or more MRB 106 replace the EV's OEM battery and may include a charge-discharge system compatibility function to optimize charging and protect the EV and one or more MRB 106 from overcharging or other over-limit of fault conditions. The charge-discharge controller may protect the EV's utility power system DC-to-DC converter 2908, the EV's electrical system, and multiple MRBs 106 from inadvertent damage by limiting charging and or discharging current and properly responding to fault conditions such as exceeding voltage, current, or temperature limits and including circuits as described elsewhere to protect the BU 104, MRB 106, and EV from harmful electrical transients.

The BU 104, one or more MRB 106, and DC-to-DC converter 2906 optimized for charging one or more MRB 106 may either replace the EV's factory-supplied battery or may be supplied with a new vehicle as original equipment.

The MRBs 106 may provide battery power to the EV's utility power system or be removably detached and used to provide power at another location, and later be replaced and recharged. The MRBs 106 may derive their charge from the EV's propulsion battery 2904 and alternatively from charging module 2902 while inserted in the bays 110 of the BU 104.

To implement the charge-discharge system compatibility, the BU 104 may contain a DC-to-DC converter 2906 to adapt the high voltage of the EV propulsion battery 2904 down to the lower voltage range of the MRBs 106. This DC-to-DC converter 2906 may be bi-directional to also allow charging the propulsion battery 2904 from the MRBs 106. A battery management system may be included in the BU 104 or the one or more MRBs 106 to monitor the voltage and current levels during charging and discharging to prevent damage, balance the battery cells, and optimize the process. Assuming typical values of 2.5-4 miles per kWh for typical available EVs (e.g., Tesla Model 3, Nissan Leaf, and Chevy Volt), an MRB 106 comprising a 100 Ahr, 12 V nominal Lithium iron phosphate (LFP) battery having about 1.2 kWh of energy storage may provide between 3-5 additional miles of EV driving range in an emergency situation. If a user had several MRBs 106 on hand, this could give them enough extra miles of range to make a difference in a situation when no charger is available.

When a MRB 106 is depleted and removed from the BU 104, the BU's battery management system may be designed to detect this removal and may open contactors or relays to isolate the electrical interface, preventing or mitigating hazardous conditions in the empty bay 110. The BU 104 is designed with robust connectors to withstand frequent insertion and removal of MRBs 106 throughout its service life. Diagnostics capabilities may be included to monitor the state of charge, track charge/discharge cycles, and help optimize the performance and health of the MRBs 106 and the overall system. A BU 104 may be equipped with a keep-alive battery to maintain the operation of the EV's utility electronics systems during the off-state or at other times when needed such as when a partly or fully discharged MRB 106 is installed in BU 104.

The integration of MRB 106 charging into an EV's high-capacity propulsion battery system leverages the existing onboard energy storage for convenient recharging of removable modular batteries. This provides flexible multi-purpose mobile power capabilities and allows users to continuously share and shift small amounts of energy between vehicles and other locations where energy might be used, or chargers may be located.

Some examples may include the EV's charging module 2902, one or more of the EV's propulsion batteries 2904, a Permanently Mounted Base Unit (BU 104) and/or a Modular Base Unit (BU 104), one or more Modular Replaceable Batteries (MRBs 106), and a DC-to-DC converter 2906 designed to optimally charge the one or more MRBs 106 inserted into the BUs 104 using power from the EV's propulsion batteries 2904.

The MRBs 106 may be removably detached and used to provide power at another location, and later be replaced and recharged. A permanently mounted BU 104 may be installed as an aftermarket accessory or may be supplied with a new vehicle as original equipment. A mobile BU 104 may be permanently installed in the EV but may comprise a cable to connect and disconnect it from the DC-to-DC converter 2906.

DC-to-DC converter 2908 and DC-to-DC converter 2906 adapt the high voltage of the EV's propulsion battery 2904 pack (e.g., 200-400V) down to the lower operating voltage of the MRBs 106 (e.g., 12-48V). The DC-to-DC converter 2908, and DC-to-DC converter 2906 may use a topology such as an isolated flyback, forward, push-pull, or full-bridge configuration with a transformer or coupled inductor on the primary side to provide galvanic isolation and voltage transformation. The secondary side rectifies and filters the waveform to generate the required DC voltage for charging the MRBs 106.

Each of the DC-to-DC converter 2908 and DC-to-DC converter 2906 is designed for high efficiency to minimize losses during the conversion process. This may involve using low on-resistance power MOSFETs or IGBTs as switching devices and fast switching frequencies in the range of 100 kHz to 1 MHz to reduce transformer size. Feedback control loops regulate the output voltage and current for safe and optimal charging of the MRBs 106 per the lithium-ion charging specifications.

The permanently mounted BU 104 or mobile BU 104 battery management system may monitor individual MRB 106 state of charge and health metrics during charging and may terminate or alter the charging process as needed. It provides dashboards and indicators to optimize charging status and performance. The modular architecture with removable MRBs 106 allows for flexible transportation and the use of charged batteries where needed.

Figure 30:
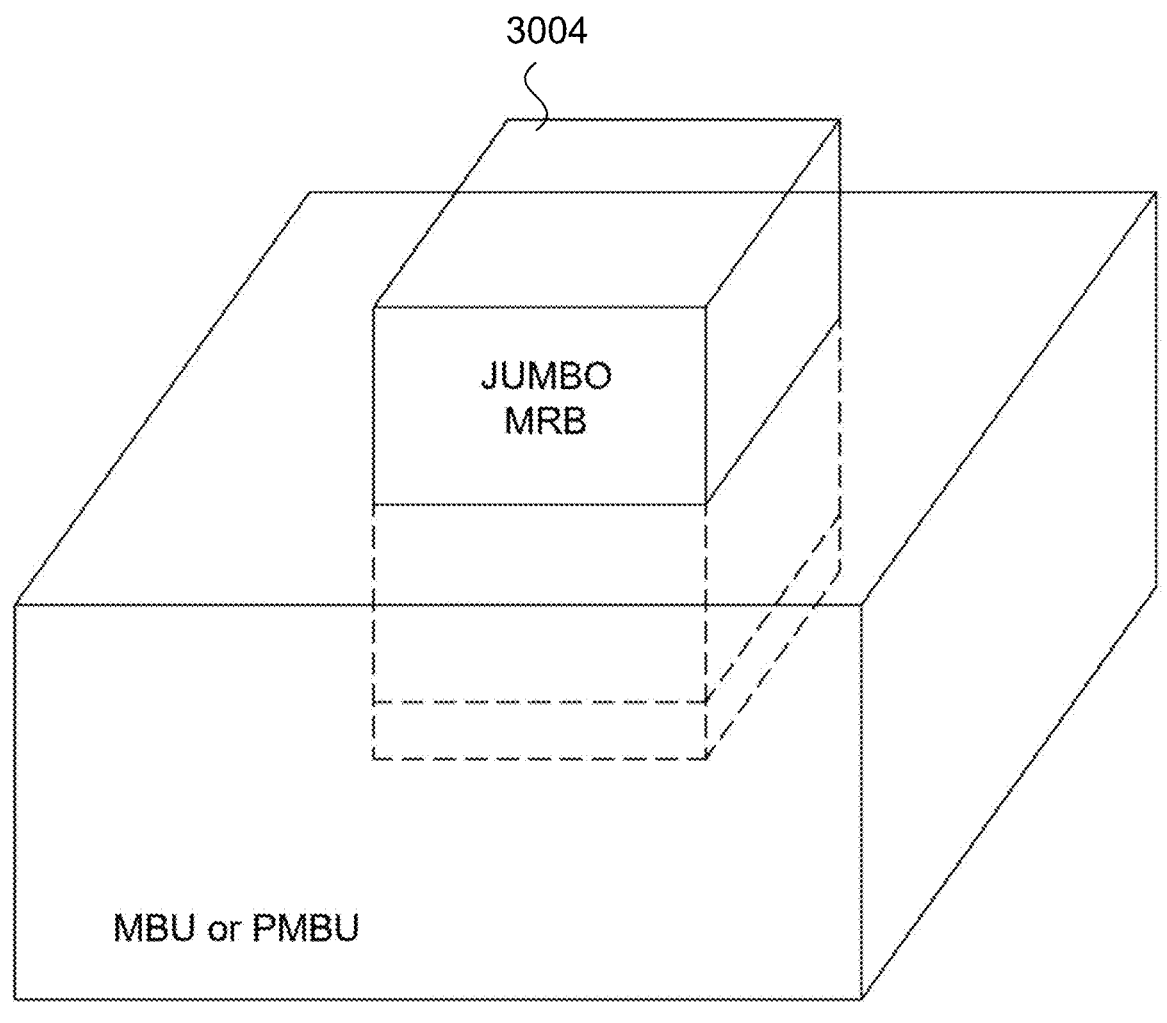
FIG. 30 is a schematic diagram showing a jumbo modular replaceable battery implemented by extending the surface beyond the top surface of the base unit, according to some examples.

FIG. 30 shows a jumbo MRB 3004, according to some examples, implemented by extending the surface of jumbo MRB 3004 beyond the top surface of BU 104 thereby increasing its energy storage capacity (in Watt-hrs) in proportion to the extra volume added to the jumbo MRB 3004. The jumbo MRB 3004 interfaced mechanically and electronically to BU 104 in essentially the same way as previously described for MRB 106.

FIG. 31 is a diagrammatic depiction of a connection configuration, according to some examples, for a battery assembly, which includes a mobile base unit (e.g., a BU 104), containing a battery 3128 (e.g., an MRB 106 or permanent battery) and an inverter 3126. The connection configuration enables the battery assembly 102 to safely provide supplemental electrical power to devices on a branch circuit 3102 in a building, for example. The configuration uses the existing electrical wiring infrastructure without needing to modify (e.g., add a transfer switch) or rewire the building's electrical system. The branch circuit 3102 is shown to have hot lead 3108, neutral lead 3110, and ground lead 3112 that connect through an electrical service panel 3104 to one or more electricity sources 3114 (e.g., a generator or utility mains).

At a high level, the operation of the illustrated configuration involves the manual or automatic opening of a circuit breaker 3106 for a specific branch circuit 3102 to be powered, thus isolating the branch circuit 3102 from the main utility or generator supply. The battery assembly 102 containing the rechargeable battery 3128 and inverter 3126 is then plugged into an electrical Edison receptacle 3124 on that branch circuit 3102 downstream from the open circuit breaker 3106 using a standard male-to-female extension cord with the male end inserted into female Edison receptacle 3124 and the female end inserted into a recessed male Edison receptacle 3127 mounted beneath the surface of mobile BU 104 (such as those used for RV shore power connectors).

The inverter 3126 of the battery assembly 102 converts DC power from the battery 3128 into 120V AC power compatible with loads 3120, such as residential appliances and devices, connected to the branch circuit 3102 by one or more female Edison receptacles 3124. This 120V AC from the inverter is provided through female Edison receptacle 3122 to loads 3120 (e.g., devices such as internet routers, televisions, audio equipment, lighting, refrigerators, etc.) also plugged into female Edison receptacles on the same disconnected branch circuit 3102. In this manner, the battery assembly 102 can provide backup power to an isolated branch circuit 3102 without the risks of back feeding current to the main electricity supply, power grid, electrical utility, etc.

The battery assembly 102 may contain advanced sensing and control circuits, for example implemented algorithmically within a microcontroller or field programmable gate array (FPGA) based controller 3130, to continuously monitor the branch circuit 3102 electrical conditions and ensure safe operation.

The controller 3130 may, in some examples, measure branch circuit voltages using analog to digital converters, switching devices, resistive dividers, Hall effect sensors, or other voltage measurement components. If any voltage above a predetermined minimum threshold is detected on the branch circuit 3102, this indicates a potentially hazardous back feed condition and the controller 3130 will prevent the inverter from activating.

Examples of potentially hazardous back feed conditions include: 1). circuit breaker 3106 is closed (rather than open as expected) and an electricity source 3114 is connected through the electrical service panel 3104 and/or directly to the branch circuit 3102, and 2.), circuit breaker 3106 is open (as expected) and/or branch circuit protection device 3118 is activated and an electricity source is connected directly to branch circuit 3102. In either example 1 or example 2, the controller 3130 will detect the presence of electricity on the branch circuit and prevent the inverter from activating.

The controller 3130 may also determine the impedance of the loads connected to the isolated branch circuit 3102, for example, by injecting a small AC signal and measuring the magnitude and phase of the resulting current. From the impedance value and/or other measurements, the controller 3130 may determine that unexpected loads and/or additional household wiring are present. The controller 3130 may only activate the inverter 3126 if the measured impedance is within a predefined safe range indicating that only the intended local loads are connected.

In some examples, if the impedance is lower than a predetermined threshold, the controller 3130 may determine that either there are too many loads (or a load that draws too much power) or circuit breaker 3106 may be closed. Controller 3130 may then prompt the user to check to make sure the circuit breaker 3106 is open before the inverter 3126 can be activated. If the impedance is still below the predetermined threshold even though the user has confirmed that the circuit breaker 3106 is open, controller 3130 may prompt the user to remove loads from the branch circuit 3102 until the impedance rises above the predetermined level required to activate the inverter 3126.

Additionally, the controller 3130 may utilize artificial intelligence and machine learning algorithms to analyze the electrical characteristics of the branch circuit 3102. The algorithms may be trained by recording voltage, current, and power data for known loads, for example. By comparing real-time data to the trained profiles, the controller 3130 can determine if unexpected loads are connected before energizing the branch circuit 3102. This provides further protection against inadvertent back feed conditions.

The controller 3130 may implement these intelligent monitoring functions using a microprocessor or FPGA executing software and firmware-based instructions. Analog-to-digital converters, voltage/current sensors, and communication interfaces may be integrated to acquire electrical data.

Additionally, in some examples, a branch circuit protection device 3118 may be installed in place of, or in addition to, the standard circuit breaker 3106 for the branch circuit 3102, which is connectable to the battery assembly 102. The branch circuit protection device 3118 may contain a switch or relay that can disconnect the hot lead 3108 of the branch circuit 3102 from the main bus bar of the electrical service panel 3104, providing redundant isolation of the branch circuit 3102.

The switch or relay contacts within the branch circuit protection device 3118 are controlled wirelessly or via a wired link by the battery assembly 102. Before activating the inverter 3126, the controller 3130 (e.g., a processor-based microcomputer or controller) of the battery assembly 102 transmits a control signal to the branch circuit protection device 3118 instructing it to open the switch (or relay) and isolate the hot lead 3108 of the branch circuit 3102. This prevents back feeding power from the battery assembly 102 to the electricity source 3114 (e.g., onto the main grid).

The control link between the battery assembly 102 and the branch circuit protection device 3118 may be implemented using protocols like WiFi, Bluetooth, Zigbee, Power Line Communication, or other wired or wireless communications. The open command may also be encoded and transmitted over the power line itself through the existing wiring.

The switch or relay contained in the branch circuit protection device 3118 is capable of interrupting the typical 15-20 Ampere currents typically found in residential and or commercial branch circuits 3102. It may utilize electromechanical relay contacts or solid-state devices like MOSFETs designed for AC switching applications. The branch circuit protection device 3118 derives low voltage DC power for its internal circuitry from the main bus bar of the electrical service panel 3104. It may also contain a backup battery or super capacitor to operate the switch and isolate the branch circuit 3102 even upon total loss of mains power.

Upon receiving the control signal, the branch circuit protection device 3118 uses its internal switch or relay to disconnect the hot lead 3108 from the supply bus bar. This disconnection is verified by the battery assembly 102 by sensing the loss of voltage on the branch circuit 3102. Once isolation is confirmed, the battery assembly 102 activates its inverter to supply power.

When the battery assembly 102 shuts down, it sends a close command to the branch circuit protection device 3118, which then reconnects the branch circuit hot lead 3108 to the bus bar through the standard circuit breaker 3106. This restores normal supply power from the electricity source 3114 (e.g., mains utility or generator source).

By remotely controlling branch circuit 3102 isolation through the integrated branch circuit protection device 3118, the battery assembly 102 can ensure safe operation without relying on the user to manually open the breaker 3106. The branch circuit protection device 3118 provides an additional level of electrical safety and redundancy.

By integrating safety monitoring and branch circuit disconnect control, examples of the configuration enable users to conveniently utilize mobile battery power on existing building wiring without electrical rework or safety risks. The modular architecture leverages standard electrical infrastructure to provide supplemental power where needed.

The apparatus may also incorporate capabilities to automatically isolate the branch circuit 3102 and activate the inverter 3126 upon detecting the loss of supply power from the mains electricity source 3114. This provides uninterrupted backup power to the branch circuit 3102 during grid outages, for example.

To this end, the controller 3130 may continuously monitor the voltage, waveform, or impedance characteristics on the branch circuit 3102. Upon detecting the loss of the standard 50/60 Hz AC mains signal, the controller 3130 transmits a wired or wireless command to the branch circuit protection device 3118 instructing it to open the isolation switch. This disconnects the de-energized branch circuit hot lead from the main supply bus bar in the electrical service panel 3104.

With the branch circuit 3102 is disconnected, the controller 3130 then activates the inverter 3126 to provide backup AC power.

The controller 3130 may also, in some examples, monitor the branch circuit 3102 using various techniques including voltage sensors, waveform zero crossing detectors, reflected waveform analysis, power line communications, and impedance changes. Backup batteries or super capacitors may maintain power to the monitoring circuits when the mains are lost.

The controller 3130 may continuously monitor the branch circuit 3102 to detect loss of mains power using multiple techniques including for example:

Measuring branch circuit hot wire voltage using a resistive voltage divider. A drop to 0V may indicate mains outage.

The branch circuit protection device 3118 may incorporate a voltage sensor on the supply bus bar in the electrical service panel 3104. A bus voltage drop to 0V communicates an outage to the controller 3130.

Zero crossing detection logic in the controller 3130 firmware may be implemented in some examples. Lack of zero crossings for several AC waveform cycles signifies an outage.

The controller 3130 may initiate a test signal onto the branch circuit wiring and analyze reflected waveforms. Changes in reflections may indicate the state of the circuit breaker (open or closed) and potentially altered mains impedance due to an outage.

The controller 3130 may encode power line communication (PLC) keep-alive messages on the branch circuit 3102 wires. If the PLC signal is not returned to the controller 3130, this would signify a power loss.

By implementing redundant mains power loss detection techniques, the controller 3130 may reliably detect grid outages and quickly isolate the branch circuit 3102 using the protection device 3118. This enables fast, seamless activation of the inverter 3126 for uninterrupted backup power to critical loads. The multifaceted sensing provides robust outage detection.

The branch circuit protection device 3118 could also implement some of the mains power loss detection functions or collaborate with the controller 3130. For example:

The branch circuit protection device 3118 may contain its own voltage sensor on the bus bar to detect a grid outage and communicate this to the controller 3130.

The branch circuit protection device 3118 may incorporate zero crossing detection circuits monitoring the mains waveform. Loss of zero crossings would indicate an outage to the controller.

The branch circuit protection device 3118 may transmit reflected waveform test signals or PLC keep-alive messages back to the controller 3130 to confirm mains power status.

A microcontroller in the branch circuit protection device 3118 may collaborate with the controller 3130 on power loss sensing. For example, the branch circuit protection device 3118 may monitor zero crossings while the controller 3130 checks reflected waveforms. The two systems may share outage status over their communication link.

The branch circuit protection device 3118 may open its isolation switch upon sensing a mains outage via its onboard sensors or logic. It may communicate this status to the controller 3130 simultaneously.

The branch circuit protection device 3118 and controller 3130 may each have backup batteries/super capacitors to maintain power during an outage. Both detecting backup power activation would provide redundancy.

Figure 32:
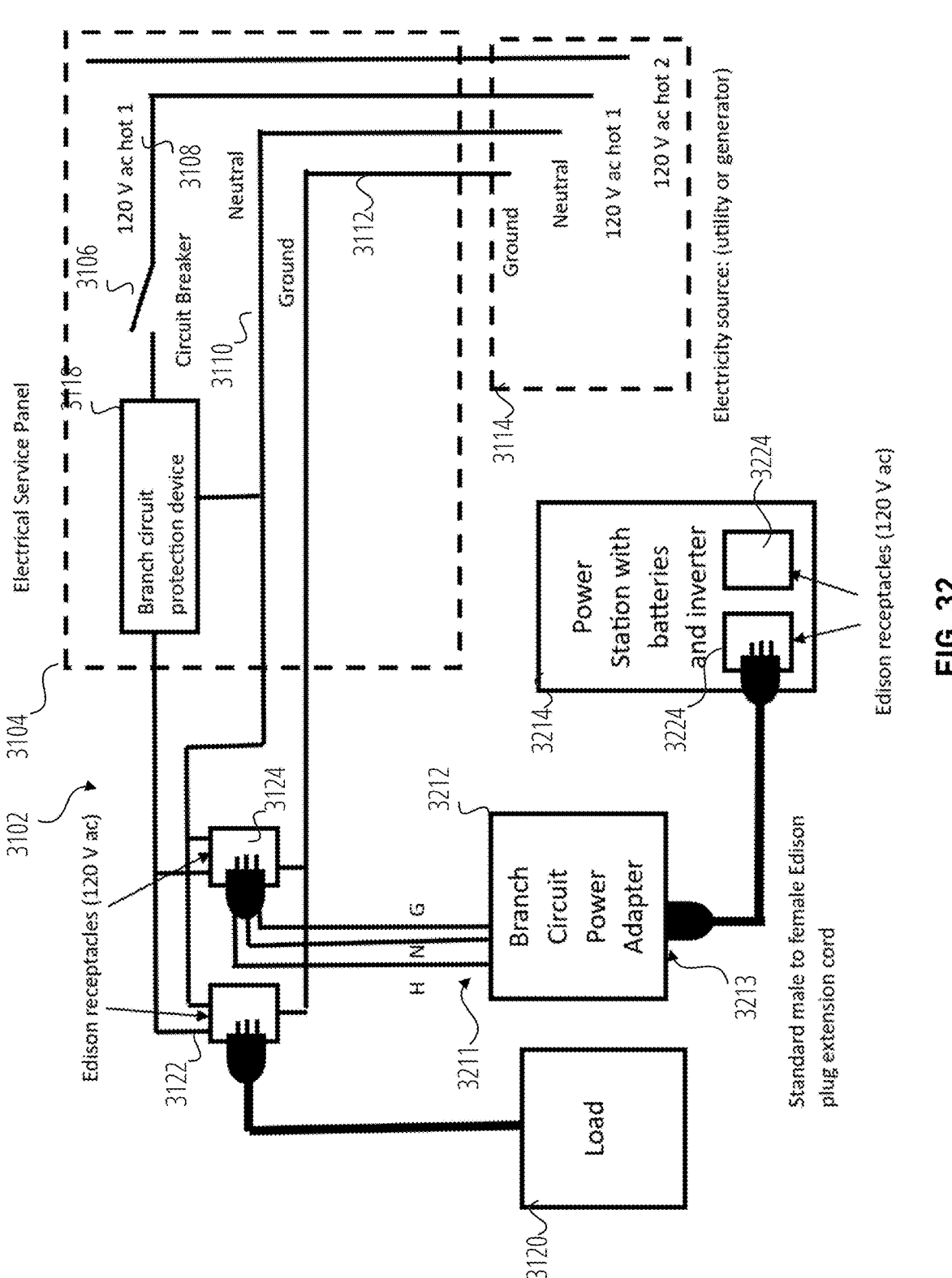
FIG. 32 is a schematic diagram showing a configuration wherein a branch circuit comprising hot, neutral, and ground leads connects one or more female Edison receptacles together to form the branch circuit, according to some examples.

FIG. 32 shows a configuration, according to further examples, wherein a branch circuit 3102 comprising a hot lead 3108, neutral lead 3110, and ground lead 3112 connect one or more female Edison receptacles 3122 and 3124 together to form the branch circuit 3102. The branch circuit 3102 is connected through an electrical service panel 3104 to an electricity source 3114 such as an electric utility or generator.

The electrical service panel 3104 contains a circuit breaker 3106 and a branch circuit protection device 3118. The circuit breaker 3106 and branch circuit protection device 3118 are connected to the hot lead 3108, neutral lead 3110, and ground lead 3112 of the branch circuit 3102. Branch circuit breaker 3106 is optionally a GFCI, Arc fault, or other type of available circuit breaker.

A branch circuit power adapter 3212 is connected to female Edison receptacle 3124 on the branch circuit 3102 by a 3-conductor extension cord with the male plug end inserted into female Edison receptacle 3124 and the female end inserted into a male Edison output receptacle 3211 recessed beneath the surface of branch circuit power adapter 3212 (e.g., such as those used for RV shore power connectors). Power flows from the branch circuit power adapter 3212 through a recessed male Edison output receptacle 3211 to the extension cord and into the branch circuit through female Edison receptacle 3124.

Female Edison input receptacle 3213 on the branch circuit power adapter 3212 is connected through a standard extension cord to female Edison receptacle 3224 on power station 3214. The power station 3214 comprises a battery, an inverter, and one or more female Edison receptacles 3224. Power flows from power station 3214 through female Edison receptacle 3224 to the extension cord and into the branch circuit power adapter through female Edison input receptacle 3213.

The branch circuit power adapter 3212 is capable of electrically disconnecting itself from the branch circuit 3102 if it senses power coming either from the electricity source 3114 (through the electrical service panel) or from another electricity source connected directly to the branch circuit. It can sense this power using techniques such as measuring voltage on the circuit, or any of the techniques and components described above with reference to FIG. 31. It can also disconnect if the load impedance on the branch circuit 3102 is less than a predetermined value, indicating that circuit breaker 3106 is closed or loads in excess of a predetermined limit have been connected to the branch circuit 3102. Impedance can be measured by injecting a small AC signal and measuring the resulting current.

Additionally, the branch circuit power adapter 3212 may utilize artificial intelligence and machine learning to analyze electrical signatures of approved loads. If non-approved loads are detected, it will disconnect power as a safety precaution.

The branch circuit power adapter 3212 can also determine if the circuit breaker 3106 was inadvertently left closed when trying to energize the branch circuit 3102. It will remind the user to open the circuit breaker 3106 before applying power.

The power station 3214 converts DC power from its battery to 120V AC power using its inverter. This 120V AC power is provided to the branch circuit power adapter 3212 through the female Edison receptacle 3224.

The branch circuit protection device 3118 can electrically isolate the branch circuit 3102 from the electricity source

3114 upon receiving a command from the power station 3214 over a communication channel such as RF, Bluetooth, or a power line signal.

Isolation occurs whenever the inverter of the power station 3214 is providing power to loads on the branch circuit 3102. This prevents back feeding of power to the electricity source 3114.

The branch circuit protection device 3118 may contain a switch or relay capable of interrupting the typical 15-20 Amp currents of residential branch circuits. It can derive low-voltage DC power for its internal circuitry from the electrical service panel 3 104 bus bar. A backup battery or super capacitor may be included to operate the switch and isolate the branch circuit 3102 even during a total loss of mains power.

Branch circuit protection device 3118 also be implemented within a device having an equivalent form, fit, and function to a conventional circuit breaker designed to be installed in an electrical service panel 3104. This would allow either battery assembly 102 or branch circuit power adapter 3212 to electrically isolate the branch circuit by installing a replacement circuit breaker rather than installing circuit protection device 3118 which requires wiring steps.

Alternatively, a source of backup power could be safely back fed to a branch circuit 3102 if the circuit breaker 3106 connecting the branch circuit 3102 to the electrical service panel bus was designed to automatically open whenever the power feeding the electrical service panel 3104 was interrupted. The circuit breaker would require a user to manually close it after a power outage.

Figure 33:
FIG. 33 is a system diagram showing a schematic view of a battery assembly with a Distributed Battery Management System including a base unit distributed battery management system, a first distributed battery management system, and a second distributed battery management system, according to some examples.
Figure 33:
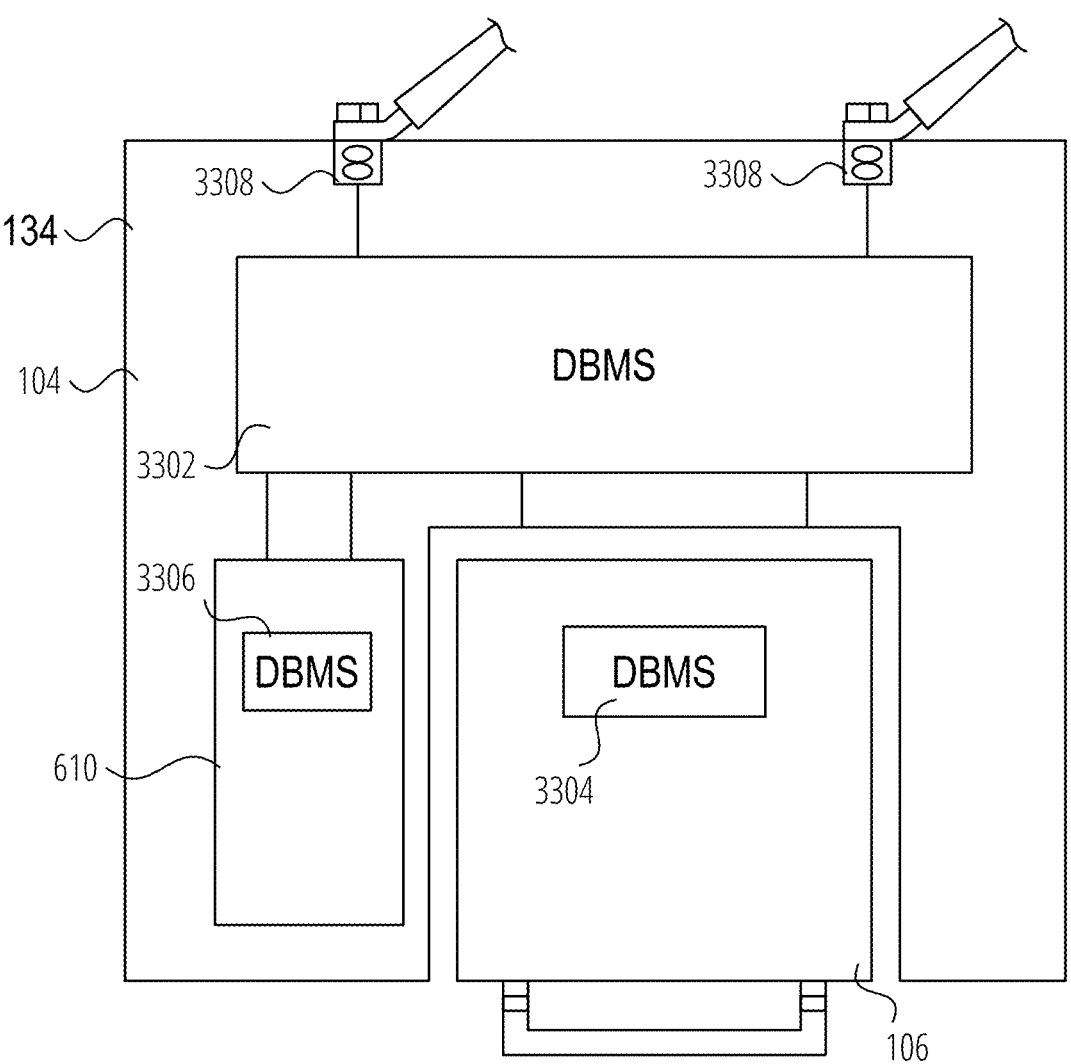

FIG. 33 is a system diagram showing a schematic view of a battery assembly 3300 with a Distributed Battery Management System (DBMS) including a base unit (BU) distributed battery management system (DBMS) 3302, a first distributed battery management system (DBMS) 3304 and second distributed battery management system (DBMS) 3306, according to some examples.

The battery assembly 3300 comprises a base unit (BU) 104 housing a modular replaceable battery (MRB) 106 and a secondary battery 610. The MRB 106 and secondary battery 610 are electrically connected to the BU 104, allowing them to be connected to external systems via the BU 104.

The BU 104 includes a base unit (BU) distributed battery management system (DBMS) 3302 electrically coupled to internally threaded connector terminals 3308. These terminals are designed to receive externally threaded terminal poles, which connect the battery assembly 3300 to a vehicle electrical system via electrical cables.

The MRB 106 is designed to be removable and includes a dedicated first distributed battery management system (DBMS) 3304. The MRB 106 is optimized for high-energy storage, high-power output, and deep-cycle applications. It may provide sufficient energy and/or power to operate on-board auxiliary systems and external devices such as power tools, pumps, winches, coolers, or a travel trailer. The energy stored in an MRB 106 may range from 0.1 kWh to >1 kWh, depending on application requirements.

The secondary battery 610 includes a dedicated second distributed battery management system (DBMS) 3306. This battery is designed to maintain the vehicle's utility electrical systems when the MRB 106 is removed from the BU 104. It may also be used for starting a vehicle with an internal combustion engine (ICE) or supplying supplemental power to an electric vehicle (EV). The secondary battery's stored energy may range from 1 Ah to 100 Ah, (12 Wh to 1,200 Wh at 12V) with typical values between 2-20 Ah at 12V for small, medium, and large size vehicles.

The DBMS is integrated at the system level and distributed across the BU 104, MRB 106, and secondary battery 610. It may be integrated into a higher-level system design.

The DBMS performs various functions, including:
1. Balancing battery cell voltages
2. Monitoring and controlling charging and discharging currents
3. Monitoring and controlling the temperature of both batteries
4. Protecting both batteries and the vehicle's electrical system from damage during extreme operating conditions
5. Simulating the presence of a battery if for any reason, the DBMS finds it necessary to electrically isolate either (or both) of the primary or secondary batteries.

The DBMS employs balancing circuits to equalize cell voltages during charging and discharging cycles. It uses integrated sensors to monitor voltage, current, and temperature. A controller within the DBMS, which may comprise a microcomputer or circuits with programmable logic devices, adjusts operational parameters in real-time to safeguard the batteries and the vehicle's electrical system.

The DBMS includes safety features to respond to overvoltage, over-current, reverse connection, abuse, or temperature conditions exceeding upper or lower limits. These mechanisms actively protect both batteries and the vehicle's electrical system by maintaining operational limits to prevent potential damage. In case of battery isolation, the system may include a super capacitor, resistor, Zener diode, diode stack, or electronic circuit to simulate the presence of a battery and serve as an adequate load to sustain safe operation of the vehicle's alternator and electrical system.

In some examples, an active circuit comprising, analog or digital active devices and an optional microcontroller could be configured and or programmed to simulate a fully charged battery thus minimizing the load on the vehicles battery charging system and power it must dissipate. Such a circuit may regulate the voltage presented to the vehicles' charging system and its current draw to produce a determinably stable output voltage. By maintaining a stable voltage on the vehicles' charging system during any periods of battery isolation, the DBMS would be able to protect both vehicle's charging system and any batteries that it is managing.

The DBMS interacts with thermal management subsystems to actively cool or heat the batteries as needed, ensuring safe and efficient operation across a range of environmental conditions. The electronic circuits used to perform these functions may be preferentially located in the BU 104, MRB 106, or secondary battery 610, depending on system optimization requirements and cost considerations.

Cell balancing or temperature sensing and monitoring circuits may be located within the batteries to avoid wiring through the MRB's quick-disconnector connector.

The DBMS may receive coded information from the MRB 106, allowing it to recognize specific battery chemistries and support tailored charging protocols. The system controller and/or DBMS may be equipped with memory and an external interface to receive software updates, providing updated charging or discharging profiles for MRBs with new battery chemistries, bug fixes, and enhancements based on new information.

The energy storage devices in the MRB 106 and secondary battery 610 may include super capacitors or batteries comprising lead-acid or lithium chemistries with either solid or liquid electrolytes or combinations thereof.

The modular architecture of this battery assembly allows for flexibility in combining different battery types and capacities within the same BU 104, supporting a wide range of applications from small consumer electronics to electric vehicles and large industrial equipment.

The functionality of the different DBMS components (e.g., base unit (BU) distributed battery management system (DBMS) 3302, first distributed battery management system (DBMS) 3304, and second distributed battery management system (DBMS) 3306), which collectively constitute the Distributed Battery Management System (DBMS), may, in some examples, have distinct function sets while managing different aspects of the battery assembly.

The first distributed battery management system (DBMS) 3304 associated with the Modular Replaceable Battery (MRB) 106 may, in some examples, focus on battery management functions specific to the MRB 106. These functions could include:

1. Monitoring and balancing individual cell voltages within the MRB
2. Controlling charging and discharging currents for the MRB
3. Monitoring temperature and implementing thermal management for the MRB
4. Estimating state of charge and state of health for the MRB
5. Implementing safety features specific to the MRB's chemistry and configuration The second distributed battery management system (DBMS) 3306 associated with the secondary battery 610 may perform a function set specifically tailored for the secondary battery 610, such as:

1. Maintaining the vehicle's utility electrical systems when the MRB is removed
2. Managing charging and discharging for engine starting (in ICE vehicles) or supplemental power (in EVs)
3. Implementing specific safety features for the secondary battery's chemistry
4. Optimizing the secondary battery's performance for its keep-alive or starter battery role The base unit (BU) distributed battery management system (DBMS) 3302 may perform a different function set, including the management and coordination of battery-specific functions. Its responsibilities could include:

1. Coordinating communication between the first distributed battery management system (DBMS) 3304 and the second distributed battery management system (DBMS) 3306
2. Managing overall system power distribution
3. Interfacing with the vehicle's electrical system
4. Implementing system-level safety features and fault management
5. Coordinating charging priorities between the MRB and secondary battery
6. Managing software updates for all DBMS components Note that there may be some overlap in these function sets among the DBMS components. For example, all three DBMS components may implement some level of voltage monitoring, current control, and temperature management. The components can communicate and coordinate functions to ensure optimal performance of the entire battery assembly.

The DBMS components may use various communication protocols to exchange data and coordinate their activities. This could include sharing state-of-charge information, coordinating power distribution, and implementing system-wide safety measures. The modular architecture allows for flexibility in distributing functions across the components while maintaining overall system integration.

Thermal Management Assembly 3406

Figure 34:
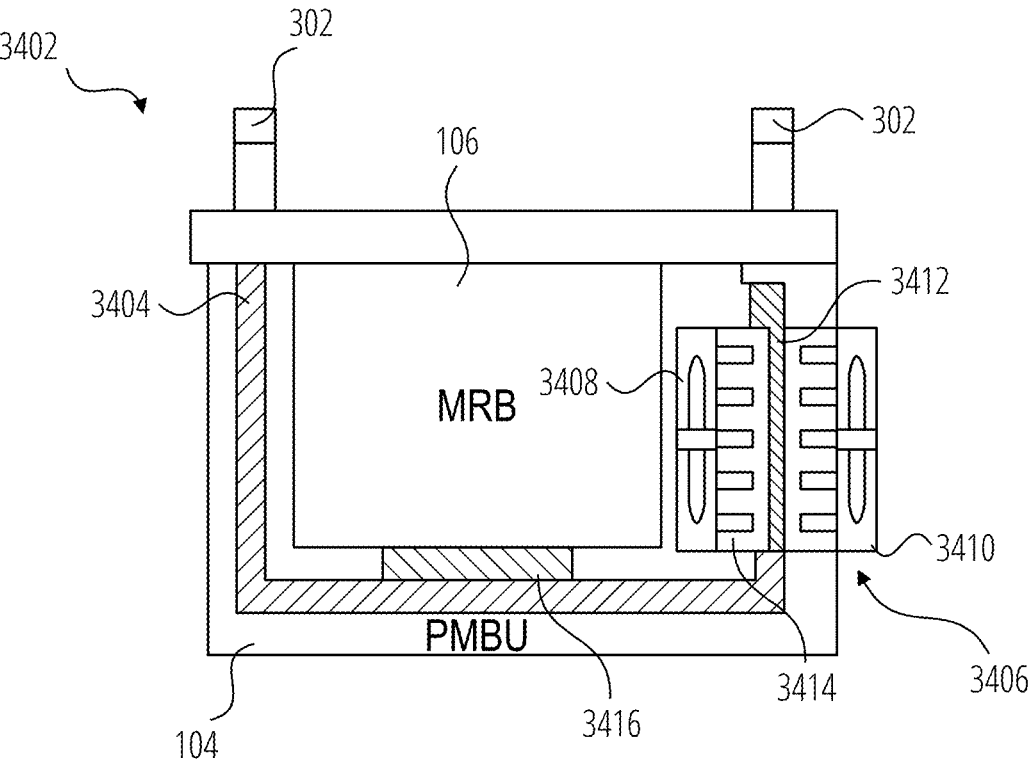
FIG. 34 is a schematic diagram showing a cross-sectional view and an external view of a battery assembly comprising a Base Unit and a Modular Replaceable Battery, according to some examples.
Figure 34:
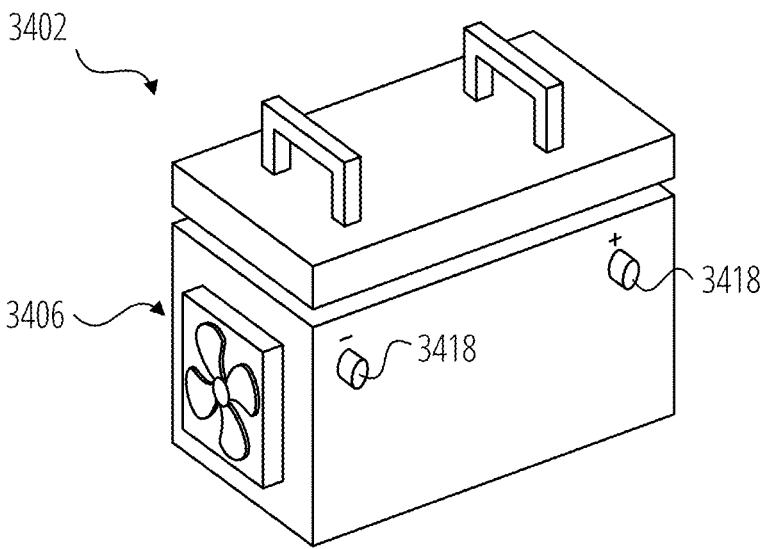

FIG. 34 is a schematic diagram showing a cross-sectional view and an external view of a battery assembly 3402, according to some examples.

The battery assembly 3402 comprises a Base Unit (BU) 104 and a Modular Replaceable Battery (MRB) 106.

The MRB 106 consists of body and lid portions, with handles 302 attached to the lid portion for easy manipulation.

The BU 104 houses the MRB 106 and incorporates a quick disconnect connector 3416. This connector 3416 allows the MRB 106 to be extracted or removed from within the BU 104, facilitating easy battery replacement or maintenance.

An insulation layer 3404 surrounds the MRB 106 within the BU 104. This insulation 3404 provides thermal isolation of the MRB 106 from the surrounding environment, minimizing heat transfer between the battery and its surroundings.

The battery assembly 3402 further includes a thermal management assembly 3406 for temperature management. This assembly comprises:

A Peltier cooler 3412 with opposing heat sinks 3414. The Peltier cooler 3412 functions as an active heat transfer device, capable of pumping heat from one side to the other based on the direction of electric current flow. In some examples, the Peltier cooler 3412 may be in direct thermal contact with the MRB 106 or with a heat sink through which air flows to convectively cool the battery pack.

An interior fan 3408 that actively extracts air from the air gap between the insulation 3404 and the MRB 106. This fan directs the extracted air to one of the heat sinks 3414 associated with the Peltier cooler 3412. The interior fan 3408 enhances convective heat transfer within the battery assembly.

An exterior fan 3410 that actively draws heat from the other heat sink 3414. This fan expels the heat to the external environment, completing the heat transfer process.

The thermal management assembly 3406 may operate to either cool or heat the MRB 106, depending on the ambient conditions and the desired battery temperature.

In some examples, the thermal management assembly 3406 may maintain a pre-determined battery pack temperature or a pre-set acceptable difference in temperature between the battery pack and the ambient air temperature.

The external view of the battery assembly 3402 shows the overall shape of the BU 104 with handles 302 on top.

Battery connection points 3418 are visible, providing electrical interfaces for the battery assembly. The external view also depicts the thermal management assembly 3406 secured to the MRB 106. This configuration provides an efficient and adaptable thermal management system for the Modular Replaceable Battery (MRB) 106, addressing the need to maintain battery temperature within optimal operating and charging limits.

The battery assembly 3402 is designed to ensure performance of the MRB 106 by keeping it within determinable temperature range, thereby preventing potential performance degradation due to exposure to high or low temperatures The thermal management system helps prevent the battery's temperature from exceeding the upper temperature limit programmed into the Battery Management System (BMS) (not shown) of the battery assembly 3402. This avoids triggering fault conditions that could lead to electrical disconnection of the battery or battery pack, which, if not properly managed, could cause damage to certain components of the vehicle's electrical system.

The system's adaptability to various environmental conditions provides advantages, as engine compartment designs vary greatly from vehicle to vehicle, with some having well-ventilated spaces and others having densely packed compartments with less ventilation.

Additionally, environmental factors such as temperature, wind, rain, snow, altitude, and uphill grades can significantly affect the amount of heat generated and temperatures reached during vehicle operation.

The Peltier cooler 3412 with its associated components (heat sinks 3414, interior fan 3408, and exterior fan 3410) provides active cooling or heating as needed. This addresses the need to manage the flow of heat and temperatures in and around batteries deployed in both ICE and electric-based vehicles.

The insulation layer 3404 surrounding the MRB 106 provides thermal isolation, minimizing heat transfer between the battery and its surroundings. This helps in situations where ambient temperatures exceed the battery's operating limits by reducing the amount of heat that the Peltier device must transfer.

The system's configurable design allows for adaptation of its performance through configurable locations for air input and output ports. This enables drawing in air from desired locations within the engine compartment (e.g., coolest, hottest, or somewhere in between) and expelling air to relatively cool areas while minimizing air flow restrictions.

By addressing these aspects, the thermal management system effectively tackles the problem of maintaining battery temperature within safe and efficient operating ranges across various vehicle types, environmental conditions, and usage scenarios. This contributes to improved battery performance, longevity, and overall vehicle electrical system reliability.

Figure 35:
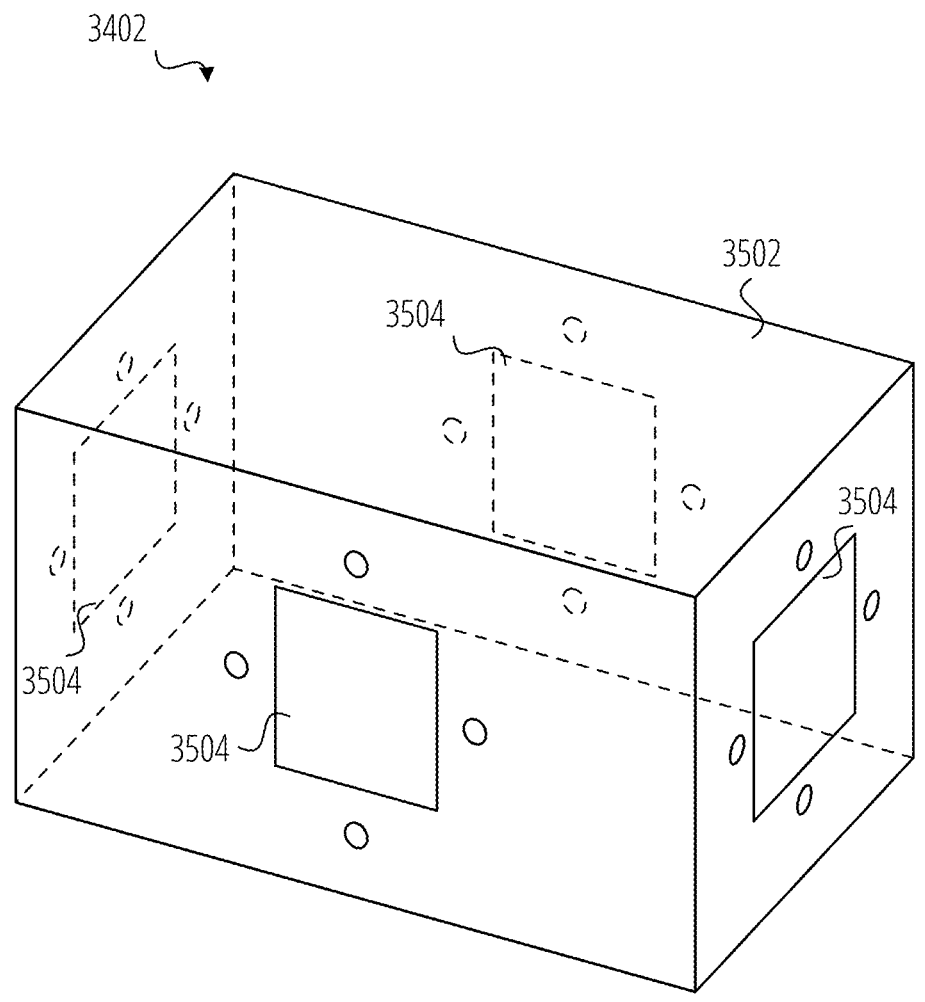
FIG. 35 is a schematic diagram showing multiple views of a base unit with configurable inlet/exit ports for thermal management, according to some examples.

FIG. 35 is a schematic diagram showing a perspective view of a battery assembly 3402 with configurable air inlet and exit ports, according to some examples.

The battery assembly 3402 includes an MRB case 3502 of an MRB 106, the MRB case 3502 having multiple inlet/exit ports 3504 distributed across its various surfaces. These inlet/exit ports 3504 functions as configurable inlet/exit ports, allowing for flexible positioning of airflow in and out of the battery assembly 3402

The configurable nature of the inlet/exit ports 3504 enables the battery assembly 3402 to adapt to diverse installation requirements and environmental conditions within a vehicle's engine compartment. This adaptability may allow for optimized air circulation around the MRB case 3502 to effectively manage its temperature. The inlet/exit ports 3504 may be selectively utilized based on the specific cooling or heating requirements of the MRB case 3502.

In some examples, the inlet/exit ports 3504 may be connected to external air ducts or plenums to direct airflow from cooler or warmer areas of a vehicle engine compartment, as needed. This configuration addresses the variability in engine compartment designs, which can range from well-ventilated spaces to densely packed compartments with limited ventilation.

The battery assembly 3402 may incorporate internal channels or baffles (not shown) to guide airflow efficiently around the MRB case 3502.

These internal structures may direct air from the inlet ports to areas of the battery module and then to the exit ports, ensuring thorough and even temperature management. This design helps mitigate the effects of environmental factors such as temperature, wind, rain, snow, altitude, and uphill grades that can significantly affect the amount of heat generated and temperatures reached during vehicle operation.

In some examples, the battery assembly 3402 may include sensors to monitor air temperature and flow rates through the various inlet/exit ports 3504. Sensor data may be used by a control system (e.g., a battery management system (BMS) 702) to dynamically adjust airflow patterns by selectively opening or closing specific ports to maintain optimal battery temperature. The control system may interface with the vehicle's existing electrical system to coordinate temperature management with overall vehicle operation.

The configurable design of the battery assembly 3402 allows for integration with various vehicle cooling systems. In some examples, the battery assembly 3402 may interface with existing engine compartment ventilation or connect to dedicated battery thermal management systems, providing flexibility in implementation across different vehicle models and configurations. This adaptability is particularly useful in addressing the varying heat generation and ventilation efficiencies found in different vehicle types, from internal combustion engines to electric vehicles.

The inlet/exit ports 3504 may be designed with standardized dimensions to accommodate a range of air duct sizes or quick-connect fittings. This standardization facilitates easy installation and maintenance across various vehicle platforms. In some examples, the inlet/exit ports 3504 may feature adjustable louvers or baffles to fine-tune airflow direction and volume without requiring complete reconfiguration of the ducting.

By providing multiple configurable inlet/exit ports 3504, the battery assembly 3402 addresses the need for innovative ways to manage the flow of heat and temperatures in and around batteries deployed in both ICE and electric-based vehicles.

This design allows for the optimization of battery temperature management in various operating conditions, contributing to improved battery performance, longevity, and overall vehicle electrical system reliability.

Figure 36:
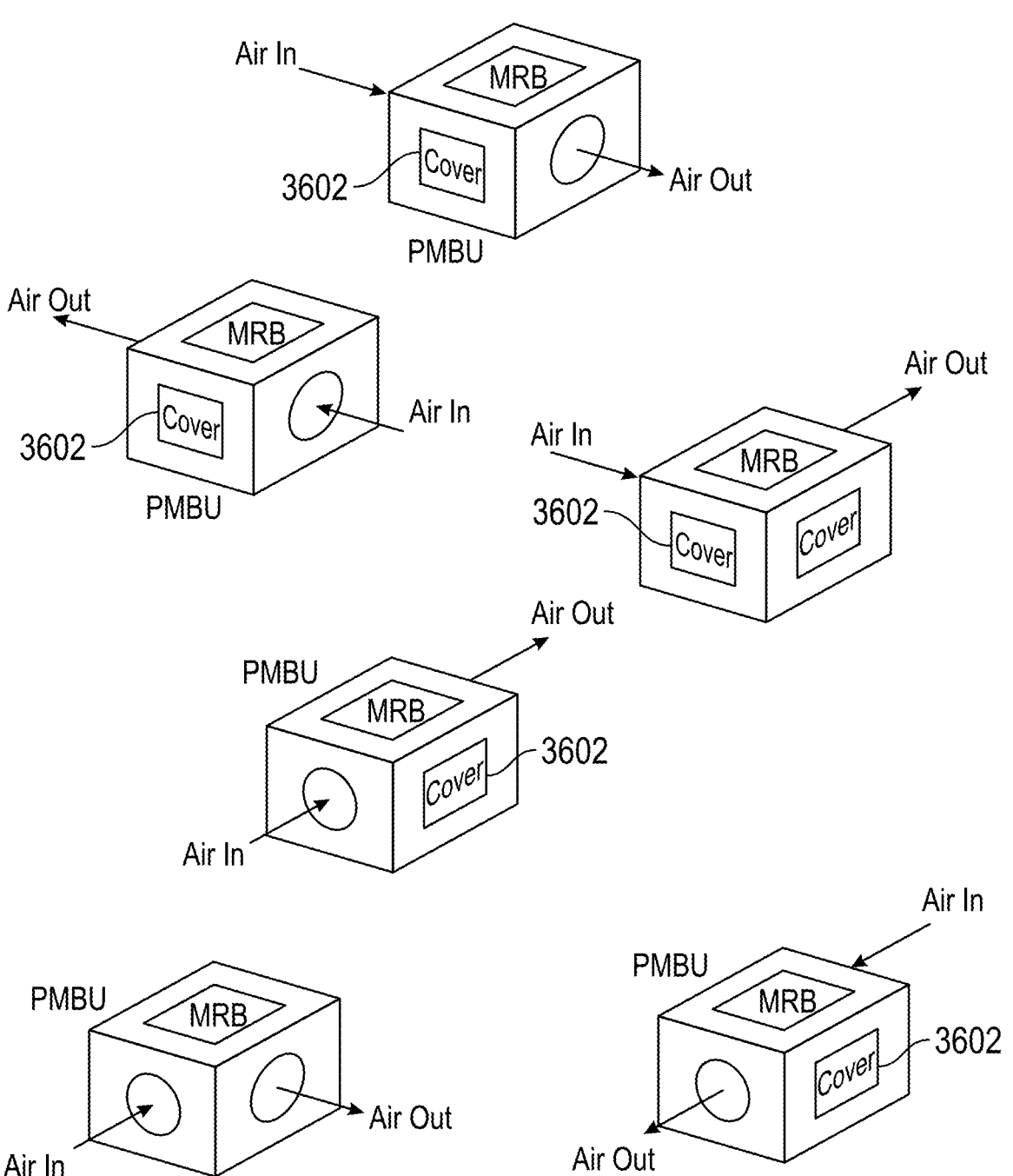
FIG. 36 is a schematic diagram showing multiple cross-sectional views of Base Units with different airflow configurations for cooling or heating a Modular Replaceable Battery, according to some examples.

FIG. 36 is a schematic diagram showing multiple cross-sectional views of Base Units (BUs) 104 with different airflow configurations for cooling or heating a Modular Replaceable Battery (MRB) 106, according to some examples.

The figure illustrates several airflow arrangements within the BU 104:

Top-down cooling: Air enters from the top of the BU 104, flows over the MRB 106, and exits from the side. This configuration allows cooler air to be drawn in from above and directed downward across the MRB 106.

Side-to-side cooling: Air enters from one side of the BU 104, passes over the MRB 106, and exits from the opposite side. This lateral airflow may be advantageous in-vehicle installations where vertical space is limited.

Bottom-up cooling: Air enters from the bottom of the BU 104, flows around the MRB 106, and exits from the top. This setup may be useful when cooler air can be sourced from beneath the vehicle.

Diagonal cooling: Air enters from one corner of the BU 104 and exits from the opposite corner, passing over the MRB 106. This diagonal flow pattern may provide more uniform cooling across the battery surface.

Each configuration in FIG. 36 shows:

An MRB 106 inside the BU 104, representing the battery pack being cooled or heated.

Arrows indicating the direction of airflow, labeled "Air In" and "Air Out" to demonstrate the path of air circulation.

A cover (labeled "Cover") on top of the MRB 106, identified by the reference number 3602.

The covers 3602 play a crucial role in supporting the various airflow arrangements. These covers may be selectively secured to cover or removed from the BU 104 to facilitate different cooling configurations:

In the top-down cooling arrangement, the cover 3602 may be partially removed or perforated to allow air intake from the top of the BU 104.

For side-to-side cooling, the cover 3602 may be fully secured to direct airflow horizontally across the MRB 106.

In the bottom-up configuration, the cover 3602 may be designed with vents or openings to allow heated air to exit from the top of the BU 104.

For diagonal cooling, the cover 3602 may have strategically placed openings at opposite corners to facilitate the diagonal airflow pattern.

The covers 3602 may be designed with removable sections, adjustable vents, or interchangeable panels to allow for easy reconfiguration of the airflow paths. This flexibility enables the BU 104 to be adapted to various installation requirements and environmental conditions.

In some examples, the BU 104 may incorporate internal baffles or channels to guide the airflow efficiently around the MRB 106, ensuring thorough and even temperature management. The covers 3602 may interface with these internal structures to create optimal airflow paths.

The specific flow pattern chosen, and the corresponding cover 3602 configuration may depend on factors such as:

The vehicle's engine compartment layout

The location of heat sources within the engine bay

The ambient temperature conditions.

The specific thermal characteristics of the MRB 106

By providing these diverse cooling options using configurable covers 3602, the BU 104 design aims to maintain the MRB 106 within its operating and charging temperature range across a wide variety of vehicle types and usage scenarios. This adaptability addresses challenges such as:

1. Adapting to various engine compartment designs, from well-ventilated spaces to densely packed areas with limited airflow.
2. Managing heat generated by different vehicle types, including both internal combustion engines and electric vehicles.
3. Accommodating environmental factors like temperature extremes, altitude, and vehicle operating conditions that affect heat generation and dissipation.

The configurable nature of the covers 3602 and air inlet/exit ports allows for adaptation to diverse vehicle layouts and thermal management needs, enhancing battery performance, longevity, and overall system reliability.

Terminal Posts 3712

Figure 37:
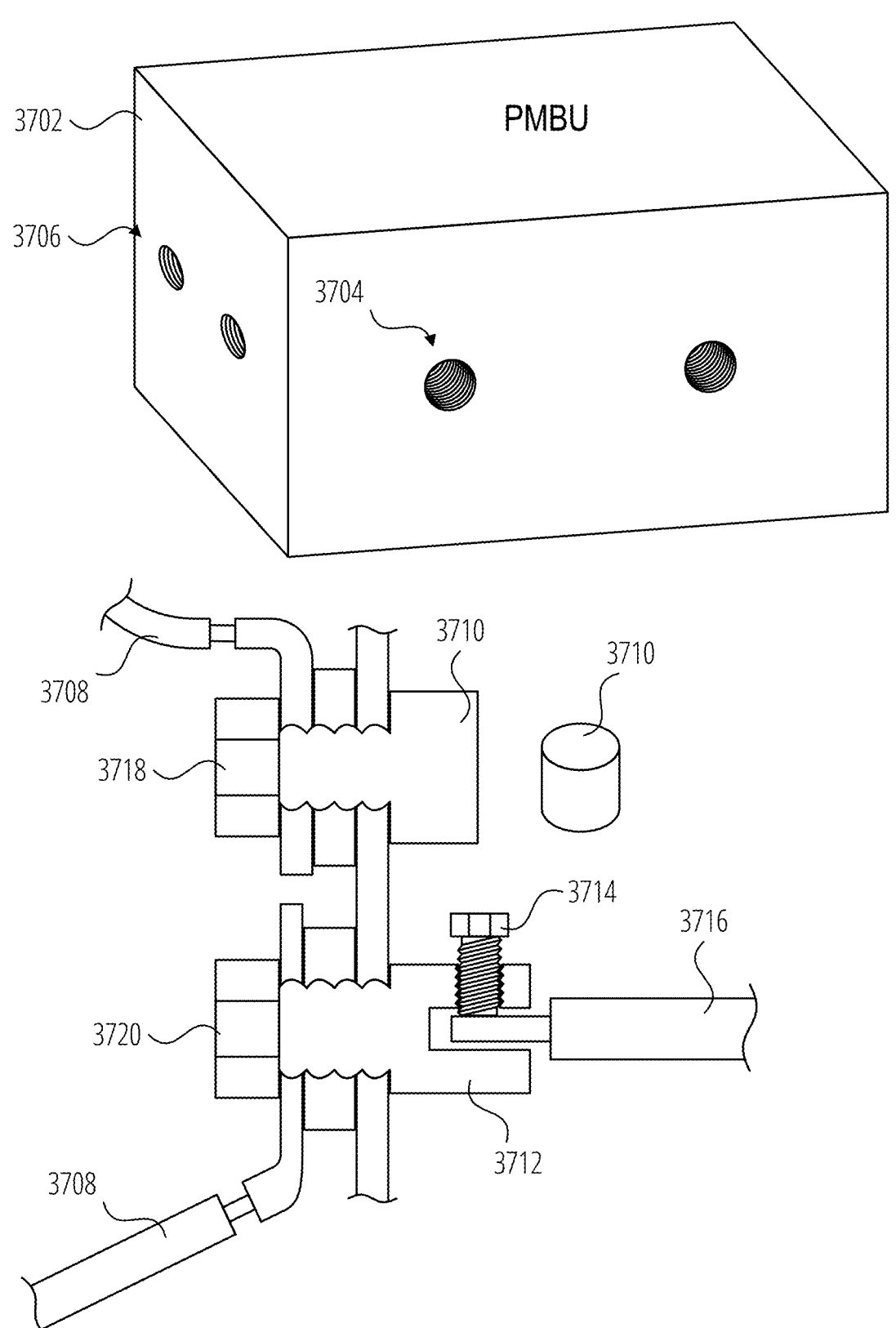
FIG. 37 is a system diagram showing a schematic view of a base unit housing for a base unit with configurable electrical connection posts, according to some examples.

FIG. 37 is a system diagram showing a schematic view of a BU housing 3702 for BU 104 with configurable electrical connection posts, according to some examples.

The BU housing 3702 is designed to accommodate various electrical connection configurations. The BU housing 3702 includes knock-out holes 3704 on its main side surfaces and alternate knock-out holes 3706 on its other side surfaces. These knock-out holes may be selectively removed to create openings for threaded terminal posts 3712. The knock-out holes provide flexibility in positioning the electrical connections, allowing adaptation to different vehicle layouts or installation requirements. The ability to choose between the knock-out holes 3704 and 3706 enhances the versatility of the BU 104, enabling it to fit into various confined spaces within a vehicle's engine compartment or other installation locations.

Internal flying leads 3708 are contained within the BU 104. These flexible conductors may route electrical connections between various internal components and the configurable connection points. The internal flying leads 3708 may interface with a battery connection lug 3710, which provides a secure attachment point for a battery. The use of internal flying leads 3708 allows for adaptable internal wiring configurations, accommodating different connection scenarios without requiring the redesign of the entire unit. This flexibility is particularly useful when integrating the BU 104 with different vehicle electrical systems or when accommodating various battery configurations.

The configurable threaded terminal posts 3712 may be installed in the knock-out holes 3704, 3706. These terminal posts 3712 serve as adjustable external connection points, allowing for customization based on specific vehicle requirements. The threaded design of these posts may facilitate secure attachment of electrical connectors. The ability to position these posts in different locations enhances the versatility of the BU 104, enabling it to interface with various vehicle electrical systems. This feature is particularly useful when retrofitting the BU 104 into vehicles with different battery compartment layouts or electrical connection points A set screw 3714 may be utilized in conjunction with a lug 3718 to establish and secure electrical connections. The lug 3718 may serve as an intermediary connection point between the internal flying leads 3708 and either the configurable threaded terminal posts 3712 or the vehicle's electrical system wire 3716. This configuration allows for robust and adjustable connections, ensuring good electrical contact and mechanical stability. The use of a set screw provides a means to fine-tune the connection tightness, which can be crucial in high-vibration environments typical in vehicular applications. A crimp, removable WAGO (Wagenbau-Anstalt, Gronau, Ostwestfalen) connector, or solder connection could be used instead of a setscrew (not shown).

The exemplary vehicle electrical system wire 3716 represents the interface between the BU housing 3702 and the vehicle's existing electrical infrastructure. This connection point demonstrates how the BU 104 integrates with the vehicle's electrical system. The flexibility in positioning the connection points allows the BU 104 to adapt to different wire routing scenarios in various vehicle models.

A bolt 3720 may be employed in combination with the lug 3718 to further secure and stabilize electrical connections within the BU housing 3702. This additional fastening mechanism enhances the reliability of the electrical connections, particularly in high-vibration environments typical in vehicular applications. The use of a bolt provides a more permanent and secure connection compared to the set screw alone, which may be beneficial for connections that are not expected to be frequently adjusted or disconnected.

The system's modular design allows for adaptation to various vehicle layouts and electrical requirements. By utilizing the knock-out holes 3704, 3706, and configurable threaded terminal posts 3712, the BU 104 may be customized to fit different installation scenarios. The internal flying leads 3708 provide flexibility in routing power within the unit, while the battery connection lug 3710 ensures a secure connection to the power source. This modularity extends to the ability to accommodate different battery chemistries and form factors, potentially allowing for the use of advanced battery technologies such as lithium-ion or other high-performance cells.

This configurable system may facilitate the replacement of traditional lead-acid batteries with a more versatile power solution. The ability to select connection locations and types may enable easier integration across different vehicle models and configurations. The design accommodates various battery chemistries and form factors, potentially allowing for the use of advanced battery technologies such as lithium-ion or other high-performance cells. This flexibility is particularly valuable in the context of upgrading vehicle electrical systems or implementing hybrid power solutions The BU 104 design, as illustrated in FIG. 37, incorporates features that address challenges in retrofitting modern battery systems into existing vehicle architectures. By providing multiple configuration options, the system may reduce the need for vehicle-specific adaptors or extensive modifications to the vehicle's electrical system, potentially simplifying the integration process and expanding the range of compatible vehicles. This approach may be particularly beneficial in aftermarket applications or when upgrading fleet vehicles to more efficient or powerful electrical systems.

Figure 38:
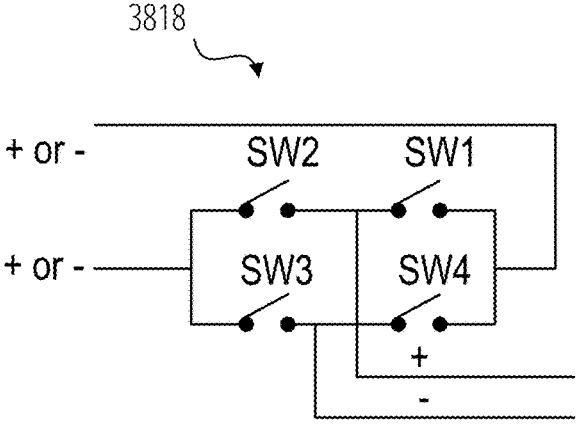
FIG. 38 is a schematic diagram showing a top view of a configurable electrical connection system for a base unit and Modular Replaceable Battery, according to some examples.

FIG. 38 is a schematic diagram showing a top view of a configurable electrical connection system for a BU 104 and Modular Replaceable Battery (MRB 106), according to some examples.

A BU housing 3702 comprises a top section 3804 and a base section 3814, each of which has pairs of punch-out holes 3808 defined in surfaces thereof. These holes allow for configurable connectable connection of the flying leads 3806 to vehicle power leads 3812, enhancing the adaptability of the unit to various installation requirements.

The PMBU 3802 interfaces with vehicle power leads 3812, represented by −12V and +12V connections. These leads connect the BU 104 to the vehicle's electrical system.

The MRB is depicted within the base section 3814 of the BU housing 3702. This component serves as the primary power source of the BU 104

In some examples, a switchable bridge rectifier 3818 is illustrated with four switches (SW1, SW2, SW3, SW4). This switchable bridge rectifier 3818 is controlled by a Battery Management System (BMS) and is designed to autosense and correct the polarity of the vehicle power leads 3812. In some examples, this feature ensures proper electrical connection regardless of the input polarity, enhancing the system's versatility and safety.

Threaded terminal posts 3810 are shown, allowing for the connection of the flying leads 3806 to locations on the electrical system wiring. This feature provides flexibility in adapting the BU 104 to various vehicle electrical configurations.

The system's design emphasizes configurability and adaptability. The multiple flying lead 3806 locations and punch-out holes 3808 enable the BU 104 to be customized for various vehicle layouts and electrical requirements. In some examples, this flexibility allows for efficient integration of the modular battery system into different vehicle types without extensive modifications to existing electrical systems.

The switchable bridge rectifier 3818 enhances the system's versatility. By automatically correcting polarity, it may simplify installation and prevent potential damage from incorrect connections. This component may be particularly useful in retrofit applications where existing vehicle wiring may vary.

The overall schema demonstrates an approach to integrating advanced battery technologies into diverse vehicle electrical systems. The configurable nature of the connections, combined with the polarity correction feature, may provide a solution for adapting modern battery systems to a wide range of vehicle architectures.

Machine 3900

Figure 39:
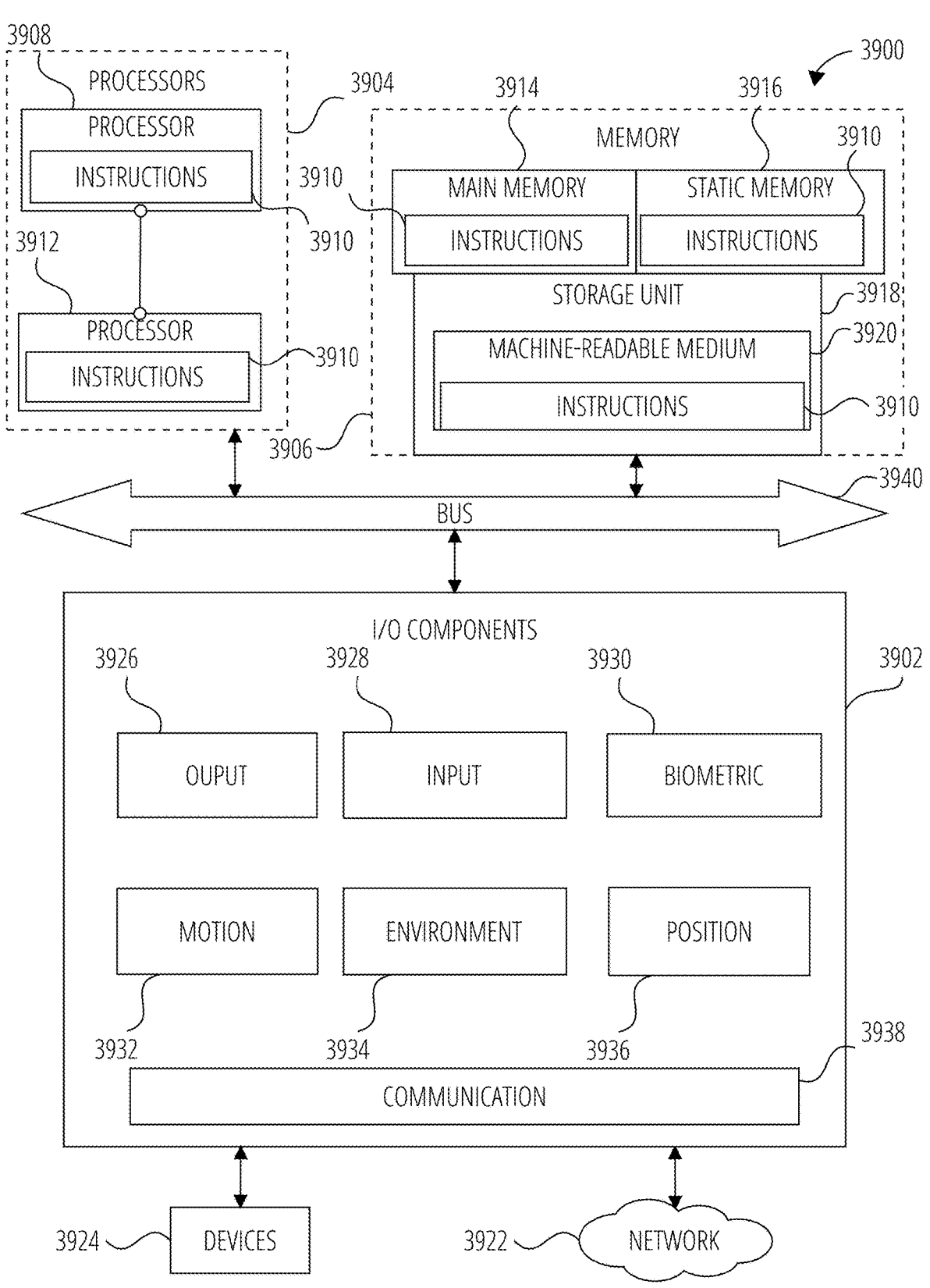
FIG. 39 is a diagrammatic representation of a machine in the form of a computer system within which a set of instructions may be executed for causing the machine to perform any one or more of the methodologies discussed herein, in accordance with some examples.

FIG. 39 is a diagrammatic representation of the machine 3900 (e.g., any of the controllers or management systems, or managers) or within which instructions 3910 (e.g., software, a program, an application, an applet, an app, or other executable code) for causing the machine 3900 to perform any one or more of the methodologies discussed herein may be executed. For example, the instructions 3910 may cause the machine 3900 to execute any one or more of the methods described herein. The instructions 3910 transform the general, non-programmed machine 3900 into a particular machine 3900 programmed to carry out the described and illustrated functions in the manner described. The machine 3900 may operate as a standalone device or be coupled (e.g., networked) to other machines. In a networked deployment, the machine 3900 may operate in the capacity of a server machine or a client machine in a server-client network environment, or as a peer machine in a peer-to-peer (or distributed) network environment. The machine 3900 may comprise, but not be limited to, a server computer, a client computer, a personal computer (PC), a tablet computer, a laptop computer, a netbook, a set-top box (STB), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 3910, sequentially or otherwise, that specify actions to be taken by the machine 3900. Further, while a single machine 3900 is illustrated, the term "machine" may include a collection of machines that individually or jointly execute the instructions 3910 to perform any one or more of the methodologies discussed herein.

The machine 3900 may include processors 3904, memory 3906, and I/O components 3902, which may be configured to communicate via a bus 3940. In some examples, the processors 3904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 3908 and a processor 3912 that execute the instructions 3910. Although FIG. 39 shows multiple processors 3904, the machine 3900 may include a single processor with a single core, a single processor with multiple cores (e.g., a multi-core processor), multiple processors with a single core, multiple processors with multiples cores, or any combination thereof.

The memory 3906 includes a main memory 3914, a static memory 3916, and a storage unit 3918, both accessible to the processors 3904 via the bus 3940. The main memory 3906, the static memory 3916, and storage unit 3918 store the instructions 3910 embodying any one or more of the methodologies or functions described herein. The instructions 3910 may also reside, wholly or partially, within the main memory 3914, within the static memory 3916, within machine-readable medium 3920 within the storage unit 3918, within the processors 3904 (e.g., within the processor's cache memory), or any suitable combination thereof, during execution thereof by the machine 3900.

The I/O components 3902 may include various components to receive input, provide output, produce output, transmit information, exchange information, or capture measurements. The specific I/O components 3902 included in a particular machine depend on the type of machine. For example, portable machines such as mobile phones may include a touch input device or other such input mechanisms, while a headless server machine will likely not include such a touch input device. The I/O components 3902 may include many other components not shown in FIG. 39. In various examples, the I/O components 3902 may include output components 3926 and input components 3928. The output components 3926 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), or other signal generators. The input components 3928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 3902 may include biometric components 3930, motion components 3932, environmental components 3934, or position components 3936, among a wide array of other components. For example, the biometric components 3930 include components to detect expressions (e.g., hand expressions, facial expressions, vocal expressions, body gestures, or eye-tracking), measure biosignals (e.g., blood pressure, heart rate, body temperature, perspiration, or brain waves), or identify a person (e.g., voice identification, retinal identification, facial identification, fingerprint identification, or electroencephalogram-based identification). The motion components 3932 include acceleration sensor components (e.g., accelerometer), gravitation sensor components, rotation sensor components (e.g., gyroscope). The environmental components 3934 include, for example, one or more cameras, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 3936 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3902 further include communication components 3938 operable to couple the machine 3900 to a network 3922 or devices 3924 via respective coupling or connections. For example, the communication components 3938 may include a network interface component or another suitable device to interface with the network 3922. In further examples, the communication components 3938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3924 may be another machine or any of a wide variety of peripheral devices (e.g., a peripheral device coupled via a USB).

Moreover, the communication components 3938 may detect identifiers or include components operable to detect identifiers. For example, the communication components 3938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Data glyph, Maxi Code, PDF417, Ultra Code, UCC RSS-2D bar code, and other optical codes), or acoustic detection components (e.g., microphones to identify tagged audio signals). In addition, a variety of information may be derived via the communication components 3938, such as location via Internet Protocol (IP) geolocation, location via Wi-Fi® signal triangulation, or location via detecting an NFC beacon signal that may indicate a particular location.

The various memories (e.g., main memory 3914, static memory 3916, and/or memory of the processors 3904) and/or storage unit 3918 may store one or more sets of instructions and data structures (e.g., software) embodying or used by any one or more of the methodologies or functions described herein. These instructions (e.g., the instructions 3910), when executed by processors 3904, cause various operations to implement the disclosed examples.

The instructions 3910 may be transmitted or received over the network 3922, using a transmission medium, via a network interface device (e.g., a network interface component included in the communication components 3938) and using any one of several well-known transfer protocols (e.g., hypertext transfer protocol [HTTP]). Similarly, the instructions 3910 may be transmitted or received using a transmission medium via a coupling (e.g., a peer-to-peer coupling) to the devices 3924.

Example Set 1

Utility Backup

In some examples, a utility power back-up transfer switch is coupled to multiple battery assemblies 102, each battery assembly 102 including two or more BUs 104 having quick connect/disconnect electrical connectors. The BUs 104 contain rechargeable battery cells (e.g., MRBs 106) to store electrical energy.

The transfer switch may also contain a 240V AC split phase inverter capable of generating and supplying two 120V AC phases with proper synchronization. This inverter module converts DC power from the series/parallel connected BUs 104s into standardized 120V AC output.

The transfer switch interfaces with a building's electrical panel via automated transfer breakers. These transfer breakers can switch two phases of either utility grid power or backup power from the inverter to the building's distribution panel.

In a power outage, the transfer switch may be configured to manually or automatically switch to the inverter and battery assemblies 102 to supply AC power to critical building loads. The modular architecture with multiple swappable MRBs 106 provides extendable backup time. Systems comprising one or more BU 104 each of which more than one connected MRB 106 allowing depleted MRBs 106 to be quickly exchanged for freshly charged replacements while connected and non-depleted MRBs 106 provide continuous uninterrupted power to the system.

The intelligent transfer switch can be integrated seamlessly with a building's electrical system to deliver reliable and extendable backup power using modular, hot-swappable batteries. This provides robust protection against utility power failures or interruptions. The modular design offers flexible backup capacity as needed.

In some examples, there is provided an apparatus (e.g., a battery assembly 102) for generating and supplying two phases of properly synchronized 120V AC backup power to a 240 VAC building electrical system. The battery assembly 102 contains multiple battery units (BUs 104), each BU 104 having its own quick connect/disconnect electrical connector for hot-swapping MRBs 106.

The battery assemblies 102 incorporate rechargeable battery cells wired in series and parallel to store electrical energy at the desired system voltage and capacity.

The apparatus also contains a 240V AC split phase inverter module capable of generating two 120V AC phases from the DC power supplied by the series/parallel connected MBUs.

This inverter module uses advanced power electronics and control circuitry to synchronize the two 120V AC phases so they are properly timed for supplying 240 VAC to the building.

The apparatus may provide the synchronized backup power phases to the building's electrical panel via a generator cable connected to a NEMA L14-30 or a NEMA 14-50 electrical connector (or equivalent) on the apparatus. This generator cable interfaces the 120V AC outputs from the inverter to the building's transfer switch or distribution panel. In some examples, the building electrical panel may be hard-wired to the synchronized split phase inverter and BUs. MRBs may be swapped out of the BU when discharged and taken to a separate location, (e.g., to a generator) where they are recharged and then returned to the location of the building electrical panel for reinsertion into the BUs.

In a power outage, the apparatus utilizes the battery assemblies 102 and inverter module to generate uninterrupted clean AC electricity for critical building loads. The hot-swappable MRBs 106 allow extended runtime on battery power by quickly replacing depleted MRBs 106.

The apparatus serves as a standalone supplemental power source to provide reliable backup electricity to residential or commercial buildings using an efficient, scalable architecture. The modular design enables flexible backup capacity as needed.

Vehicle Mounted BU 104

In some examples, a vehicle-mounted mounted base unit (BU) contains an integrated battery charger that can charge MRBs 106 inserted into its internal bays 110. The charger converts power from the vehicle's electrical charging system to the required voltage and current levels to charge the MRBs 106 based on their battery chemistry and capacity.

A cable with a compatible heavy-duty electrical connector is connected to an outlet on the vehicle-mounted BU 104. This cable runs to an external BU 104, which contains multiple bays to hold and charge additional MRBs 106.

When the vehicle is running, the vehicle-mounted BUs 104 use the vehicle's alternator and voltage regulator to produce a charging current. This current is routed through the cable to simultaneously charge both the internal MRBs 106 and any external MRBs 106 inserted in an external stationary BU 104.

This integrated system provides expanded charging capacity for numerous MRBs 106 utilizing a single vehicle charging system. MRBs 106 can be charged while inserted in the vehicle's BU 104 and removed and charged externally using a mobile BU 104.

Electric Vehicle Installed BU 104

According to some examples, a base unit (BU 104) with multiple bays for MRBs 106 may be installed in an electric vehicle along with the vehicle's main high-capacity propulsion battery.

The BU 104 is connected to the electric vehicle's standard 12V charging system, which typically charges a 12V lead-acid battery for electronics and accessories although lithium-based batteries operating at 12V or other voltages (e.g., 24, 48, etc.) may be employed. The propulsion battery provides power for driving the vehicle's electric motors. It contains rechargeable lithium chemistry-based battery cells wired in series and parallel to provide, in some examples up to 400V and 50-100 kWh of capacity.

The BU 104 charges MRBs 106 inserted into its bays 110 by utilizing the propulsion battery and 12V charging system. This involves a DC-DC converter to step down the high propulsion battery voltage to the lower MBU voltage.

Once charged, the MRBs 106 can be removed from the BU bays and used to provide portable backup power to external devices, tools, lights, appliances, etc. This modular architecture leverages the large energy storage in the vehicle's propulsion battery to charge MRBs 106 for various auxiliary power needs. The charged MRBs 106 enable mobile delivery of electricity.

Selectable Outputs

In some examples, a base unit (BU 104) contains an integrated DC-DC converter to convert power from an inserted modular battery unit (MRBs 106) to different selectable DC output voltages as chosen by the user.

The MRBs 106 contains rechargeable battery cells wired in series and parallel to provide the desired system voltage and capacity. The DC-DC converter steps this voltage up or down as selected to generate different standardized DC output levels like 5V, 12V, 24V, or 48V. The user chooses their desired output voltage via a control panel or electronic user interface on the BU 104.

These selectable DC outputs allow the BU 104 to directly power a variety of electronics and devices during power outages. The appropriate DC output connector on the BU 104 is connected to the device to supply the required voltage.

For example, 12V may be selected to power a WiFi router or 24V for a security camera system. The multiple voltage options provide flexible backup power tailored to different equipment needs without requiring external power converters.

The integrated DC-DC converter and selectable outputs allow the standard MRB voltage to power a wide range of electronic devices and systems, enhancing the versatility and usability of the modular battery architecture.

Inverter Synchronization

In some examples, an inverter synchronization device in a BU 104 contains specialized circuitry that synchronizes the 120V AC outputs from two separate MRBs 106

A BU 104 contains an integrated inverter that converts DC power from an inserted MRB 106 into 120V AC output. The inverter synchronization device interconnects the 120V AC outputs from the MRBs 106 and uses phase-locked loop control circuits to match their phases. This generates two 120V AC signals with the required 220V/240V phase offset. The inverter synchronization device also provides a standard generator electrical connector that allows the synchronized 220V AC power from the combined MRBs 106 to be fed into a building's electrical panel or automatic transfer switch.

By synchronizing the 120V AC outputs from multiple MRBs 106, the inverter synchronization device enables the generation of split-phase 220/240V AC to power a residential or commercial facility using modular battery packs. The hot-swappable MRBs 106 allow extended runtime backup power. Depleted MRBs 106 can be quickly exchanged for charged spares without interruption. The inverter synchronization device coordinates multiple modular inverters and batteries to provide robust AC power with flexible capacity scaling. This enables an efficient, uninterruptable power architecture using standardized swappable modules.

Example Set 2

Example 1 is a battery assembly comprising: a base unit; a modular battery removably securable within the base unit, wherein the modular battery is configured as a nominal 12V battery pack comprising one or more battery cells, the battery pack having sufficient stored energy and current capability to start and operate an internal combustion engine (ICE) or electrical system of an electric vehicle; an electrical interface to connect the battery assembly to the electrical system of the ICE or the electric vehicle; and a battery management system configured to monitor and control the modular battery.

In Example 2, the subject matter of Example 1, wherein the one or more battery cells utilize battery chemistries based on lithium or lead.

In Example 3, the subject matter of Examples 1-2, wherein the nominal 12V battery pack can provide an output current of between 100 and 3000 Amps for durations between 1 and 30 seconds.

In Example 4, the subject matter of Examples 1-3, wherein the nominal 12V battery pack has an energy storage capability of at least 20 Amp-hours.

In Example 5, the subject matter of Examples 1-4 including a backup battery within the base unit configured to provide power to maintain electronic systems when the modular battery is removed.

In Example 6, the subject matter of Examples 1-5 including a backup battery within the base unit having sufficient stored energy and current capability to start an ICE when the modular battery is removed.

In Example 7, the subject matter of Example 6 wherein the nominal 12V backup battery can provide an output current of between 100 and 3000 Amps for durations between 1 and 30 seconds to start an internal combustion engine.

In Example 8, the subject matter of Examples 6-7 wherein the nominal 12V backup battery can provide an output current of between 100 and 3000 Amps for durations between 1 and 30 seconds to start an internal combustion engine.

In Example 9, the subject matter of Examples 1-8 wherein the electrical interfaces comprise high current capacity contacts capable of conducting at least 30 A continuously.

In Example 10, the subject matter of Examples 1-9, wherein the battery management system is configured to communicate battery state data over at least one of a wired interface and a wireless interface.

In Example 11, the subject matter of Examples 1-10, wherein a monitoring system within the base unit can be programmed to electronically disconnect the vehicle from the base unit after a predetermined elapsed time between the vehicle's last use or when one or more batteries being monitored by the base unit drop below a predetermined state of charge.

In Example 12, the subject matter of Examples 1-11 including a heating element thermally coupled to the modular battery to allow charging in cold temperature conditions.

In Example 13, the subject matter of Examples 1-12 further comprising a DC-to-AC inverter configured to convert battery power to 120V AC.

In Example 14, the subject matter of Examples 1-13, wherein the base unit is configured to conform to a standard form factors and mount in place of the vehicle's original battery.

In Example 15, the subject matter of Examples 1-14, wherein the modular battery utilizes an asymmetrical physical shape with alignment features to ensure proper orientation within the base unit.

In Example 16, the subject matter of Examples 1-15 including a current limiting circuit configured to prevent overloading a vehicle alternator when charging the battery.

Example 17 is a battery assembly comprising: a base unit; a modular battery removably accommodated within the base unit, wherein the modular battery is configured as a nominal 12 V battery pack comprising one or more battery cells, the battery pack having sufficient stored energy to start and operate an internal combustion engine (ICE) or electrical system of an electric vehicle; an electrical interface to connect the battery assembly to the electrical system of the ICE or the electric vehicle; and a battery management system configured to monitor and control the modular battery.

In Example 18, the subject matter of Example 17, wherein the one or more battery cells utilize lithium-ion or lead-acid based battery chemistry.

In Example 19, the subject matter of Examples 17-18, further comprising a backup battery within the base unit configured with an energy storage capability ranging from 1 to 20 Amp-hours at a voltage between 6 and 60 Volts to maintain electronic systems when the modular battery is removed.

In Example 20, the subject matter of Examples 17-19, further comprising a backup battery within the base unit capable of outputting a current ranging from 100 to 3,000 Amps.

In Example 21, the subject matter of Examples 17-20, wherein the electrical interfaces comprise high current capacity contacts rated for at least 300 Amps.

In Example 22, the subject matter of Examples 17-21, wherein the battery management system is configured to communicate battery state data over at least one of a wired interface and a wireless interface utilizing one of CAN, Bluetooth, and WiFi protocols.

In Example 23, the subject matter of Examples 17-22, further comprising a heating element thermally coupled to the modular battery to allow charging in cold temperature conditions down to −30° C.

In Example 24, the subject matter of Examples 17-23, further comprising a DC-to-AC inverter configured to convert battery power to 120V AC at a wattage between 300 W and 5000 W.

In Example 25, the subject matter of Examples 17-24, wherein the base unit is configured to conform to standard battery form factors including Group 24, Group 27, Group 31, and Group 78 sizes In Example 26, the subject matter of Examples 17-25, wherein the modular battery utilizes an asymmetrical trapezoidal physical shape with protruding alignment features to ensure proper orientation within the base unit.

In Example 27, the subject matter of Examples 17-26, further comprising a current limiting circuit configured to prevent overloading a vehicle alternator when charging the battery by limiting current to between 20 A and 150 A.

In Example 28, the subject matter of Examples 17-27, wherein the battery management system is configured to balance charging of individual battery cells in the modular battery through passive or active balancing circuits.

In Example 29, the subject matter of Examples 17-28, wherein the battery management system monitors cell voltages and disables charging or discharging of the modular battery when voltage limits are exceeded.

In Example 30, the subject matter of Examples 17-29, wherein the modular battery incorporates data storage capability to log charge/discharge cycles and operating conditions.

In Example 31, the subject matter of Examples 17-30, wherein the base unit and modular battery include security authentication systems to prevent unauthorized usage through encrypted communications.

Example 32 is a battery system comprising: a base unit; a modular battery removably securable within the base unit; and a charger to operationally charge the modular battery when installed in the base unit and configured to provide compatibility between a lead-acid charging system and the modular battery.

In Example 33, the subject matter of Example 32, wherein the charger regulates voltage from the charging system to a level suitable for the modular battery.

In Example 34, the subject matter of Example 33, wherein the regulated voltage is between 14-15V for lithium battery chemistries.

In Example 35, the subject matter of Examples 32-34, wherein the charger limits charging current draw from the charging system to prevent overloading.

In Example 36, the subject matter of Examples 32-35, wherein the charger implements multi-stage charging profiles tailored for the modular battery chemistry.

In Example 37, the subject matter of Examples 32-36, wherein the charger comprises a microcontroller executing firmware algorithms to control charging.

In Example 38, the subject matter of Examples 32-37, wherein the charger comprises a DC-to-DC converter circuit.

In Example 39, the subject matter of Examples 32-38, wherein the charger comprises passive balancing circuits configured to equalize charges of multiple battery cells.

In Example 40, the subject matter of Examples 32-39, wherein the charger prevents over-discharging of the modular battery.

In Example 41, the subject matter of Examples 32-40, wherein the modular battery comprises lithium-ion battery cells and the lead-acid battery charging system operates at 12V.

In Example 42, the subject matter of Examples 32-41, wherein, wherein the charger is integrated into the modular battery.

In Example 43, the subject matter of Examples 32-42, wherein the charger is integrated into the base unit.

In Example 44, the subject matter of Examples 32-43, wherein the charger is configured to communicate charge status data over at least one of a wired interface and a wireless interface.

In Example 45, the subject matter of Examples 32-44, wherein the charger comprises temperature sensors coupled to the modular battery.

In Example 46, the subject matter of Example 45, wherein the charger adjusts charging parameters based on temperature measurements.

In Example 47, the subject matter of Examples 32-46, wherein the charger is configured to be connected externally to the base unit and modular battery.

In Example 48, the subject matter of Examples 32-47, wherein the charger comprises an alternating current (AC) to direct current (DC) converter.

In Example 49, the subject matter of Examples 32-48, wherein the charger is configured to receive DC power from a vehicle alternator.

In Example 50, the subject matter of Examples 32-49, wherein the charger is configured to receive AC power from a public utility grid.

In Example 51, the subject matter of Examples 32-50, wherein the charger is configured to receive DC power from a solar panel or wind turbine.

Example 52 is a battery assembly comprising: a base unit; a modular battery removably installable within the base unit; and a tool-operated locking mechanism to mechanically retain the modular battery in the base unit, release of the tool-operated locking mechanism requiring a tool to prevent theft of the modular battery from the base unit.

In Example 53, the subject matter of Example 52, wherein the locking mechanism comprises a keyed lock requiring a physical key to unlock the modular battery.

In Example 54, the subject matter of Examples 52-53, wherein the locking mechanism comprises a tamper-proof fastener requiring a special tool to remove.

In Example 55, the subject matter of Example 54, wherein the special tool comprises at least one of a torque wrench, hex key, and a screwdriver with a security head type.

In Example 56, the subject matter of Examples 52-55, wherein the locking mechanism comprises an electronically activated latch that engages with the modular battery.

In Example 57, the subject matter of Example 56 including an authentication system configured to disengage the latch upon entry of an authorized access code or credential.

In Example 58, the subject matter of Examples 52-57, wherein the locking mechanism when engaged prevents removal of the modular battery from the base unit.

In Example 59, the subject matter of Examples 52-58, wherein the locking mechanism when engaged activates anti-theft functionality of the battery assembly.

In Example 60, the subject matter of Example 59, wherein the anti-theft functionality comprises disabling operation of a vehicle into which the battery assembly is installed.

In Example 61, the subject matter of Examples 52-60, wherein the modular battery comprises a lithium-ion or a lead-acid battery pack.

Example 62 is a battery assembly comprising: a base unit; and a modular battery removably installable within the base unit; wherein the base unit comprises one or more electrical interfaces configured to mate with complementary electrical interfaces on the modular battery to establish electrical connections.

In Example 63, the subject matter of Example 62, wherein the electrical interfaces comprise spring-loaded pins that align with contact pads on the modular battery.

In Example 64, the subject matter of Examples 62-63, wherein the electrical interfaces comprise high-current-carrying capacity, low-resistance electrical contacts to minimize losses during transmission of power to and from the modular battery.

In Example 65, the subject matter of Examples 62-64, wherein the electrical interfaces comprise self-wiping, electrical contacts to prevent build-up of surface contaminants and or oxide layers that increase the electrical resistance to high current flowing through each side of the complementary electrical interface.

In Example 66, the subject matter of Examples 62-65, wherein the electrical interfaces comprise metal contacting elements selected from the group consisting of blades, prongs, pins, tabs or fingers that align with and are bought into intimate wiping contact with complementary receptacles.

In Example 67, the subject matter of Examples 62-66, wherein the electrical interfaces comprise Anderson style electrical connectors utilizing metal contacting fingers brought into intimate wiping contact with complementary metal contacting fingers to provide high-current-carrying capacity, low-resistance electrical connections between the two sides of the complementary electrical interfaces.

In Example 68, the subject matter of Examples 62-67, wherein the electrical interfaces may be male-female or androgynous.

In Example 69, the subject matter of Examples 62-68, wherein the electrical interfaces comprise conductive rings or pads that align with spring-loaded pogo pins on the modular battery.

In Example 70, the subject matter of Examples 62-69, wherein the electrical interfaces establish connections for power transfer between the modular battery and base unit.

In Example 71, the subject matter of Example 70, wherein the power transfer comprises high current flow for starting a vehicle engine.

In Example 72, the subject matter of Examples 62-71, wherein the electrical interfaces establish connections for data communication between the modular battery and base unit.

In Example 73, the subject matter of Example 72, wherein the data communication comprises battery state of charge and diagnostic information.

In Example 74, the subject matter of Examples 62-73, wherein the electrical interfaces provide multiple redundant contact points between the modular battery and base unit.

In Example 75, the subject matter of Examples 62-74, wherein the electrical interfaces are configured to withstand vibration, shock, and temperature cycling.

In Example 76, the subject matter of Examples 62-75, wherein the electrical interfaces are configured to carry currents between to 30 and 300 Amps continuously.

In Example 77, the subject matter of Examples 62-76, wherein the electrical interfaces comprise weatherproofing features when disconnected.

In Example 78, the subject matter of Examples 62-77, wherein the modular battery comprises lithium-ion or lead-acid based battery cells.

In Example 79, the subject matter of Examples 62-78, wherein the base unit is configured to be installed in a vehicle.

In Example 80, the subject matter of Example 79, wherein the base unit electrical interfaces connect to existing vehicle battery cables.

In Example 81, the subject matter of Examples 62-80, wherein the modular battery is hot-swappable via the electrical interfaces.

Example 82 is a battery assembly comprising: a modular battery removably installable within a base unit; and the base unit having a bay into which the modular battery is removably insertable; wherein the modular battery and the bay have corresponding shapes comprising at least one of: a triangle, rectangle, pentagon, hexagon, heptagon, octagon, nonagon, decagon, and star polygon.

In Example 83, the subject matter of Example 82, wherein the corresponding shapes comprise an asymmetric polygon.

In Example 84, the subject matter of Example 83, wherein the asymmetric polygon shape is selected from the group consisting of a triangle, rectangle, trapezoid, pentagon, hexagon, heptagon, octagon, nonagon, decagon, and star polygon.

In Example 85, the subject matter of Example 84, wherein the star polygon comprises a 4-pointed, 5-pointed, 6-pointed, 7-pointed, 8-pointed, 9-pointed, 10-pointed, 11-pointed, 12-pointed, 13-pointed, or 14-pointed star shape.

In Example 86, the subject matter of Examples 82-85, wherein the corresponding shapes comprise one or more alignment features that mate when the modular battery is inserted into the bay.

In Example 87, the subject matter of Example 86, wherein the alignment features comprise rails, grooves, pins, or wedges on the modular battery and bay.

In Example 88, the subject matter of Examples 82-87, wherein the corresponding shapes are configured to ensure correct orientation of the modular battery when inserted into the bay.

In Example 89, the subject matter of Example 88, wherein the correct orientation aligns electrical interfaces between the modular battery and base unit.

In Example 90, the subject matter of Examples 82-89, wherein the corresponding shapes prevent upside down insertion of the modular battery into the bay.

In Example 91, the subject matter of Examples 82-90, wherein the base unit is configured to be installed in a vehicle.

In Example 92, the subject matter of Example 91, wherein the base unit connects to existing vehicle battery cables when installed in the vehicle.

In Example 93, the subject matter of Examples 82-92, wherein the modular battery comprises a carry handle positioned based on the corresponding shapes.

In Example 94, the subject matter of Examples 82-93, wherein the modular battery comprises a lithium-ion battery pack.

In Example 95, the subject matter of Examples 82-94, wherein the modular battery is hot-swappable when inserted into the bay.

In Example 96, the subject matter of Examples 82-95, wherein the base unit comprises multiple bays, each configured to receive a respective modular battery.

Example 97 is a battery assembly comprising: a base unit; a modular battery removably installed within the base unit; and an inverter.

In Example 98, the subject matter of Example 97, wherein the inverter converts direct current (DC) from the modular battery into alternating current (AC).

In Example 99, the subject matter of Example 98, wherein the AC comprises 120V or 240V output compatible with household appliances.

In Example 100, the subject matter of Examples 97-99, wherein the inverter enables using the modular battery to power AC devices when removed from the base unit.

In Example 101, the subject matter of Examples 97-100, wherein the inverter is integrated into the base unit.

In Example 102, the subject matter of Examples 97-101, wherein the inverter connects to one or more AC outlets on the base unit.

In Example 103, the subject matter of Example 102, wherein the one or more AC outlets comprise one or more of: a NEMA 5-15 receptacle, a NEMA 5-20 receptacle, and a NEMA L14-30 receptacle.

In Example 104, the subject matter of Examples 97-103, wherein the inverter comprises a microcontroller executing power conversion algorithms.

In Example 105, the subject matter of Examples 97-104, wherein the inverter comprises a high-frequency transformer and switching components.

In Example 106, the subject matter of Examples 97-105, wherein the inverter is configured to receive power from multiple modular batteries simultaneously.

In Example 107, the subject matter of Examples 97-106, wherein the inverter provides an output wattage of between 300-5000 watts.

In Example 108, the subject matter of Examples 97-107, wherein the inverter is configured to provide AC power to a vehicle electrical system.

In Example 109, the subject matter of Examples 97-108 including a DC-to-DC converter configured to step down voltage from the modular battery to a lower DC level.

In Example 110, the subject matter of Example 109, wherein the DC-to-DC converter connects to one or more USB or DC barrel connectors on the base unit.

In Example 111, the subject matter of Examples 97-110, wherein the modular battery comprises lithium-ion or lead-acid based battery cell chemistries.

In Example 112, the subject matter of Examples 97-111, wherein the base unit is configured to be installed in a vehicle.

In Example 113, the subject matter of Examples 97-112 including monitoring and control circuits configured to monitor performance of the modular battery.

In Example 114, the subject matter of Examples 97-113 including a cooling system configured to regulate temperature of the modular battery.

In Example 115, the subject matter of Examples 97-114 including a battery management system configured to monitor individual battery cells of the modular battery.

In Example 116, the subject matter of Example 115, wherein the battery management system balances charging of the battery cells.

Example 117 is a battery system comprising: a base unit configured to be mounted in a vehicle; and a modular battery configured to be removably installed in the base unit; wherein the modular battery contains one or more battery cells and connects to existing battery cables of the vehicle to compatibly provide power to and receive power from electrical systems of an external system.

In Example 118, the subject matter of Example 117 including a keep alive battery connected to provide power to electronic systems of the vehicle when the modular battery is removed.

In Example 119, the subject matter of Examples 117-118 including a keep alive battery connected to start the vehicle and provide power to electronic systems of the vehicle when the modular battery is removed.

In Example 120, the subject matter of Examples 117-119 including a charging module configured to adapt a charging system of the vehicle to charge the modular battery.

In Example 121, the subject matter of Examples 117-120 including a locking mechanism requiring a tool to remove the modular battery from the base unit.

In Example 122, the subject matter of Examples 117-121, wherein the modular battery has an asymmetric polygonal shape that ensures proper orientation when inserted into the base unit.

In Example 123, the subject matter of Examples 117-122, wherein the base unit is configured to mount in a standard battery location of the vehicle.

In Example 124, the subject matter of Examples 117-123 including an inverter to convert power from the modular battery into AC power.

In Example 124, the subject matter of Example 124, wherein the AC power is provided to one or more electrical outlets on the base unit.

In Example 126, the subject matter of Examples 117-125, wherein the modular battery comprises lithium-ion and or lead-acid battery cells.

In Example 127, the subject matter of Examples 117-126, wherein the modular battery is configured to power the starter and electrical systems of the vehicle.

In Example 128, the subject matter of Examples 117-127, wherein the modular battery is configured as a nominal 12V battery pack.

In Example 129, the subject matter of Examples 117-128 including a charging module configured to rapidly recharge the modular battery external to the vehicle.

In Example 130, the subject matter of Examples 117-129 including a mobile base unit configured to connect to the modular battery and provide power to external devices.

In Example 131, the subject matter of Examples 117-130 including solar cells configured to charge the modular battery.

In Example 132, the subject matter of Examples 117-131, wherein the modular battery provides power to wired-in backup devices via a transfer switch.

In Example 133, the subject matter of Examples 117-132, wherein the modular battery contains multiple optimized batteries for sustaining, starting, and deep cycling loads.

In Example 134, the subject matter of Examples 117-133, wherein the modular battery includes adaptable output voltage and connectors for powering portable electronic devices.

In Example 135, the subject matter of Examples 117-134, wherein the modular battery is configured to jump start an additional vehicle.

In Example 136, the subject matter of Examples 117-135, wherein the modular battery is configured to provide backup power from an electric vehicle to an external device.

In Example 136, the subject matter of Example 136, wherein the electric vehicle comprises a propulsion battery, and wherein the modular battery is charged using the propulsion battery.

In Example 137, the subject matter of Example 137, wherein the modular battery is charged using a 12V charging system of the electric vehicle.

In Example 139, the subject matter of Examples 136-138, wherein the external device comprises one or more of a power tool, household appliance, portable electronic device, lighting device, HVAC device, or vehicle.

In Example 140, the subject matter of Examples 136-139, wherein the modular battery provides power to the external device via a mobile base unit configured to connect to the modular battery.

In Example 140, the subject matter of Example 140, wherein the mobile base unit comprises an inverter configured to convert power from the modular battery into AC power for the external device.

In Example 142, the subject matter of Examples 136-141, wherein the modular battery is swapped between multiple electric vehicles to provide extended driving range.

In Example 143, the subject matter of Examples 136-142, wherein the modular battery provides backup power during a power outage.

In Example 143, the subject matter of Example 143, wherein the modular battery is continually cycled between at least two base units to provide unlimited backup power duration.

In Example 145, the subject matter of Examples 136-144, wherein the modular battery provides power for an off-grid application including camping, boating, or remote facilities.

In Example 146, the subject matter of Examples 136-145, wherein the modular battery has a state of charge display and wireless connectivity for remote monitoring and control.

Example 147 is a base unit configured to be installed in a host system, the base unit comprising: one or more compartments, each compartment structured to receive a removable battery unit; one or more alignment components in each compartment; an electrical connector in each compartment configured to interface with a corresponding connector on a removable battery unit; and an internal battery configured to provide power when no removable battery unit is installed; wherein the base unit provides mounting points and power connections for one or more removable battery units.

In Example 147, the subject matter of Example 147, wherein the internal battery comprises a supercapacitor with a capacitance between 1 Farad and 1000 Farads.

In Example 149, the subject matter of Examples 147-147 wherein the base unit conforms to a standard battery form factor including Group 24, Group 27, Group 31, and Group 78 to directly replace a legacy battery in a host system.

In Example 150, the subject matter of Examples 147-149, wherein the electrical connector comprises spring-loaded pogo pins to allow tool-less installation and removal of a removable battery unit from the base unit compartment.

In Example 151, the subject matter of Examples 147-150, wherein the electrical connector comprises self-wiping, high-current-carrying capacity, low-resistance electrical contacts.

In Example 152, the subject matter of Examples 147-151, wherein the electrical connector comprises metal blades that align with and are bought into intimate contact with complementary spring-loaded receptacles.

In Example 153, the subject matter of Examples 147-152, wherein the electrical connector comprises self-wiping, high-current-carrying capacity, low-resistance electrical contacts such as an Anderson-style electrical connector.

In Example 154, the subject matter of Examples 147-153, wherein the electrical connector comprises robust, metal contacting fingers brought into intimate contact with spring-loaded complementary metal contacting fingers.

In Example 155, the subject matter of Examples 147-154, wherein the alignment components comprise rails, pins, or wedges to ensure a removable battery unit is oriented correctly when inserted into the base unit compartment.

In Example 156, the subject matter of Examples 147-155, further comprising terminals configured to interface with existing electrical cables and connectors in a host system previously connected to a legacy battery.

In Example 157, the subject matter of Examples 147-156, further comprising a charging system enabling a removable battery unit to be charged by an alternator or other charging system in the host device.

In Example 158, the subject matter of Examples 147-157, further comprising power distribution circuitry enabling a removable battery unit to supply power to electronic systems in the host device.

In Example 159, the subject matter of Examples 148-158, wherein the super capacitor provides backup power to maintain electronic system operation during swapping of removable battery units.

In Example 160, the subject matter of Examples 148-159, wherein the super capacitor is configured to provide cranking current to an internal combustion engine in the host system when starting.

Example 161 is a removable battery unit comprising: a rechargeable battery; an electrical connector configured to interface with a corresponding connector on a base unit; and one or more alignment members configured to mate with alignment components on the base unit; wherein the removable battery unit is configured to be inserted into and removed from a compartment on the base unit to provide a charged battery to a host system.

In Example 161, the subject matter of Example 161, wherein the rechargeable battery comprises a lithium-ion battery with a capacity between 20-200 amp-hours.

In Example 163, the subject matter of Examples 161-161 including a handle configured to facilitate removal and portability.

In Example 164, the subject matter of Examples 161-163, wherein the alignment members comprise slots, rails, or pins to engage with protruding alignment components on the base unit.

In Example 165, the subject matter of Examples 161-164, wherein the electrical connector allows the removable battery unit to be hot-swapped without shutting down the host system.

In Example 166, the subject matter of Examples 161-165, wherein the removable battery unit battery can be charged by a charging system in a host system when installed in the base unit.

In Example 167, the subject matter of Examples 161-166, wherein the removable battery unit provides power to the host system when installed in the base unit.

In Example 168, the subject matter of Examples 161-167, wherein the removable battery unit provides power to the host system when installed in the base unit. to the base unit.

In Example 171, the subject matter of Examples 161-170, wherein the alignment members comprise an asymmetrical shape to ensure proper orientation within the base unit compartment.

In Example 172, the subject matter of Examples 161-171, further comprising data storage capability to record charge/discharge cycles and operating conditions.

In Example 173, the subject matter of Examples 161-172, further comprising an authentication system for secure access and communication with the base unit.

In Example 174, the subject matter of Examples 161-173, wherein the rechargeable battery comprises multiple battery cells connected in series and parallel configurations to provide required voltage and capacity.

Example 175 is a battery for powering a vehicle having an internal combustion engine comprising a lead-acid and a lithium-ion battery capable of providing a stable source of both high cranking current and high energy storage capacity.

In Example 175, the subject matter of Example 175, having a cold cranking current capacity of >300 Amps and an energy storage capacity of >50 Amp-hrs.

In Example 177, the subject matter of Examples 175-175, wherein the lead-acid and lithium batteries are connected in parallel.

In Example 178, the subject matter of Examples 175-177, wherein either of the lead-acid and lithium batteries is connected to the vehicle's electronic system as determined by an electronic controller.

Example 179 is an apparatus for safely providing supplemental electrical power to a branch circuit of an electrical service panel, the apparatus comprising: a battery assembly comprising: a mobile base unit (BU) containing a rechargeable battery and an inverter; a controller configured to: measure electrical conditions on the branch circuit including voltage, current, power, impedance, and reflected waveforms; activate the inverter to provide AC power to the branch circuit only when the measured electrical conditions indicate the branch circuit is isolated from mains power and loads connected to the branch circuit are within predetermined limits; a branch circuit protection device installable in an electrical panel of the building and configured to: electrically isolate the branch circuit from a mains power bus bar in the electrical panel upon receiving a wired or wireless command from the controller; reconnect the branch circuit to the mains power bus bar upon receiving a close command from the controller; whereby the apparatus safely provides supplemental electrical power from the battery assembly to the branch circuit without back feeding current to the mains power bus bar.

In Example 180, the subject matter of Example 179 wherein the controller is further configured to: analyze electrical signatures of connected loads using machine learning algorithms trained with sample data; and activate the inverter to provide power only if the analyzed signatures match predetermined load profiles.

In Example 181, the subject matter of Example 179, wherein the controller is further configured to: determine that a circuit breaker for the branch circuit is inadvertently closed based on measured branch circuit impedance; and transmit a reminder to a user to open the circuit breaker before providing power.

In Example 182, the subject matter of Example 179, wherein the branch circuit protection device comprises: a relay or solid-state switch configured to interrupt current flow in the branch circuit hot lead; and a power supply deriving low voltage DC power from the mains power bus bar.

In Example 183, the subject matter of Example 179, wherein the controller is further configured to: detect a mains power outage on the branch circuit using voltage, impedance, waveform, or reflected waveform measurements; automatically transmit a wireless command to the branch circuit protection device to isolate the branch circuit; activate the inverter to provide uninterrupted backup power to the branch circuit.

In Example 184, the subject matter of Example 179, wherein analyzing electrical signatures of connected loads comprises: injecting a test waveform onto the branch circuit and measuring resulting load currents and voltages; and comparing the measured currents and voltages to predetermined current and voltage profiles for approved loads.

In Example 185, the subject matter of Example 179, wherein analyzing electrical signatures of connected loads comprises: sampling branch circuit currents and voltages during operation of connected loads; and extracting features from the current and voltage samples; inputting the extracted features to a trained classifier to identify the connected loads.

In Example 186, the subject matter of Example 179, wherein the classifier comprises a neural network trained using sample current and voltage data from a plurality of known loads.

In Example 187, the subject matter of Example 179, wherein the controller is further configured to: detect activation of an unapproved load based on changes in measured branch circuit impedance.

In Example 188, the subject matter of Example 179, wherein the controller is further configured to: continuously monitor the branch circuit for unapproved loads; disconnect the inverter if an unapproved load is detected while providing power.

In Example 189, the subject matter of Example 179 including-conductor male to female extension cord, the male end inserted into a female Edison receptacle on the branch circuit and the female end inserted into a male Edison receptacle recessed below the surface of the mobile base unit.

Example 190 is a method for safely providing supplemental electrical power from a mobile battery assembly to a branch circuit in a building, the method comprising: measuring, by a controller of the battery assembly, electrical conditions on the branch circuit including voltage, impedance, and reflected waveforms; wired or wirelessly transmitting, by the controller, a command to a branch circuit protection device instructing it to isolate the branch circuit from a mains power source; verifying, by the controller, that the branch circuit is isolated based on the measured electrical conditions; activating, by the controller, an inverter of the battery assembly to provide power to the branch circuit only after isolation is verified.

In Example 191, the subject matter of Example 190 including analyzing, by the controller, electrical signatures of connected loads using machine learning algorithms trained with sample data; providing power to the branch circuit, by the controller, only if the analyzed signatures match approved load profiles.

In Example 192, the subject matter of Example 190 including determining, by the controller, that a circuit breaker for the branch circuit is inadvertently closed based on measured branch circuit impedance; transmitting a reminder to a user, by the controller, to open the circuit breaker before providing power to the branch circuit.

In Example 193, the subject matter of Example 190 including detecting, by the controller, a mains power outage based on the measured electrical conditions; automatically transmitting a wireless command, by the controller, to isolate the branch circuit and activate the inverter to provide uninterrupted backup power.

In Example 194, the subject matter of Example 190, wherein analyzing electrical signatures comprises: injecting a test waveform onto the branch circuit and measuring resulting currents and voltages; comparing the measurements to predetermined approved load profiles.

In Example 195, the subject matter of Example 190, wherein analyzing electrical signatures comprises: extracting features from sampled branch circuit currents and voltages; inputting the features to a trained neural network classifier to identify connected loads.

In Example 196, the subject matter of Example 190, wherein the branch circuit protection device comprises a relay, and isolating the branch circuit comprises: opening the relay to interrupt current flow to the branch circuit hot lead.

In Example 197, the subject matter of Example 190, wherein detecting a mains power outage comprises: monitoring zero crossings of the mains voltage waveform; determining an outage based on loss of zero crossings.

In Example 198, the subject matter of Example 190, wherein verifying isolation comprises: measuring voltage on the branch circuit hot lead after transmitting the isolation command.

In Example 199, the subject matter of Example 190, including continuously monitoring the isolated branch circuit for electrical faults; disabling the inverter if a fault condition is detected.

Example 200 is an apparatus for safely providing supplemental electrical power to a branch circuit of an electrical service panel, the apparatus comprising: a branch circuit power adapter comprising: a male Edison output receptacle connected to a Female Edison receptacle on the branch circuit via a 3-conductor extension cord; a male Edison input receptacle; and a controller configured to disconnect the output receptacle if power from a mains source and/or a power source connected directly to the branch circuit is detected on the branch circuit; a power station comprising: a rechargeable battery; an inverter configured to convert DC power from the battery to AC power; and a female Edison output receptacle connected to the branch circuit power adapter male Edison input receptacle via a 3-conductor extension cord, and a branch circuit protection device configured to isolate the branch circuit from the mains power source upon receiving a command from the branch circuit power adapter controller.

In Example 201, the subject matter of Example 200, wherein the branch circuit power adapter controller is further configured to: analyze electrical signatures of connected loads using machine learning algorithms trained with sample data; and allow output power only if the analyzed signatures match approved load profiles.

In Example 202, the subject matter of Example 200, wherein the branch circuit power adapter controller is further configured to: determine that a circuit breaker for the branch circuit is closed based on measured branch circuit impedance; and transmit a reminder to a user to open the circuit breaker before providing output power.

In Example 203, the subject matter of Example 200, wherein the power station inverter is configured to activate and provide output power in response to measured mains power outages on the branch circuit.

In Example 204, the subject matter of Example 200, wherein the branch circuit power adapter controller is configured to analyze electrical signatures by: injecting a test waveform onto the branch circuit and measuring resulting currents and voltages; comparing the measurements to predetermined approved load profiles.

In Example 205, the subject matter of Example 200, wherein the branch circuit power adapter controller is configured to analyze electrical signatures by: extracting features from sampled branch circuit currents and voltages; and inputting the features to a trained neural network classifier to identify connected loads.

In Example 206, the subject matter of Example 200, wherein the branch circuit protection device comprises: a relay or solid-state switch configured to interrupt current in the branch circuit hot lead upon receiving the isolation command.

In Example 207, the subject matter of Example 200, wherein the power station further comprises: a wired or wireless transceiver configured to transmit the isolation command to the branch circuit protection device.

In Example 208, the subject matter of Example 200, wherein the branch circuit power adapter output receptacle comprises: a male Edison output receptacle configured to connect to a female Edison receptacle on the branch circuit via a 3-conductor extension cord.

In Example 209, the subject matter of Example 200, wherein the power station output receptacles comprise: one or more female Edison output receptacles configured to connect to the branch circuit power adapter output via an extension cord having a male and a female Edison connector on each end.

Example 210 is a method for safely providing supplemental power to a branch circuit from a mobile power station, the method comprising: connecting, by a power adapter, to an outlet on the branch circuit; monitoring, by the power adapter, electrical conditions on the branch circuit; and disconnecting, by the power adapter, from the branch circuit responsive to detecting power from a mains source.

In Example 210, the subject matter of Example 210 including analyzing, by the power adapter, impedance of loads connected to the branch circuit; and disconnecting, by the power adapter, based the impedance transgressing a threshold indicating a closed branch circuit breaker.

In Example 212, the subject matter of Examples 210-210 including receiving, by the power adapter, AC power from an inverter of the power station; and providing, by the power adapter, the received AC power to the branch circuit.

In Example 212, the subject matter of Example 212 including directing, by the power adapter, a branch circuit protection device to isolate the branch circuit from the mains power source before providing the received AC power.

In Example 214, the subject matter of Examples 210-213 including analyzing, by the power adapter, electrical signatures of connected loads; and disconnecting, by the power adapter, if an unauthorized load signature is detected.

In Example 215, the subject matter of Examples 210-214, wherein monitoring electrical conditions comprises: sampling branch circuit voltages using resistive dividers.

In Example 216, the subject matter of Examples 210-215, wherein monitoring electrical conditions comprises: injecting test signals onto the branch circuit and analyzing reflected waveforms.

In Example 217, the subject matter of Examples 210-216 including determining, by the power adapter, if a branch circuit breaker is closed based on the monitored conditions; and transmitting a reminder to a user to open the breaker.

In Example 218, the subject matter of Examples 210-217, wherein disconnecting from the branch circuit comprises: opening internal relay or solid-state switch contacts.

In Example 219, the subject matter of Examples 210-218 including drawing low voltage power for adapter circuits from a mains bus bar.

Example 220 is at least one machine-readable medium including instructions that, when executed by processing circuitry, cause the processing circuitry to perform operations to implement of any of Examples 1-219.

Example 221 is an apparatus comprising means to implement any of Examples 1-219.

Example 222 is a system to implement any of Examples 1-219.

Example 223 is a method to implement any of Examples 1-219.

Example Set 3

Example 1 is a vehicle battery system comprising: a base unit connectable to an electrical system of a vehicle; a modular replaceable battery removably securable within the base unit and electrically connected to the base unit; and a secondary battery within the base unit and electrically connected to the base unit, wherein the secondary battery provides power to the base unit if the modular replaceable battery is removed.

In Example 2, the subject matter of Example 1, wherein the base unit is configured to interchangeably use modular replaceable batteries of different chemistries, and wherein the base unit further comprises control circuits designed to control charging and discharging parameters based on chemistries of the modular replaceable battery and the secondary battery.

In Example 3, the subject matter of Example 2, wherein the control circuits are configured to implement a distributed battery management system across the base unit, the modular replaceable battery, and the secondary battery.

In Example 4, the subject matter of Examples 1-3, wherein the modular replaceable battery and the secondary battery each comprise energy storage devices selected from a group consisting of a super capacitor, a battery comprising lead-acid chemistry, a battery comprising lithium chemistry with either solid or liquid electrolytes, and combinations thereof.

In Example 5, the subject matter of Examples 1-4, wherein the secondary battery is configured to store energy and provide power to maintain and operate electronic systems of the vehicle when the modular replaceable battery is removed.

In Example 6, the subject matter of Examples 1-5, wherein the secondary battery is configured to be recharged from the modular replaceable battery.

In Example 7, the subject matter of Examples 1-6, wherein the secondary battery is configured for starting the vehicle and the modular replaceable battery is configured for energy storage and deep cycle operation for powering external devices.

In Example 8, the subject matter of Examples 1-7 including a thermal management system configured to maintain the modular replaceable battery within a determined operating temperature range and regulate temperature based on thermal characteristics of a detected battery chemistry.

In Example 9, the subject matter of Example 8, wherein the thermal management system comprises a thermoelectric device sandwiched between an inward-facing heat exchanger and air circulation device and an outward-facing heat exchanger and the air circulation device.

In Example 10, the subject matter of Examples 1-9 including a controller configured to monitor and control the modular replaceable battery and the secondary battery, wherein the controller is configured to detect presence or absence of the modular replaceable battery and implement rules for determining whether to allow the vehicle to start or to charge the modular replaceable battery.

In Example 11, the subject matter of Examples 1-10 including a mobile base unit configured to receive the modular replaceable battery when removed from the base unit, wherein the modular replaceable battery is configured to be removed from the base unit and provide energy storage and electrical power to a second compatible base unit.

In Example 12, the subject matter of Example 11, wherein the mobile base unit comprises one or more electrical connectors that allow the mobile base unit to power external devices using the modular replaceable battery.

In Example 13, the subject matter of Example 12 including a direct current to alternating current inverter configured to convert battery power to alternating current.

In Example 14, the subject matter of Examples 1-13 including a compatibility controller configured to provide compatibility between a lead-acid charging system of the vehicle and the modular replaceable battery.

In Example 15, the subject matter of Examples 1-14, wherein the modular replaceable battery comprises a battery management system configured to monitor cell voltages and manage charging or discharging of the modular replaceable battery when at least one of voltage, current, or temperature limits are exceeded while maintaining a determinable state of operation of an electrical system of a vehicle.

In Example 16, the subject matter of Examples 1-15 further comprising a second modular replaceable battery that is hot-swappable allowing the mobile base unit to operationally provide an uninterrupted source of power to an external power consumer system.

In Example 17, the subject matter of Examples 1-16, wherein the modular replaceable battery has an energy storage capability selected from a group consisting of about 100-300 Wh, 300-1000 Wh and greater than 1000 Wh and the secondary battery has an energy storage capability selected from a group consisting of 10-150 Wh, 150-300 Wh, 300-1000 Wh and greater than 1000 Wh.

Example 18 is a base unit for a vehicle battery system, the base unit comprising: a housing connectable to an external electrical system of a vehicle; a first compartment configured to removably secure a modular replaceable battery; a second compartment containing a secondary battery; electrical connections configured to electrically connect the modular replaceable battery and the secondary battery to the external electrical system; and control circuits designed to detect and optimize charging and discharging parameters based on chemistries of the modular replaceable battery and the secondary battery.

Example 19 is a modular replaceable battery for a vehicle battery system, the modular replaceable battery comprising: a housing configured to be removably securable within a base unit of the vehicle battery system; one or more battery cells configured as a battery pack having sufficient stored energy and current capability to start and operate at least one of an internal combustion engine (ICE) or electrical system of an electric vehicle; electrical connectors configured to electrically connect the battery pack to the base unit when the modular replaceable battery is secured within the base unit; and a battery management system configured to monitor cell voltages and manage charging or discharging of the battery pack when at least one of voltage, current, or temperature limits are exceeded while maintaining a determinable state of operation of a vehicle electrical system.

Example 20 is a method for manufacturing a vehicle battery system, the method comprising: providing a base unit connectable to an external electrical system of a vehicle; configuring the base unit to removably secure a modular replaceable battery; installing a secondary battery within the base unit; electrically connecting the modular replaceable battery and the secondary battery to the base unit; implementing control circuits in the base unit designed to detect and optimize charging and discharging parameters based on chemistries of the connected modular replaceable battery and the secondary battery; and configuring the secondary battery to provide power to the base unit if the modular replaceable battery is removed.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement of any of Examples 1-20.

Example 24 is a method to implement any of Examples 1-20.

CONCLUSION

The present examples introduce modular battery system architectures that aim to address many limitations of current battery technologies, particularly lead-acid batteries commonly used in vehicular and equipment applications. This modular battery system provides a flexible, scalable platform for electrification initiatives across the transportation, renewable energy, backup power, and related domains.

Some examples comprise swappable Modular Replaceable Batteries (MRBs 106) which mechanically and electrically interface with Base Units (BUs 104) customized for installation into vehicles, equipment, machines, or other host systems. MRBs may contain rechargeable lithium-ion or other advanced battery cells assembled into packs optimized for factors like energy density, power density, lifespan, charging rate, and operating temperature range. These MRBs slide into mating bays in the BUs where robust physical connectors and electrical interfaces provide secure mechanical mounting and high-current battery connections.

The modular design also enables MRBs to be charged externally using dedicated rapid chargers tailored to their battery chemistry. Fully charged MRBs can then be transported for use in any compatible PMBU. For sustainable charging, the PMBUs and MRBs can interface with renewable sources like solar panels. These capabilities overcome limitations in recharging lead-acid batteries, which must be charged slowly over hours to avoid damage.

Furthermore, the use of lithium-based and other advanced battery chemistries in the MRBs provides significant performance, lifetime, and environmental benefits compared to lead-acid. The disclosed examples of charging systems, battery management electronics, and thermal controls are designed to fully leverage these chemistries in a robust package suitable for vehicular and equipment installation.

The BUs may serve as form-fit adapter platforms to securely mount MRBs and connect them to existing electrical interfaces in vehicles or equipment designed for lead-acid batteries. This provides a seamless upgrade path by enabling drop-in replacement of legacy batteries without requiring modification of the host system. The BUs may contain integrated charging systems that adapt the host alternator or other charging source to properly charge MRBs based on their specific battery configuration and chemistry. This overcomes potential compatibility issues and protects both the MRBs and the host charging system.

Advanced battery management features within the MRBs and BUs may provide cell monitoring and balancing to further optimize performance and lifetime. The modular components also incorporate ruggedized construction including waterproofing and shock absorption as appropriate to withstand harsh conditions.

Overall, the example modular battery system architectures aim to unlock the clear advantages of modern lithium-based and other advanced battery chemistries by overcoming adoption barriers. The use of swappable MRBs in retrofittable BUs yields a flexible, serviceable platform that simplifies integration into existing electrical systems. It provides a cost-effective upgrade path requiring minimal installation effort compared to full electrical overhauls. The performance and lifetime gains of lithium technology are made robust and accessible via the modular components and their tight integration.

The customizable nature of the architecture also allows mixing and matching of MRBs with different capacities, voltages, and chemistries within the same BU. This supports unique configurations tailored to specific electrification needs across applications ranging from small consumer electronics to electric vehicles and large industrial equipment. Standardized MRB building blocks may enable scalable solutions.

In summary, the example modular battery systems introduce an inventive architecture to modernize energy storage capabilities leveraging, for example, swappable modules, lithium-based battery upgrades, charging innovations, and rugged integration. The examples aim to overcome the deficiencies of dated lead-acid batteries still prevalent in many systems. The flexibility of the platform provides a migration path toward electrification initiatives across the transportation sector, renewable energy domain, and various commercial and industrial systems.

What is claimed is:

1. A vehicle battery system comprising:
a modular replaceable battery comprising one or more battery cells configured as a battery pack and an electrical connector for establishing electrical connection to the battery pack;
a base unit connectable to an electrical system of an internal combustion engine (ICE) vehicle; the base unit comprising:
a housing installable and securable in the ICE vehicle in place of a standard-size vehicle battery;
positive and negative electrical terminals to connect the housing to the electrical system of the ICE vehicle;
a bay defined at least partially within the housing to removably secure the modular replaceable battery within the base unit, the bay further comprising:
a compatible electrical connector to electrically connect to the electrical connector of the modular replaceable battery when the modular replaceable battery is inserted into the bay; and
an alignment mechanism to operatively orient the modular replaceable battery within the bay and to align the electrical connector of the modular replaceable battery with the compatible electrical connector of the bay;
a secondary battery within the base unit and electrically connected to the base unit, the secondary battery to provide power to the base unit and to at least one of:
function as a keep-alive battery to provide power to at least a subset of electronic systems of the ICE vehicle when the modular replaceable battery is at least one of removed from the base unit or discharged; or
enable starting of the ICE vehicle when the modular replaceable battery is at least one of removed or discharged,
wherein the modular replaceable battery is interchangeable between the base unit and a compatible base unit, the compatible base unit having a compatible bay to removably secure the modular replaceable battery within the compatible base unit; and wherein the base unit further comprises a start-disable switch to selectively enable or disable the secondary battery from being able to start the ICE vehicle when the modular replaceable battery is removed from the base unit.

2. The vehicle battery system of claim 1, wherein the base unit is configured to interchangeably use modular replaceable batteries of different chemistries, and wherein the base unit further comprises control circuits designed to control charging and discharging parameters based on detecting the chemistries of the modular replaceable battery and the secondary battery.

3. The vehicle battery system of claim 1, further comprising a distributed battery management system across the base unit, the modular replaceable battery, and the secondary battery.

4. The vehicle battery system of claim 1, wherein the secondary battery comprises at least one of:

a super capacitor to enable the starting of the ICE vehicle, or a chemical battery to function as the keep-alive battery to provide power to at least the subset of electronic systems of the ICE vehicle.

5. The vehicle battery system of claim 1, wherein the secondary battery is configured to be recharged from the modular replaceable battery.

6. The vehicle battery system of claim 1, further comprising a thermal management system configured to maintain a temperature of the modular replaceable battery within a determined operating temperature range and regulate the temperature based on thermal characteristics of a battery chemistry of the modular replaceable battery.

7. The vehicle battery system of claim 6, wherein the thermal management system comprises at least one of an inward facing air circulation device, an outward facing air circulation device or a thermoelectric device sandwiched between an inward-facing heat exchanger and air circulation device and an outward-facing heat exchanger and the air circulation device.

8. The vehicle battery system of claim 1, further comprising a controller configured to monitor and control the modular replaceable battery and the secondary battery, wherein the controller is configured to detect at least one of presence, absence or state charge of the modular replaceable battery and to implement rules for determining whether to allow the ICE vehicle to start or to charge the modular replaceable battery.

9. The vehicle battery system of claim 1, further comprising a mobile base unit configured to receive the modular replaceable battery when removed from the base unit, wherein the modular replaceable battery is configured to be removed from the base unit and provide energy storage for the mobile base unit and to enable the mobile base unit to provide electrical power to one or more external devices through one or more electrical connectors, and the mobile base unit further comprises a direct current to alternating current inverter configured to convert stored energy to alternating current for powering the one or more external devices.

10. The vehicle battery system of claim 9, further comprising a second modular replaceable battery that is hot-swappable allowing the mobile base unit to operationally provide an uninterrupted source of electrical power to the one or more external devices.

11. The vehicle battery system of claim 1, further comprising a compatibility controller configured to provide compatibility between a lead-acid battery charging system of the ICE vehicle and the modular replaceable battery.

12. The vehicle battery system of claim 1, wherein the modular replaceable battery comprises a battery management system configured to monitor at least one cell voltage of the modular replaceable battery and manage charging or discharging of the modular replaceable battery when at least one of voltage, current, or temperature limits is exceeded while maintaining a determinable state of operation of the electrical system of a vehicle.

13. The vehicle battery system of claim 1, wherein the alignment mechanism comprises an alignment key mechanism to form a mating and aligned engagement between the modular replaceable battery and the bay of the base unit.

14. The vehicle battery system of claim 1, wherein the alignment mechanism comprises a casing for the modular replaceable battery with an asymmetrical shape that corresponds to an asymmetrical shape of the bay of the base unit.

15. The vehicle battery system of claim 1, further comprising a current limiting component within the base unit configured to limit charging current to the modular replaceable battery when the modular replaceable battery is in a depleted state, wherein the current limiting component protects a vehicle alternator of the ICE vehicle from current draw and power output exceeding a predetermined operating capacity of the alternator.

16. The vehicle battery system of claim 15, wherein the current limiting component comprises at least one of:

a resistor having a resistance value between 0.01 and 5 Ohms; or an active circuit configured to dynamically adjust current flow between the vehicle alternator and the modular replaceable battery based on at least one of a charging state of the modular replaceable battery or a load condition of the ICE vehicle.

17. The vehicle battery system of claim 1, comprising a mechanically or electronically actuated locking mechanism to mechanically retain the modular replaceable battery in the base unit, release of the locking mechanism requiring unlocking of the mechanical or electronic actuated mechanism to prevent theft of the modular replaceable battery from the base unit.

18. A base unit for a vehicle battery system, the base unit comprising:

a housing installable and securable in an internal combustion engine (ICE) vehicle in place of a vehicle battery;

positive and negative electrical terminals to connect the housing to an electrical system of the ICE vehicle;

a first compartment configured to removably secure a modular replaceable battery, the first compartment comprising:

an electrical connector within the first compartment to electrically connect to a compatible electrical connector of the modular replaceable battery when the modular replaceable battery is inserted into the first compartment; and an alignment mechanism to operatively orient the modular replaceable battery within the first compartment and to align the electrical connector of the modular replaceable battery with the electrical connector of the first compartment;

a second compartment configured to secure a secondary battery, wherein the secondary battery comprises at least one of:

a chemical battery to provide power to at least a subset of electronic systems of the ICE vehicle when the modular replaceable battery is at least one of removed from the base unit or discharged; or a super capacitor to enable starting of the ICE vehicle when the modular replaceable battery is at least one of removed or discharged;

electrical connections configured to electrically connect the modular replaceable battery and the secondary battery to the electrical system of the ICE vehicle; and a start-disable switch to selectively enable or disable the secondary battery from being able to start the ICE vehicle when the modular replaceable battery is removed from the base unit.

19. A battery set comprising a modular replaceable battery for an internal combustion engine (ICE) powered vehicle battery system and an associated secondary battery, the modular replaceable battery comprising:

a housing configured to be removably securable within a compartment configured within a base unit, the base unit permanently mountable in place of a standard vehicle battery;

one or more battery cells within the housing configured as a battery pack capable of operating an ICE powered vehicle;

an electrical connector within the housing and configured to establish electrical connections with a corresponding electrical connector in the compartment when the modular replaceable battery is removably inserted into the compartment;

an alignment component incorporated into the compartment, the alignment component ensuring correct orientation and secure positioning when a form-fit modular replaceable battery is removably secured in the compartment; and a communication system configured to communicate information about the modular replaceable battery to the base unit, wherein the information includes at least one of a feature, a state, a characteristic or an identity of the modular replaceable battery, and wherein the base unit further comprises a start-disable switch to selectively enable or disable the secondary battery from being able to start the ICE vehicle when the modular replaceable battery is removed from the base unit.

20. A method for manufacturing a vehicle battery system, the method comprising:

forming a base unit installable and securable in an internal combustion engine (ICE) vehicle in place of a vehicle battery;

forming a bay within the base unit to removably secure a modular replaceable battery, the bay comprising:

an electrical connector within the bay to electrically connect to a compatible electrical connector of the modular replaceable battery when the modular replaceable battery is inserted into a form-fit compatible bay; and an alignment mechanism to operatively orient the modular replaceable battery within the bay;

installing a secondary battery within the base unit and configuring the secondary battery to provide power to at least a subset of electronic systems of the ICE vehicle when the modular replaceable battery is at least one of removed from the base unit or discharged;

installing a start-disable switch to selectively enable or disable the secondary battery from being able to start the ICE vehicle when the modular replaceable battery is removed from the base unit; and implementing a current limiting component within the base unit configured to any one of limit charging current to the modular replaceable battery when the modular replaceable battery is in a depleted state to at least one of:

protect an alternator of the ICE vehicle from a current draw and power output exceeding a predetermined operating limit of the alternator, or protect the modular replaceable battery by limiting the charging current to within a predefined operating limit of the modular replaceable battery.

* * * * *